United States Patent
Khoe et al.

(10) Patent No.: US 12,462,336 B2
(45) Date of Patent: *Nov. 4, 2025

(54) AUTOMATIC CROPPING OF VIDEO CONTENT

(71) Applicant: Apple Inc., Cupertino, CA (US)

(72) Inventors: May-Li Khoe, San Francisco, CA (US); Avi E. Cieplinski, San Francisco, CA (US); David Joshua Hart, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/628,471

(22) Filed: Apr. 5, 2024

(65) Prior Publication Data

US 2024/0249379 A1     Jul. 25, 2024

Related U.S. Application Data

(63) Continuation of application No. 17/321,268, filed on May 14, 2021, now Pat. No. 11,967,039, which is a
(Continued)

(51) Int. Cl.
*H04N 23/62*      (2023.01)
*G06T 3/04*       (2024.01)
(Continued)

(52) U.S. Cl.
CPC .............. *G06T 3/20* (2013.01); *G06T 3/04* (2024.01); *G06T 7/11* (2017.01); *H04N 23/611* (2023.01);
(Continued)

(58) Field of Classification Search
CPC .................................................. H04N 25/443
See application file for complete search history.

(56) References Cited

U.S. PATENT DOCUMENTS

| | | |
|---|---|---|
| 5,483,261 A | 1/1996 | Yasutake |
| 5,488,204 A | 1/1996 | Mead et al. |
| (Continued) | | |

FOREIGN PATENT DOCUMENTS

| | | |
|---|---|---|
| EP | 2018058 A1 | 1/2009 |
| EP | 4060979 A1 | 9/2022 |
| (Continued) | | |

OTHER PUBLICATIONS

Corrected Notice of Allowance received for U.S. Appl. No. 14/850,677, mailed on Jan. 10, 2019, 6 pages.
(Continued)

*Primary Examiner* — Cynthia Segura
(74) *Attorney, Agent, or Firm* — Kubota & Basol LLP

(57) ABSTRACT

Electronic devices are often equipped with a camera for capturing video content and/or a display for displaying video content. However, amateur users often capture video content without regard to composition, framing, or camera movement, resulting in video content that can be jarring or confusing to viewers. There is a need to automate the processing and presentation of video content in an aesthetically pleasing manner. The embodiments described herein provide a method of automatically cropping video content for presentation on a display.

42 Claims, 49 Drawing Sheets

Related U.S. Application Data continuation of application No. 16/813,239, filed on Mar. 9, 2020, now Pat. No. 11,010,867, which is a continuation of application No. 16/282,856, filed on Feb. 22, 2019, now Pat. No. 10,587,810, which is a continuation of application No. 14/850,677, filed on Sep. 10, 2015, now Pat. No. 10,244,175.

(60) Provisional application No. 62/130,311, filed on Mar. 9, 2015.

(51) Int. Cl.
  G06T 3/20 (2006.01)
  G06T 7/11 (2017.01)
  H04N 23/611 (2023.01)
  H04N 23/63 (2023.01)
  H04N 25/443 (2023.01)

(52) U.S. Cl.
  CPC .............. H04N 23/62 (2023.01); H04N 23/63 (2023.01); H04N 25/443 (2023.01); G06T 2207/20132 (2013.01)

(56) References Cited

U.S. PATENT DOCUMENTS

| | | | |
|---|---|---|---|
| 5,825,352 A | 10/1998 | Bisset et al. | |
| 5,835,079 A | 11/1998 | Shieh | |
| 5,880,411 A | 3/1999 | Gillespie et al. | |
| 6,188,391 B1 | 2/2001 | Seely et al. | |
| 6,310,610 B1 | 10/2001 | Beaton et al. | |
| 6,323,846 B1 | 11/2001 | Westerman et al. | |
| 6,570,557 B1 | 5/2003 | Westerman et al. | |
| 6,677,932 B1 | 1/2004 | Westerman | |
| 6,690,387 B2 | 2/2004 | Zimmerman et al. | |
| 6,766,035 B1 | 7/2004 | Gutta | |
| 7,015,894 B2 | 3/2006 | Morohoshi | |
| 7,184,064 B2 | 2/2007 | Zimmerman et al. | |
| 7,614,008 B2 | 11/2009 | Ording | |
| 7,633,076 B2 | 12/2009 | Huppi et al. | |
| 7,653,883 B2 | 1/2010 | Hotelling et al. | |
| 7,657,849 B2 | 2/2010 | Chaudhri et al. | |
| 7,663,607 B2 | 2/2010 | Hotelling et al. | |
| 7,844,914 B2 | 11/2010 | Andre et al. | |
| 7,957,762 B2 | 6/2011 | Herz et al. | |
| 8,006,002 B2 | 8/2011 | Kalayjian et al. | |
| 8,169,463 B2 | 5/2012 | Enstad et al. | |
| 8,239,784 B2 | 8/2012 | Hotelling et al. | |
| 8,279,180 B2 | 10/2012 | Hotelling et al. | |
| 8,381,135 B2 | 2/2013 | Hotelling et al. | |
| 8,477,174 B2 | 7/2013 | Michaelis | |
| 8,479,122 B2 | 7/2013 | Hotelling et al. | |
| 8,903,130 B1* | 12/2014 | Carceroni | H04N 7/147 |
| | | | 382/173 |
| 8,923,620 B2 | 12/2014 | Sung | |
| 8,957,865 B2 | 2/2015 | Cieplinski et al. | |
| 9,153,031 B2 | 10/2015 | El-saban et al. | |
| 9,270,941 B1 | 2/2016 | Lavelle | |
| 9,279,983 B1 | 3/2016 | Davis | |
| 9,317,738 B2 | 4/2016 | Srinivasan et al. | |
| 9,348,458 B2 | 5/2016 | Hotelling et al. | |
| 9,628,538 B1 | 4/2017 | Leske et al. | |
| 9,633,270 B1 | 4/2017 | Tangeland et al. | |
| 9,723,260 B2 | 8/2017 | Feng | |
| 9,933,937 B2 | 4/2018 | Lemay et al. | |
| 9,955,209 B2 | 4/2018 | Ng | |
| 10,027,883 B1 | 7/2018 | Kuo et al. | |
| 10,122,965 B2 | 11/2018 | Taine et al. | |
| 10,244,175 B2 | 3/2019 | Khoe et al. | |
| 10,303,928 B2 | 5/2019 | Taine et al. | |
| 10,587,810 B2 | 3/2020 | Khoe et al. | |
| 10,951,859 B2 | 3/2021 | Cutler et al. | |
| 11,010,867 B2* | 5/2021 | Khoe | H04N 23/62 |
| 11,212,449 B1 | 12/2021 | Manzari et al. | |
| 11,350,026 B1 | 5/2022 | Manzari et al. | |
| 12,014,562 B2* | 6/2024 | Proschowsky | G06V 20/49 |
| 2002/0015024 A1 | 2/2002 | Westerman et al. | |
| 2002/0101505 A1 | 8/2002 | Gutta et al. | |
| 2005/0025387 A1 | 2/2005 | Luo | |
| 2005/0190059 A1 | 9/2005 | Wehrenberg | |
| 2005/0243168 A1 | 11/2005 | Cutler | |
| 2006/0017692 A1 | 1/2006 | Wehrenberg et al. | |
| 2006/0033724 A1 | 2/2006 | Chaudhri et al. | |
| 2006/0072847 A1 | 4/2006 | Chor et al. | |
| 2006/0139371 A1 | 6/2006 | Lavine et al. | |
| 2006/0179451 A1 | 8/2006 | Sung | |
| 2006/0197753 A1 | 9/2006 | Hotelling | |
| 2008/0198177 A1 | 8/2008 | Niemi et al. | |
| 2008/0218582 A1 | 9/2008 | Buckler | |
| 2009/0079813 A1 | 3/2009 | Hildreth | |
| 2009/0089683 A1 | 4/2009 | Thapa | |
| 2010/0002071 A1 | 1/2010 | Ahiska | |
| 2010/0189427 A1 | 7/2010 | Ilya et al. | |
| 2010/0220172 A1* | 9/2010 | Michaelis | H04N 21/44016 |
| | | | 348/14.08 |
| 2010/0289913 A1 | 11/2010 | Fujiwara | |
| 2011/0069196 A1 | 3/2011 | Jung et al. | |
| 2011/0141219 A1 | 6/2011 | Yeh | |
| 2011/0175932 A1* | 7/2011 | Yu | G06F 3/04845 |
| | | | 345/661 |
| 2011/0228098 A1 | 9/2011 | Lamb et al. | |
| 2011/0285808 A1* | 11/2011 | Feng | H04N 7/142 |
| | | | 348/E7.083 |
| 2012/0062732 A1 | 3/2012 | Marman et al. | |
| 2012/0169901 A1 | 7/2012 | Chang | |
| 2012/0200419 A1 | 8/2012 | Nylund | |
| 2013/0069980 A1* | 3/2013 | Hartshorne | G09G 5/00 |
| | | | 345/620 |
| 2013/0336628 A1 | 12/2013 | Lamb et al. | |
| 2014/0032679 A1 | 1/2014 | Tandon et al. | |
| 2014/0044358 A1 | 2/2014 | Srinivasan et al. | |
| 2014/0152777 A1 | 6/2014 | Galor et al. | |
| 2014/0362170 A1 | 12/2014 | Walker | |
| 2015/0117784 A1 | 4/2015 | Lin et al. | |
| 2015/0131855 A1 | 5/2015 | Hanzawa et al. | |
| 2015/0281599 A1 | 10/2015 | Slaby et al. | |
| 2015/0370323 A1 | 12/2015 | Cieplinski et al. | |
| 2016/0037087 A1 | 2/2016 | Price | |
| 2016/0255126 A1 | 9/2016 | Sarris | |
| 2016/0269645 A1 | 9/2016 | Khoe et al. | |
| 2016/0275952 A1 | 9/2016 | Kashtan et al. | |
| 2016/0295117 A1 | 10/2016 | Nielsen | |
| 2017/0041529 A1 | 2/2017 | Park et al. | |
| 2017/0054982 A1 | 2/2017 | Vellore Arumugam et al. | |
| 2017/0163929 A1 | 6/2017 | Maliuk et al. | |
| 2017/0220871 A1 | 8/2017 | Ikeda | |
| 2018/0025233 A1 | 1/2018 | Iwai | |
| 2018/0063482 A1* | 3/2018 | Goesnar | H04N 23/58 |
| 2018/0152666 A1 | 5/2018 | Taine et al. | |
| 2018/0152667 A1 | 5/2018 | Taine et al. | |
| 2018/0352168 A1 | 12/2018 | Sugaya | |
| 2019/0130583 A1 | 5/2019 | Chen et al. | |
| 2019/0191094 A1 | 6/2019 | Khoe et al. | |
| 2019/0215464 A1 | 7/2019 | Kumar et al. | |
| 2019/0356883 A1* | 11/2019 | Theien | H04N 7/152 |
| 2020/0322535 A1 | 10/2020 | Khoe et al. | |
| 2022/0044354 A1 | 2/2022 | Khoe et al. | |
| 2022/0053139 A1 | 2/2022 | Fujii | |
| 2022/0108419 A1 | 4/2022 | Khoe et al. | |
| 2022/0198774 A1 | 6/2022 | Wang et al. | |
| 2023/0152889 A1* | 5/2023 | Cieplinski | H04N 21/422 |
| | | | 345/156 |

FOREIGN PATENT DOCUMENTS

| | | | |
|---|---|---|---|
| JP | 2000-163031 A | 6/2000 | |
| JP | 2002-342033 A | 11/2002 | |

(56) References Cited

FOREIGN PATENT DOCUMENTS

| WO | 2013/169849 A2 | 11/2013 |
|---|---|---|
| WO | 2014/105276 A1 | 7/2014 |

OTHER PUBLICATIONS

Corrected Notice of Allowance received for U.S. Appl. No. 16/282,856, mailed on Feb. 10, 2020, 6 pages.
Final Office Action received for U.S. Appl. No. 14/850,677, mailed on Nov. 8, 2017, 46 pages.
Final Office Action received for U.S. Appl. No. 17/321,268, mailed on Jul. 26, 2022, 26 pages.
Non-Final Office Action received for U.S. Appl. No. 14/850,677, mailed on Feb. 24, 2017, 39 pages.
Non-Final Office Action received for U.S. Appl. No. 14/850,677, mailed on Jun. 1, 2018, 30 pages.
Non-Final Office Action received for U.S. Appl. No. 16/282,856, mailed on Mar. 21, 2019, 19 pages.
Non-Final Office Action received for U.S. Appl. No. 16/813,239, mailed on Sep. 3, 2020, 13 pages.
Non-Final Office Action received for U.S. Appl. No. 17/321,268, mailed on Feb. 23, 2022, 23 pages.
Non-Final Office Action received for U.S. Appl. No. 17/452,167, mailed on Dec. 7, 2021, 20 pages.
Non-Final Office Action received for U.S. Appl. No. 17/321,268, mailed on Feb. 14, 2023, 8 pages.
Notice of Allowance received for U.S Appl. No. 17/452,167, mailed on Mar. 18, 2022, 19 pages.
Notice of Allowance received for U.S. Appl. No. 14/850,677, mailed on Nov. 1, 2018, 9 pages.
Notice of Allowance received for U.S. Appl. No. 16/282,856, mailed on Oct. 22, 2019, 10 pages.
Notice of Allowance received for U.S. Appl. No. 16/813,239, mailed on Jan. 21, 2021, 11 pages.
Notice of Allowance received for U.S. Appl. No. 17/321,268, mailed on Aug. 23, 2023, 11 pages.
Notice of Allowance received for U.S. Appl. No. 17/321,268, mailed on Dec. 11, 2023, 10 pages.
Lee et al., "A Multi-Touch Three Dimensional Touch-Sensitive Tablet", CHI'85 Proceedings, Apr. 1985, pp. 21-25.
Rubine, Dean, "Combining Gestures and Direct Manipulation", CHI'92, May 3-7, 1992, pp. 659-660.
Rubine, Dean H., "The Automatic Recognition of Gestures", CMU-CS-91-202, Submitted in Partial Fulfillment of the Requirements for the Degree of Doctor of Philosophy in Computer Science at Carnegie Mellon University, Dec. 1991, 285 pages.
Westerman, Wayne, "Hand Tracking, Finger Identification, and Chordic Manipulation on a Multi-Touch Surface", A Dissertation Submitted to the Faculty of the University of Delaware in Partial Fulfillment of the Requirements for the Degree of Doctor of Philosophy in Electrical Engineering, 1999, 363 pages.

* cited by examiner

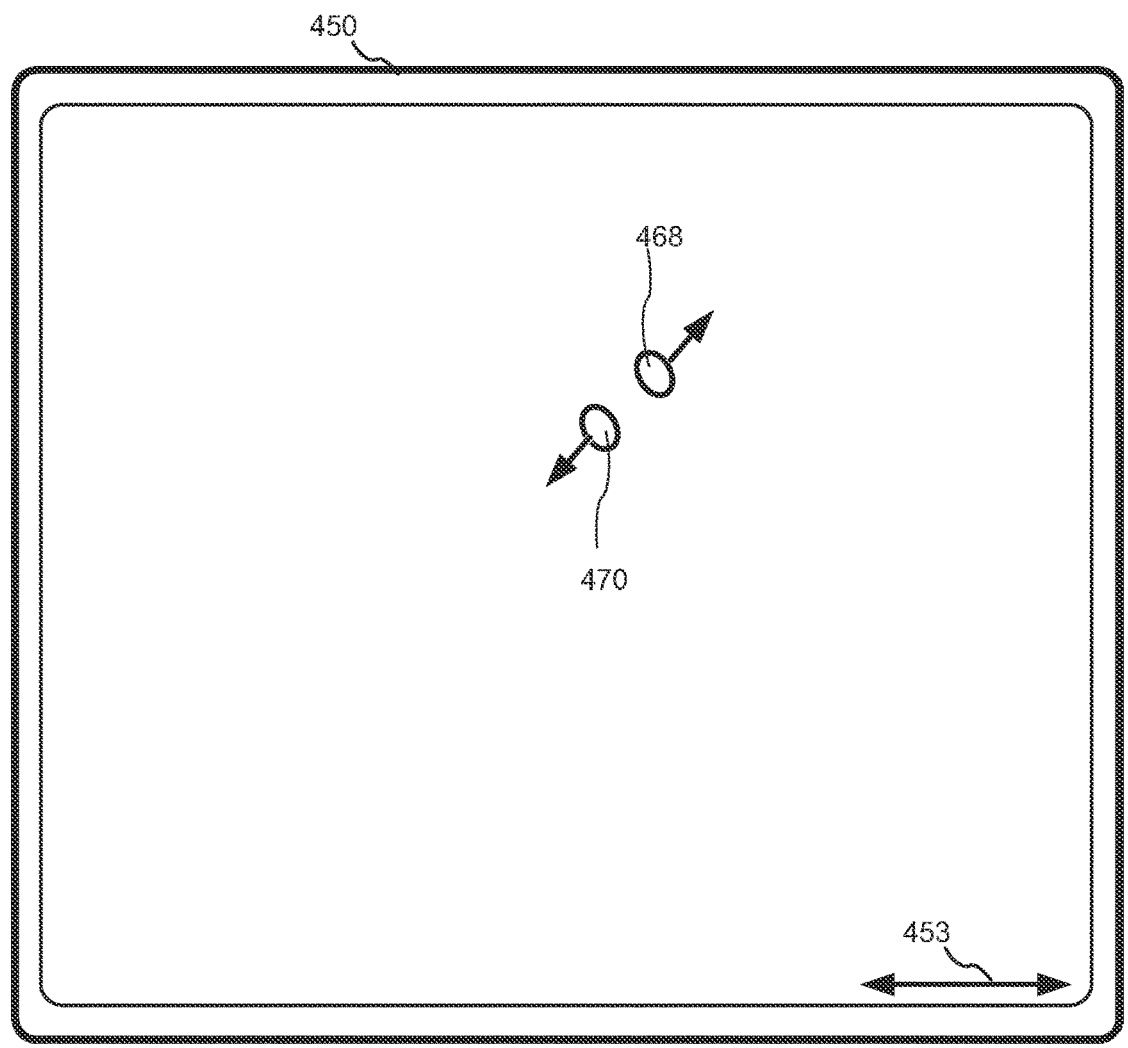
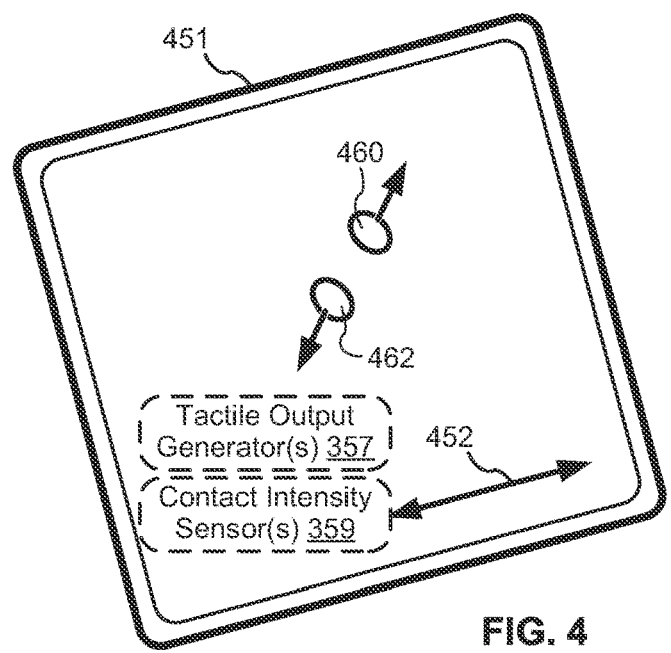
FIG. 4

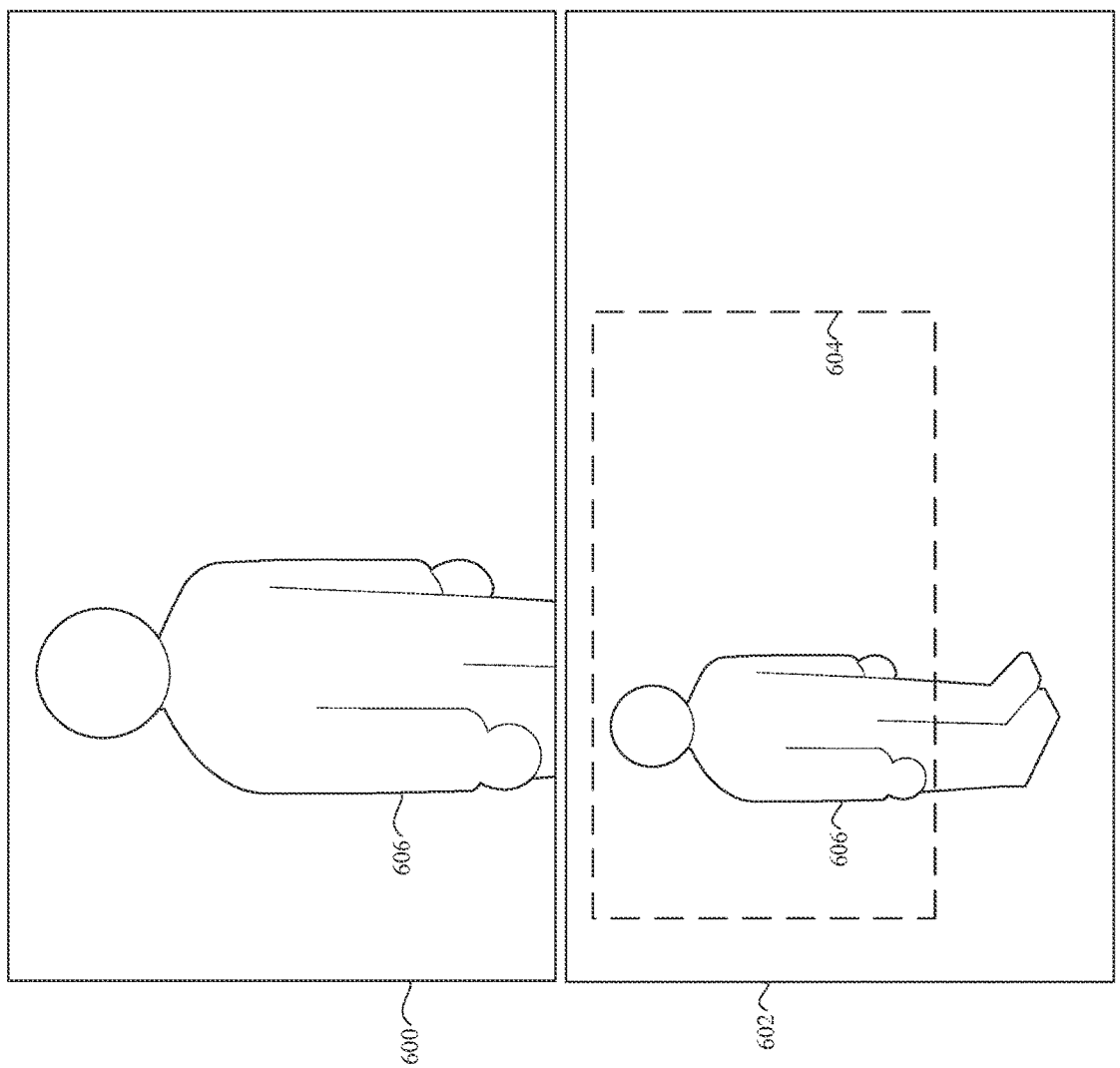

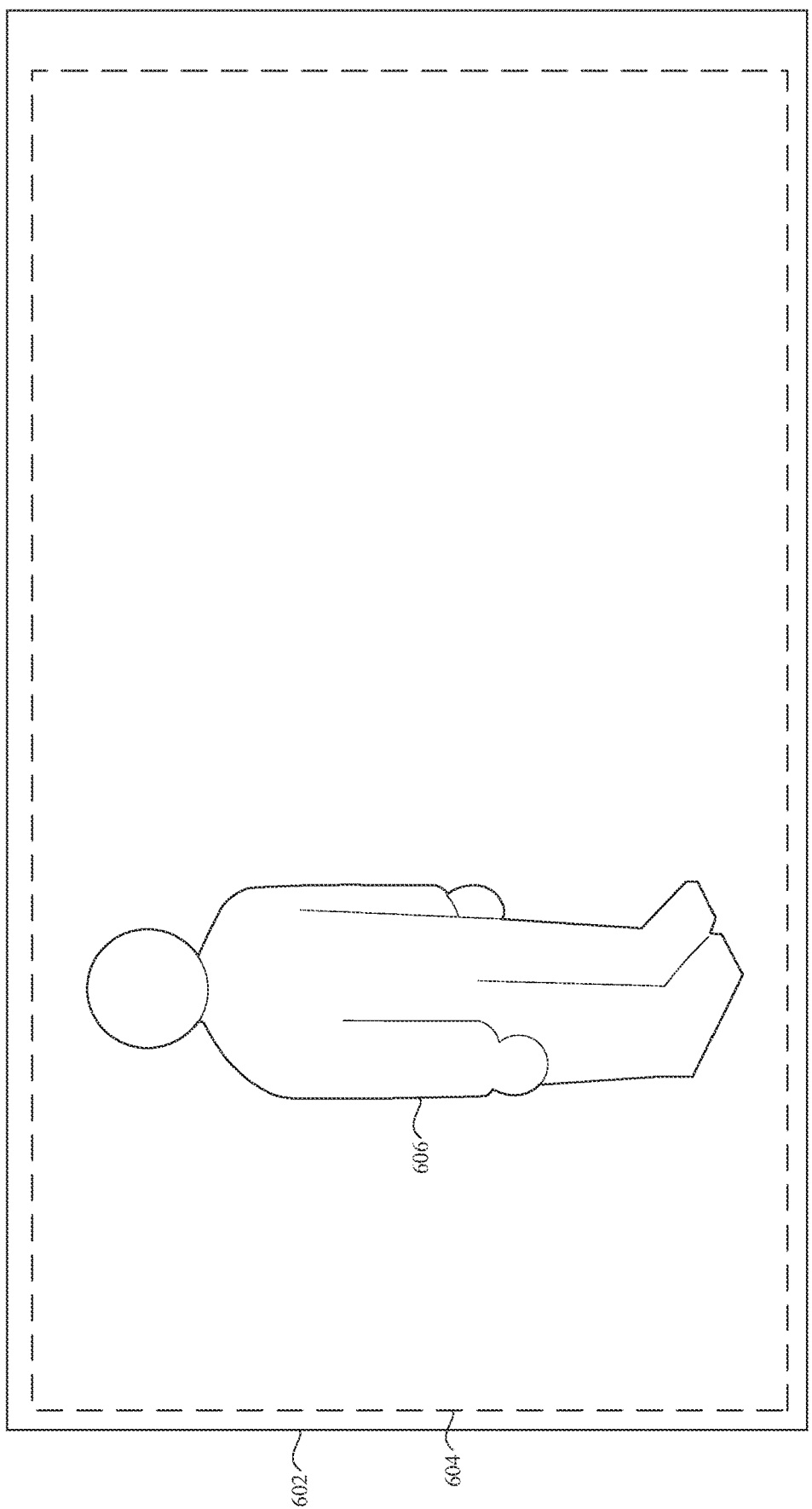

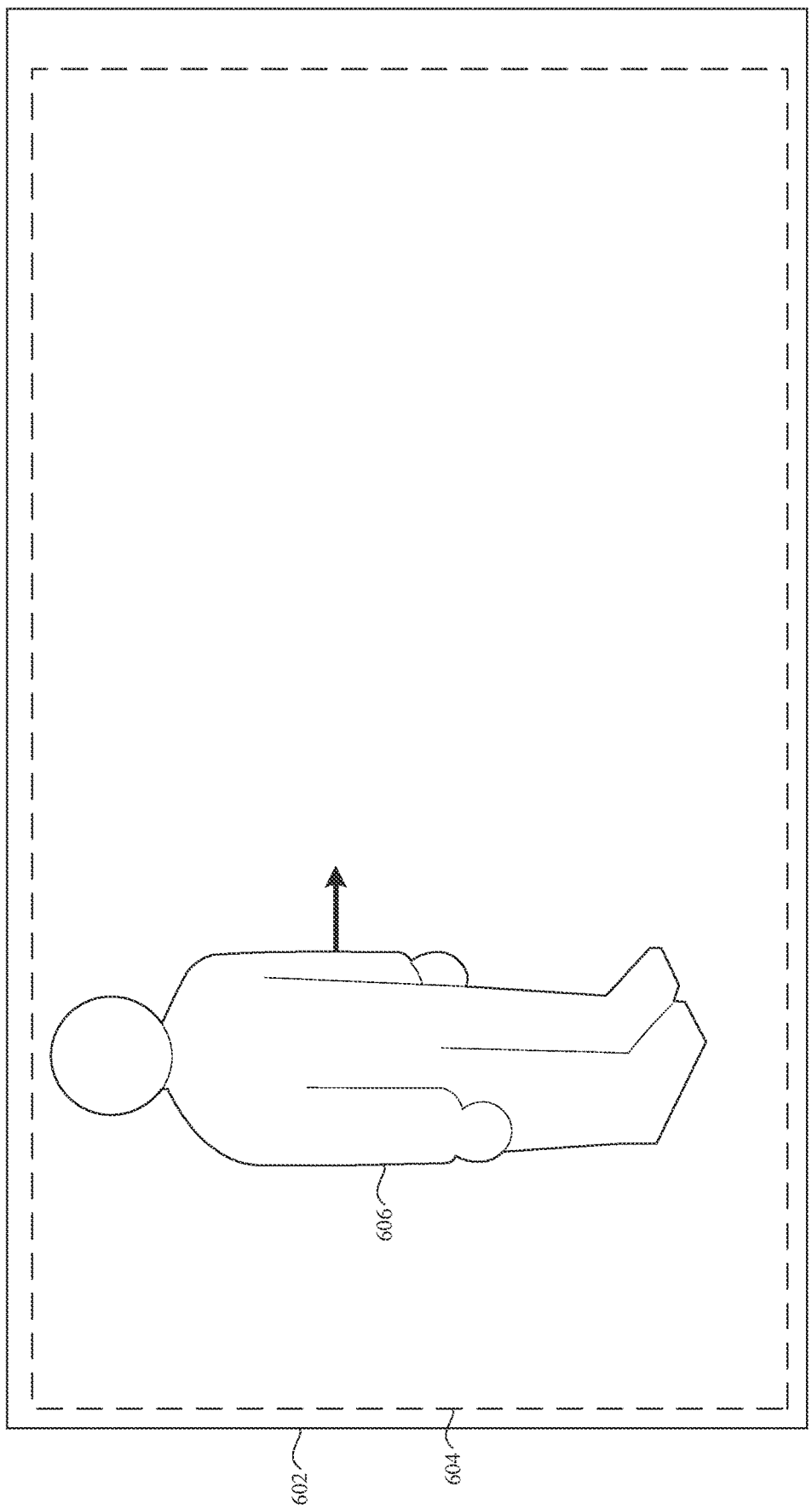

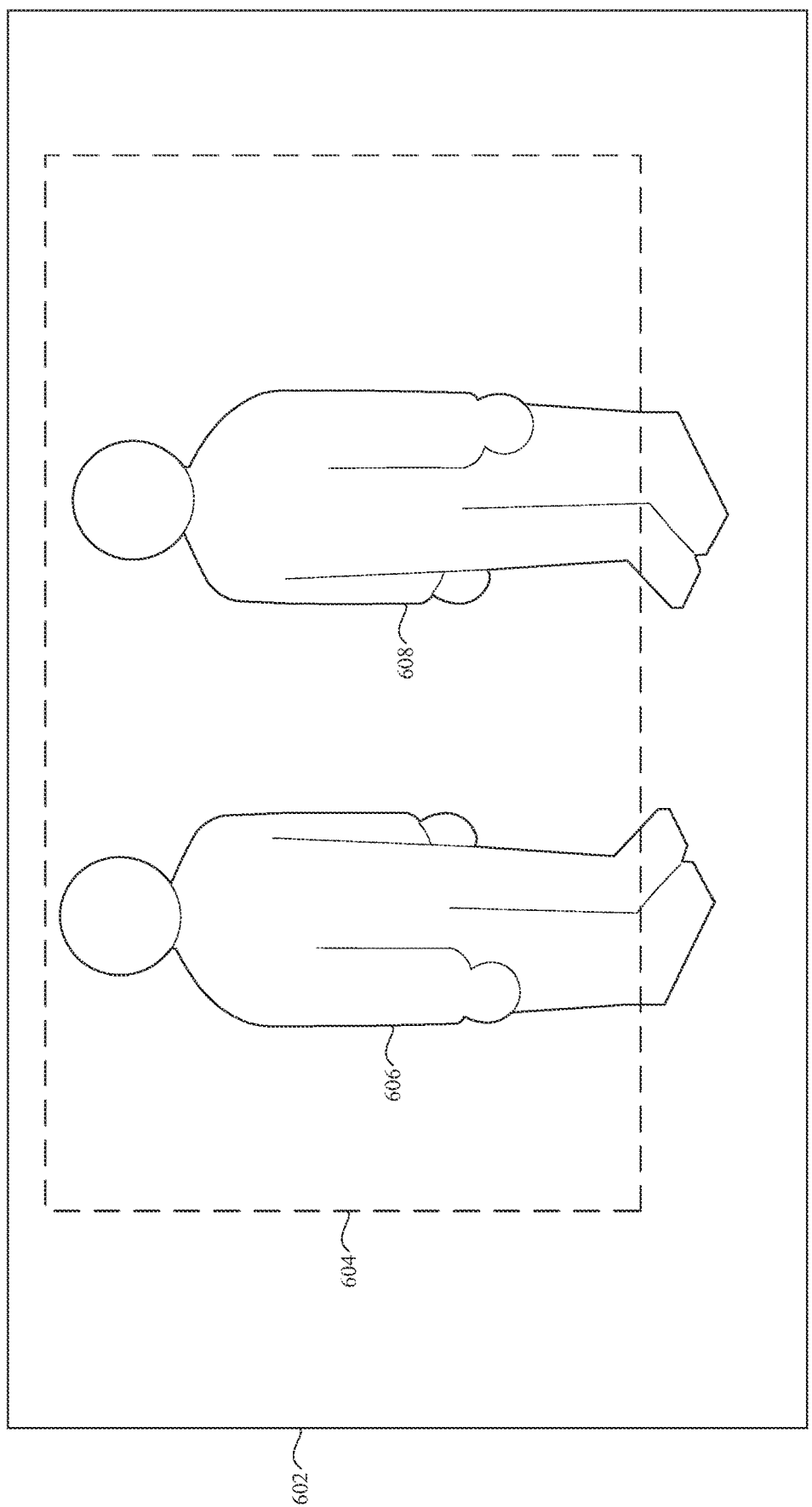

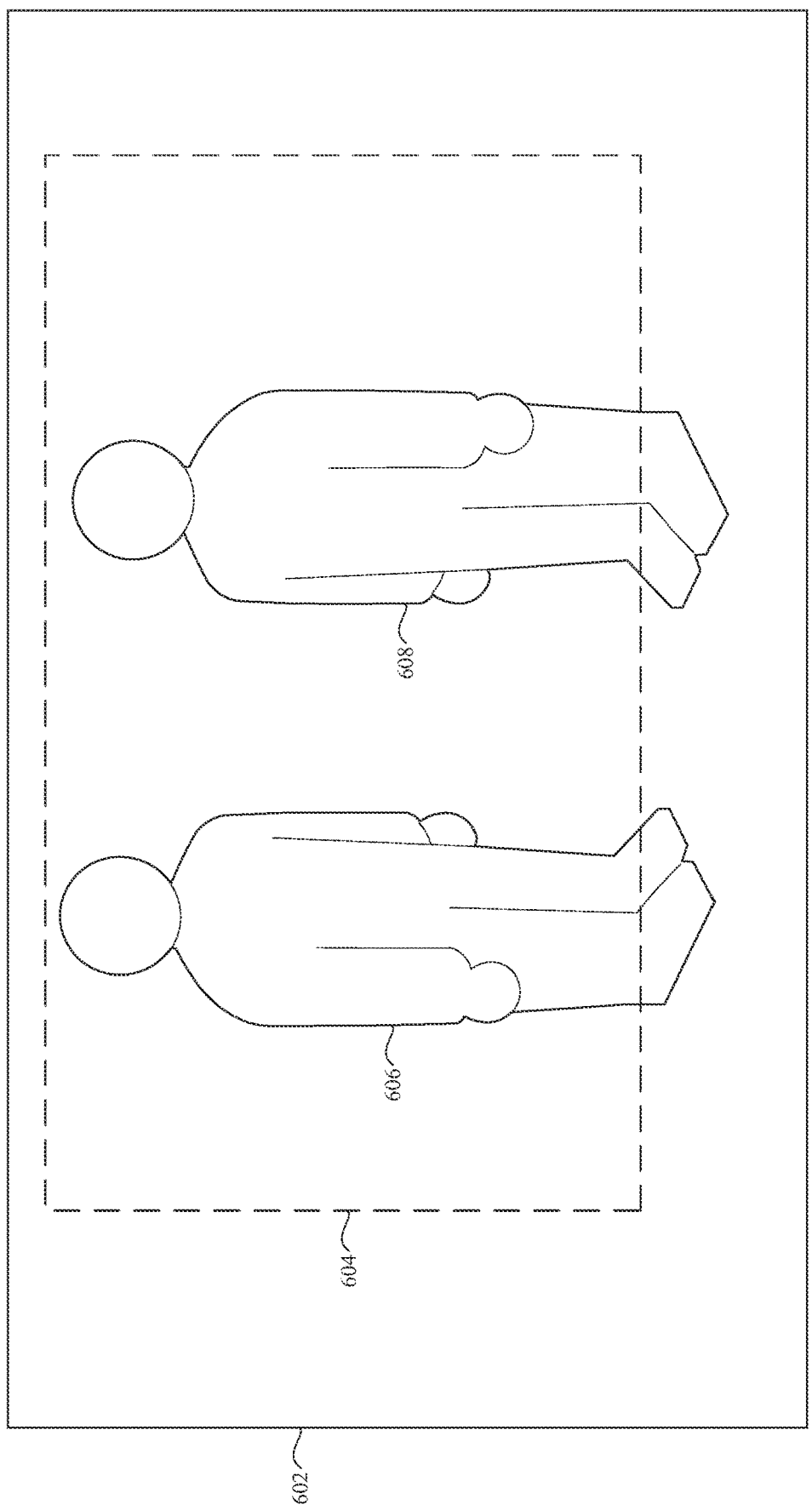
FIG. 6.4A

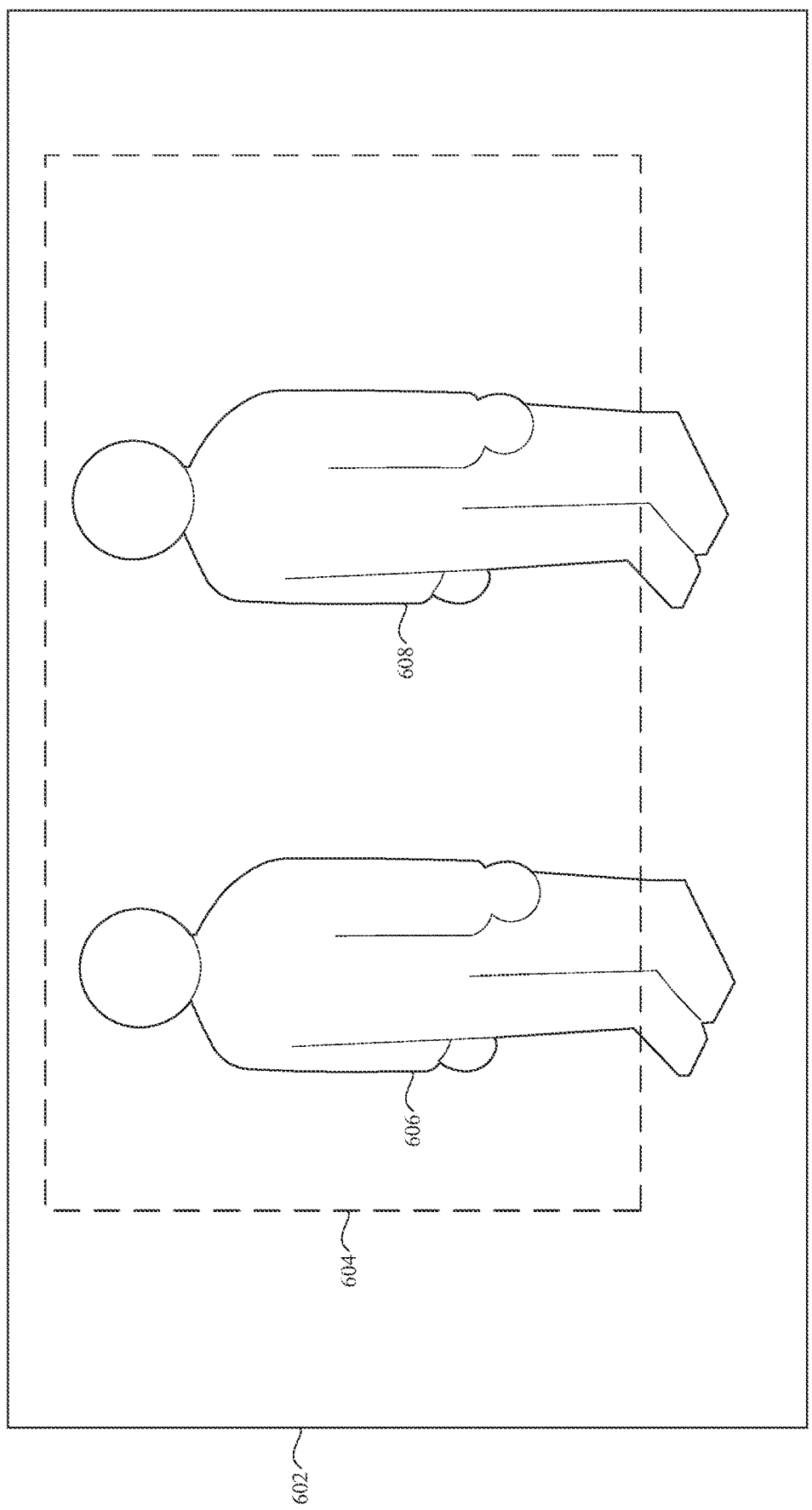

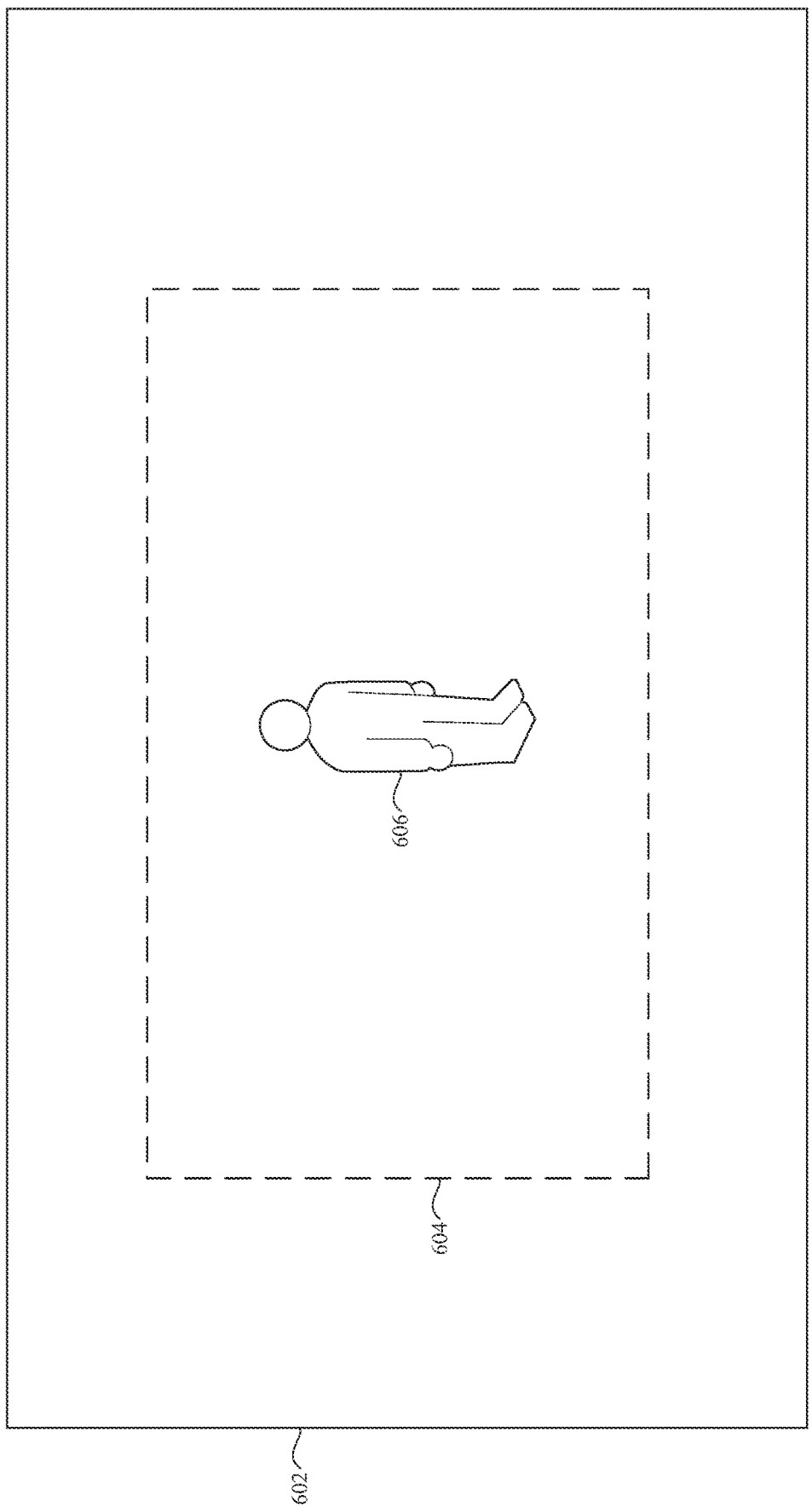

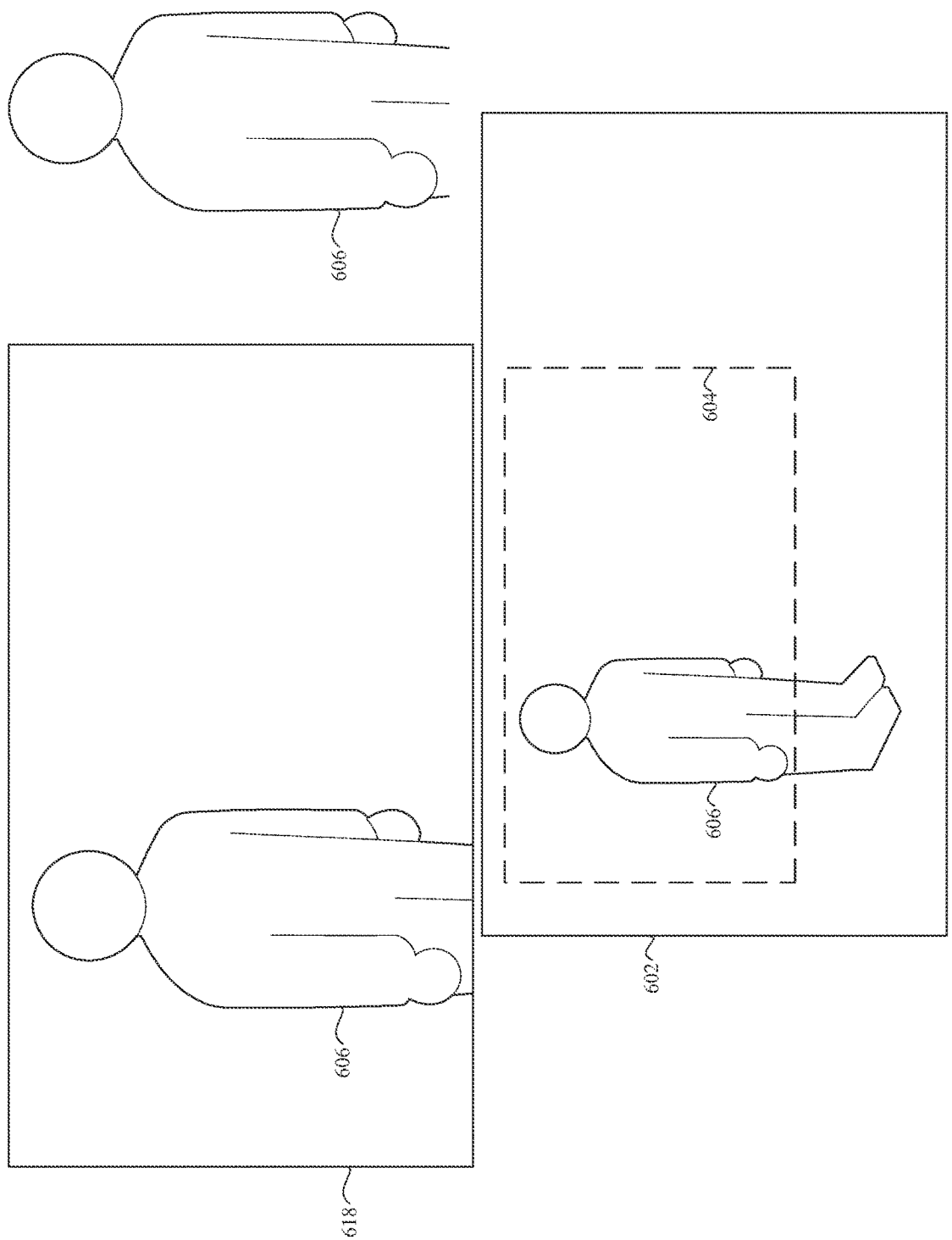

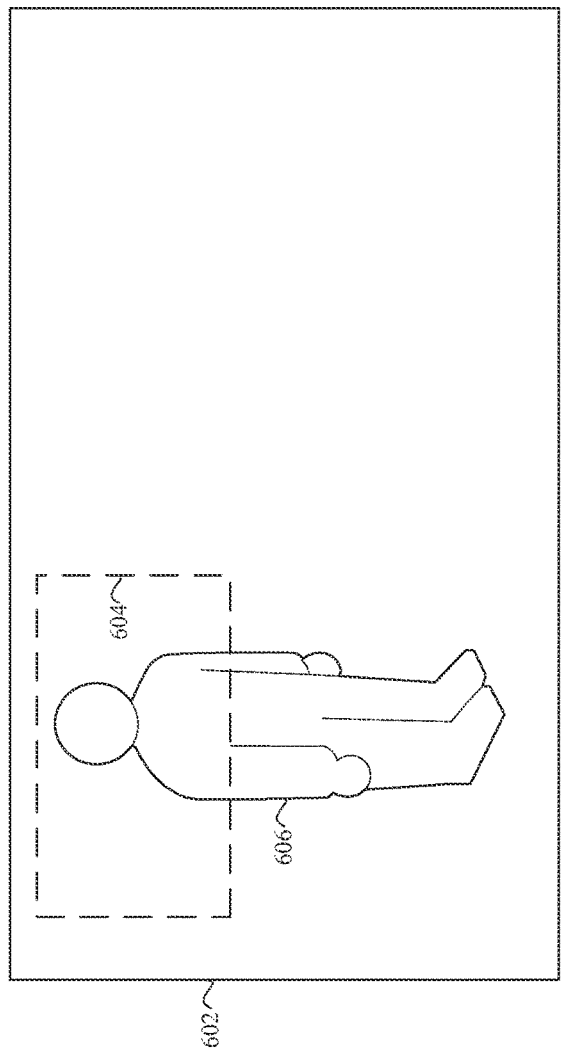
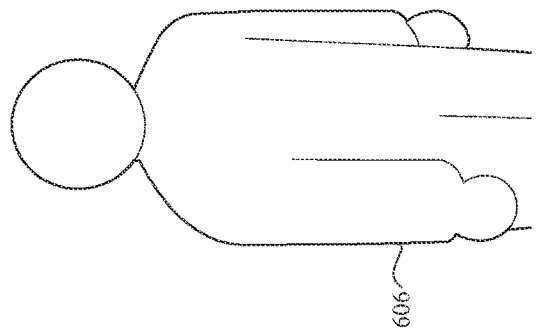
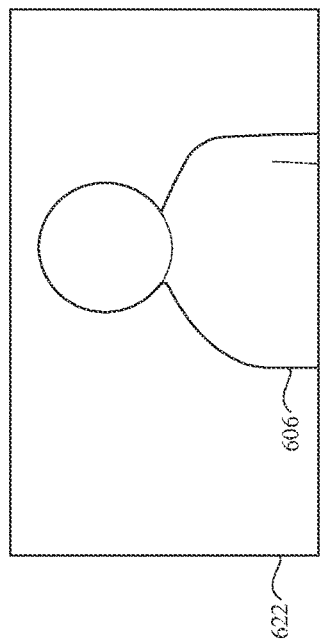
FIG. 6LL

AUTOMATIC CROPPING OF VIDEO CONTENT

CROSS REFERENCE TO RELATED APPLICATIONS

This application is a continuation of U.S. application Ser. No. 17/321,268 (now U.S. Publication No. 2022-0108419; published on Apr. 7, 2022) filed on May 14, 2021, which is a continuation of U.S. application Ser. No. 16/813,239 (now U.S. Pat. No. 11,010,867; issued on May 18, 2021) filed Mar. 9, 2020, which is a continuation of U.S. application Ser. No. 16/282,856 (now U.S. Pat. No. 10,587,810; issued on Mar. 10, 2020) filed Feb. 22, 2019, which is a continuation of U.S. application Ser. No. 14/850,677 (now U.S. Pat. No. 10,244,175; issued on Mar. 26, 2019) filed on Sep. 10, 2015, which claims the benefit of U.S. Provisional Application No. 62/130,311 filed on Mar. 9, 2015, the entire disclosures of which are herein incorporated by reference in their entirety for all purposes.

FIELD OF THE DISCLOSURE

The present disclosure relates generally to methods of processing video, and more specifically to the automatic cropping of video content.

BACKGROUND OF THE DISCLOSURE

Electronic devices are often equipped with a camera for capturing video content and/or a display for displaying video content. However, amateur users often capture video content without regard to composition, framing, or camera movement, resulting in video content that can be jarring or confusing to viewers.

Furthermore, for amateur users, determining a desirable cropping presentation while capturing video content can impose a heavy cognitive burden and a substantial time commitment, making the task so unappealing as to be avoided. Furthermore, inefficiencies in determining a desirable cropping presentation can cause unnecessary power consumption in battery powered devices.

SUMMARY OF THE DISCLOSURE

Electronic devices are often equipped with a camera for capturing video content and/or a display for displaying video content. However, amateur users often capture video content without regard to composition, framing, or camera movement, resulting in video content that can be jarring or confusing to viewers. There is a need to automate the processing and presentation of video content in an aesthetically pleasing manner. The embodiments described below provide a method of automatically cropping video content for presentation on a display.

BRIEF DESCRIPTION OF THE DRAWINGS

For a better understanding of the various described embodiments, reference should be made to the Detailed Description below, in conjunction with the following drawings in which like reference numerals refer to corresponding parts throughout the figures.

FIG. 4 illustrates an exemplary user interface for a multifunction device with a touch-sensitive surface that is separate from the display in accordance with some embodiments.

DETAILED DESCRIPTION

Figure 1A:
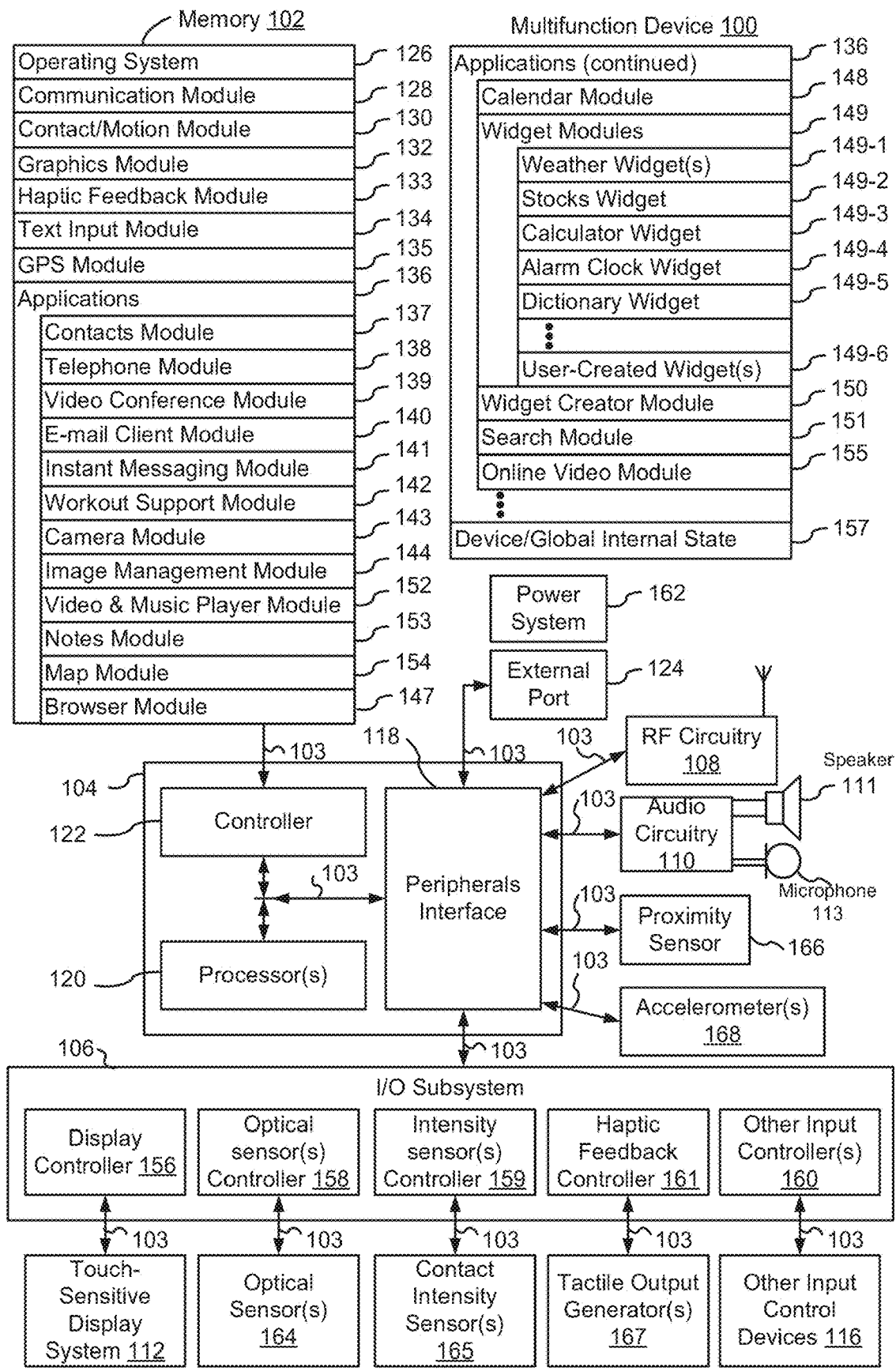
FIG. 1A is a block diagram illustrating a multifunction device with a touch-sensitive display in accordance with some embodiments.

In the following description of examples, reference is made to the accompanying drawings which form a part hereof, and in which it is shown by way of illustration specific examples that can be practiced. It is to be understood that other examples can be used and structural changes can be made without departing from the scope of the disclosed examples.

Electronic devices are often equipped with a camera for capturing video content and/or a display for displaying video content. However, amateur users often capture video content without regard to composition, framing, or camera movement, resulting in video content that can be jarring or confusing to viewers. There is a need to automate the processing and presentation of video content in an aesthetically pleasing manner. The embodiments described below provide a method of automatically cropping video content for presentation on a display.

Exemplary Devices

Embodiments of electronic devices, user interfaces for such devices, and associated processes for using such devices are described. In some embodiments, the device is a portable communications device, such as a mobile telephone, that also contains other functions, such as PDA and/or music player functions. Exemplary embodiments of portable multifunction devices include, without limitation, the iPhone®, iPod Touch®, and iPad® devices from Apple Inc. of Cupertino, California. Other portable electronic devices, such as laptops or tablet computers with touch-sensitive surfaces (e.g., touch screen displays and/or touch pads), are, optionally, used. It should also be understood that, in some embodiments, the device is not a portable communications device, but is a desktop computer or a television with a touch-sensitive surface (e.g., a touch screen display and/or a touch pad). In some embodiments, the device does not have a touch screen display and/or a touch pad, but rather is capable of outputting display information (such as the user interfaces of the disclosure) for display on a separate display device, and capable of receiving input information from a separate input device having one or more input mechanisms (such as one or more buttons, a touch screen display and/or a touch pad). In some embodiments, the device has a display, but is capable of receiving input information from a separate input device having one or more input mechanisms (such as one or more buttons, a touch screen display and/or a touch pad).

In the discussion that follows, an electronic device that includes a display and a touch-sensitive surface is described. It should be understood, however, that the electronic device optionally includes one or more other physical user-interface devices, such as a physical keyboard, a mouse and/or a joystick. Further, as described above, it should be understood that the described electronic device, display and touch-sensitive surface are optionally distributed amongst two or more devices. Therefore, as used in this disclosure, information displayed on the electronic device or by the electronic device is optionally used to describe information outputted by the electronic device for display on a separate display device (touch-sensitive or not). Similarly, as used in this disclosure, input received on the electronic device (e.g., touch input received on a touch-sensitive surface of the electronic device) is optionally used to describe input received on a separate input device, from which the electronic device receives input information.

The device typically supports a variety of applications, such as one or more of the following: a drawing application, a presentation application, a word processing application, a website creation application, a disk authoring application, a spreadsheet application, a gaming application, a telephone application, a video conferencing application, an e-mail application, an instant messaging application, a workout support application, a photo management application, a digital camera application, a digital video camera application, a web browsing application, a digital music player application, a television channel browsing application, and/ or a digital video player application.

The various applications that are executed on the device optionally use at least one common physical user-interface device, such as the touch-sensitive surface. One or more functions of the touch-sensitive surface as well as corresponding information displayed on the device are, optionally, adjusted and/or varied from one application to the next and/or within a respective application. In this way, a common physical architecture (such as the touch-sensitive surface) of the device optionally supports the variety of applications with user interfaces that are intuitive and transparent to the user.

Attention is now directed toward embodiments of portable or non-portable devices with touch-sensitive displays, though the devices need not include touch-sensitive displays or displays in general, as described above. FIG. 1A is a block diagram illustrating portable or non-portable multifunction device 100 with touch-sensitive displays 112 in accordance with some embodiments. Touch-sensitive display 112 is sometimes called a "touch screen" for convenience, and is sometimes known as or called a touch-sensitive display system. Device 100 includes memory 102 (which optionally includes one or more computer readable storage mediums), memory controller 122, one or more processing units (CPU's) 120, peripherals interface 118, RF circuitry 108, audio circuitry 110, speaker 111, microphone 113, input/ output (I/O) subsystem 106, other input or control devices 116, and external port 124. Device 100 optionally includes one or more optical sensors 164. Device 100 optionally includes one or more intensity sensors 165 for detecting intensity of contacts on device 100 (e.g., a touch-sensitive surface such as touch-sensitive display system 112 of device 100). Device 100 optionally includes one or more tactile output generators 167 for generating tactile outputs on device 100 (e.g., generating tactile outputs on a touch-sensitive surface such as touch-sensitive display system 112 of device 100 or touchpad 355 of device 300). These components optionally communicate over one or more communication buses or signal lines 103.

As used in the specification and claims, the term "intensity" of a contact on a touch-sensitive surface refers to the force or pressure (force per unit area) of a contact (e.g., a finger contact) on the touch-sensitive surface, or to a substitute (proxy) for the force or pressure of a contact on the touch-sensitive surface. The intensity of a contact has a range of values that includes at least four distinct values and more typically includes hundreds of distinct values (e.g., at least 256). Intensity of a contact is, optionally, determined (or measured) using various approaches and various sensors or combinations of sensors. For example, one or more force sensors underneath or adjacent to the touch-sensitive surface are, optionally, used to measure force at various points on the touch-sensitive surface. In some implementations, force measurements from multiple force sensors are combined (e.g., a weighted average) to determine an estimated force of a contact. Similarly, a pressure-sensitive tip of a stylus is, optionally, used to determine a pressure of the stylus on the touch-sensitive surface. Alternatively, the size of the contact area detected on the touch-sensitive surface and/or changes thereto, the capacitance of the touch-sensitive surface proximate to the contact and/or changes thereto, and/or the resistance of the touch-sensitive surface proximate to the contact and/or changes thereto are, optionally, used as a substitute for the force or pressure of the contact on the touch-sensitive surface. In some implementations, the substitute measurements for contact force or pressure are used directly to determine whether an intensity threshold has been exceeded (e.g., the intensity threshold is described in units corresponding to the substitute measurements). In some implementations, the substitute measurements for contact force or pressure are converted to an estimated force or pressure and the estimated force or pressure is used to determine whether an intensity threshold has been exceeded (e.g., the intensity threshold is a pressure threshold measured in units of pressure).

As used in the specification and claims, the term "tactile output" refers to physical displacement of a device relative to a previous position of the device, physical displacement of a component (e.g., a touch-sensitive surface) of a device relative to another component (e.g., housing) of the device, or displacement of the component relative to a center of mass of the device that will be detected by a user with the user's sense of touch. For example, in situations where the device or the component of the device is in contact with a surface of a user that is sensitive to touch (e.g., a finger, palm, or other part of a user's hand), the tactile output generated by the physical displacement will be interpreted by the user as a tactile sensation corresponding to a perceived change in physical characteristics of the device or the component of the device. For example, movement of a touch-sensitive surface (e.g., a touch-sensitive display or trackpad) is, optionally, interpreted by the user as a "down click" or "up click" of a physical actuator button. In some cases, a user will feel a tactile sensation such as an "down click" or "up click" even when there is no movement of a physical actuator button associated with the touch-sensitive surface that is physically pressed (e.g., displaced) by the user's movements. As another example, movement of the touch-sensitive surface is, optionally, interpreted or sensed by the user as "roughness" of the touch-sensitive surface, even when there is no change in smoothness of the touch-sensitive surface. While such interpretations of touch by a user will be subject to the individualized sensory perceptions of the user, there are many sensory perceptions of touch that are common to a large majority of users. Thus, when a tactile output is described as corresponding to a particular sensory perception of a user (e.g., an "up click," a "down click," "roughness"), unless otherwise stated, the generated tactile output corresponds to physical displacement of the device or a component thereof that will generate the described sensory perception for a typical (or average) user.

It should be appreciated that device 100 is only one example of a portable or non-portable multifunction device, and that device 100 optionally has more or fewer components than shown, optionally combines two or more components, or optionally has a different configuration or arrangement of the components. The various components shown in FIG. 1A are implemented in hardware, software, or a combination of both hardware and software, including one or more signal processing and/or application specific integrated circuits. Further, the various components shown in FIG. 1A are optionally implemented across two or more devices; for example, a display and audio circuitry on a display device, a touch-sensitive surface on an input device, and remaining components on device 100. In such an embodiment, device 100 optionally communicates with the display device and/or the input device to facilitate operation of the system, as described in the disclosure, and the various components described herein that relate to display and/or input remain in device 100, or are optionally included in the display and/or input device, as appropriate.

Memory 102 optionally includes high-speed random access memory and optionally also includes non-volatile memory, such as one or more magnetic disk storage devices, flash memory devices, or other non-volatile solid-state memory devices. Access to memory 102 by other components of device 100, such as CPU 120 and the peripherals interface 118, is, optionally, controlled by memory controller 122.

Peripherals interface 118 can be used to couple input and output peripherals of the device to CPU 120 and memory 102. The one or more processors 120 run or execute various software programs and/or sets of instructions stored in memory 102 to perform various functions for device 100 and to process data.

In some embodiments, peripherals interface 118, CPU 120, and memory controller 122 are, optionally, implemented on a single chip, such as chip 104. In some other embodiments, they are, optionally, implemented on separate chips.

RF (radio frequency) circuitry 108 receives and sends RF signals, also called electromagnetic signals. RF circuitry 108 converts electrical signals to/from electromagnetic signals and communicates with communications networks and other communications devices via the electromagnetic signals. RF circuitry 108 optionally includes well-known circuitry for performing these functions, including but not limited to an antenna system, an RF transceiver, one or more amplifiers, a tuner, one or more oscillators, a digital signal processor, a CODEC chipset, a subscriber identity module (SIM) card, memory, and so forth. RF circuitry 108 optionally communicates with networks, such as the Internet, also referred to as the World Wide Web (WWW), an intranet and/or a wireless network, such as a cellular telephone network, a wireless local area network (LAN) and/or a metropolitan area network (MAN), and other devices by wireless communication. The wireless communication optionally uses any of a plurality of communications standards, protocols and technologies, including but not limited to Global System for Mobile Communications (GSM), Enhanced Data GSM Environment (EDGE), high-speed downlink packet access (HSDPA), high-speed uplink packet access (HSUPA), Evolution, Data-Only (EV-DO), HSPA, HSPA+, Dual-Cell HSPA (DC-HSPDA), long term evolution (LTE), near field communication (NFC), wideband code division multiple access (W-CDMA), code division multiple access (CDMA), time division multiple access (TDMA), Bluetooth, Wireless Fidelity (Wi-Fi) (e.g., IEEE 802.11a, IEEE 802.11b, IEEE 802.11g and/or IEEE 802.11n), voice over Internet Protocol (VoIP), Wi-MAX, a protocol for e-mail (e.g., Internet message access protocol (IMAP) and/or post office protocol (POP)), instant messaging (e.g., extensible messaging and presence protocol (XMPP), Session Initiation Protocol for Instant Messaging and Presence Leveraging Extensions (SIMPLE), Instant Messaging and Presence Service (IMPS)), and/or Short Message Service (SMS), or any other suitable communication protocol, including communication protocols not yet developed as of the filing date of this document.

Audio circuitry 110, speaker 111, and microphone 113 provide an audio interface between a user and device 100. Audio circuitry 110 receives audio data from peripherals interface 118, converts the audio data to an electrical signal, and transmits the electrical signal to speaker 111. Speaker 111 converts the electrical signal to human-audible sound waves. Audio circuitry 110 also receives electrical signals converted by microphone 113 from sound waves. Audio circuitry 110 converts the electrical signal to audio data and transmits the audio data to peripherals interface 118 for processing. Audio data is, optionally, retrieved from and/or transmitted to memory 102 and/or RF circuitry 108 by peripherals interface 118. In some embodiments, audio circuitry 110 also includes a headset jack (e.g., 212, FIG. 2). The headset jack provides an interface between audio circuitry 110 and removable audio input/output peripherals, such as output-only headphones or a headset with both output (e.g., a headphone for one or both ears) and input (e.g., a microphone).

I/O subsystem 106 couples input/output peripherals on device 100, such as touch screen 112 and other input control devices 116, to peripherals interface 118. I/O subsystem 106 optionally includes display controller 156, optical sensor controller 158, intensity sensor controller 159, haptic feedback controller 161 and one or more input controllers 160 for other input or control devices. The one or more input controllers 160 receive/send electrical signals from/to other input or control devices 116. The other input control devices 116 optionally include physical buttons (e.g., push buttons, rocker buttons, etc.), dials, slider switches, joysticks, click wheels, and so forth. In some alternate embodiments, input controller(s) 160 are, optionally, coupled to any (or none) of the following: a keyboard, infrared port, USB port, and a pointer device such as a mouse. The one or more buttons (e.g., 208, FIG. 2) optionally include an up/down button for volume control of speaker 111 and/or microphone 113. The one or more buttons optionally include a push button (e.g., 206, FIG. 2).

Touch-sensitive display 112 provides an input interface and an output interface between the device and a user. As described above, the touch-sensitive operation and the display operation of touch-sensitive display 112 are optionally separated from each other, such that a display device is used for display purposes and a touch-sensitive surface (whether display or not) is used for input detection purposes, and the described components and functions are modified accordingly. However, for simplicity, the following description is provided with reference to a touch-sensitive display. Display controller 156 receives and/or sends electrical signals from/to touch screen 112. Touch screen 112 displays visual output to the user. The visual output optionally includes graphics, text, icons, video, and any combination thereof (collectively termed "graphics"). In some embodiments, some or all of the visual output corresponds to user-interface objects.

Touch screen 112 has a touch-sensitive surface, sensor or set of sensors that accepts input from the user based on haptic and/or tactile contact. Touch screen 112 and display controller 156 (along with any associated modules and/or sets of instructions in memory 102) detect contact (and any movement or breaking of the contact) on touch screen 112 and converts the detected contact into interaction with user-interface objects (e.g., one or more soft keys, icons, web pages or images) that are displayed on touch screen 112. In an exemplary embodiment, a point of contact between touch screen 112 and the user corresponds to a finger of the user.

Touch screen 112 optionally uses LCD (liquid crystal display) technology, LPD (light emitting polymer display) technology, or LED (light emitting diode) technology, although other display technologies are used in other embodiments. Touch screen 112 and display controller 156 optionally detect contact and any movement or breaking thereof using any of a plurality of touch sensing technologies now known or later developed, including but not limited to capacitive, resistive, infrared, and surface acoustic wave technologies, as well as other proximity sensor arrays or other elements for determining one or more points of contact with touch screen 112. In an exemplary embodiment, projected mutual capacitance sensing technology is used, such as that found in the iPhone®, iPod Touch®, and iPad® from Apple Inc. of Cupertino, California.

Touch screen 112 optionally has a video resolution in excess of 100 dpi. In some embodiments, the touch screen has a video resolution of approximately 160 dpi. The user optionally makes contact with touch screen 112 using any suitable object or appendage, such as a stylus, a finger, and so forth. In some embodiments, the user interface is designed to work primarily with finger-based contacts and gestures, which can be less precise than stylus-based input due to the larger area of contact of a finger on the touch screen. In some embodiments, the device translates the rough finger-based input into a precise pointer/cursor position or command for performing the actions desired by the user.

In some embodiments, in addition to the touch screen, device 100 optionally includes a touchpad (not shown) for activating or deactivating particular functions. In some embodiments, the touchpad is a touch-sensitive area of the device that, unlike the touch screen, does not display visual output. The touchpad is, optionally, a touch-sensitive surface that is separate from touch screen 112 or an extension of the touch-sensitive surface formed by the touch screen.

Device 100 also includes power system 162 for powering the various components. Power system 162 optionally includes a power management system, one or more power sources (e.g., battery, alternating current (AC)), a recharging system, a power failure detection circuit, a power converter or inverter, a power status indicator (e.g., a light-emitting diode (LED)) and any other components associated with the generation, management and distribution of power in portable or non-portable devices.

Device 100 optionally also includes one or more optical sensors 164. FIG. 1A shows an optical sensor coupled to optical sensor controller 158 in I/O subsystem 106. Optical sensor 164 optionally includes charge-coupled device (CCD) or complementary metal-oxide semiconductor (CMOS) phototransistors. Optical sensor 164 receives light from the environment, projected through one or more lens, and converts the light to data representing an image. In conjunction with imaging module 143 (also called a camera module), optical sensor 164 optionally captures still images or video. In some embodiments, an optical sensor is located on the back of device 100, opposite touch screen display 112 on the front of the device, so that the touch screen display is enabled for use as a viewfinder for still and/or video image acquisition. In some embodiments, another optical sensor is located on the front of the device so that the user's image is, optionally, obtained for videoconferencing while the user views the other video conference participants on the touch screen display.

Device 100 optionally also includes one or more contact intensity sensors 165. FIG. 1A shows a contact intensity sensor coupled to intensity sensor controller 159 in I/O subsystem 106. Contact intensity sensor 165 optionally includes one or more piezoresistive strain gauges, capacitive force sensors, electric force sensors, piezoelectric force sensors, optical force sensors, capacitive touch-sensitive surfaces, or other intensity sensors (e.g., sensors used to measure the force (or pressure) of a contact on a touch-sensitive surface). Contact intensity sensor 165 receives contact intensity information (e.g., pressure information or a proxy for pressure information) from the environment. In some embodiments, at least one contact intensity sensor is collocated with, or proximate to, a touch-sensitive surface (e.g., touch-sensitive display system 112). In some embodiments, at least one contact intensity sensor is located on the back of device 100, opposite touch screen display 112 which is located on the front of device 100.

Device 100 optionally also includes one or more proximity sensors 166. FIG. 1A shows proximity sensor 166 coupled to peripherals interface 118. Alternately, proximity sensor 166 is coupled to input controller 160 in I/O subsystem 106. In some embodiments, the proximity sensor turns off and disables touch screen 112 when the multifunction device is placed near the user's ear (e.g., when the user is making a phone call).

Device 100 optionally also includes one or more tactile output generators 167. FIG. 1A shows a tactile output generator coupled to haptic feedback controller 161 in I/O subsystem 106. Tactile output generator 167 optionally includes one or more electroacoustic devices such as speakers or other audio components and/or electromechanical devices that convert energy into linear motion such as a motor, solenoid, electroactive polymer, piezoelectric actuator, electrostatic actuator, or other tactile output generating component (e.g., a component that converts electrical signals into tactile outputs on the device). Contact intensity sensor 165 receives tactile feedback generation instructions from haptic feedback module 133 and generates tactile outputs on device 100 that are capable of being sensed by a user of device 100. In some embodiments, at least one tactile output generator is collocated with, or proximate to, a touch-sensitive surface (e.g., touch-sensitive display system 112) and, optionally, generates a tactile output by moving the touch-sensitive surface vertically (e.g., in/out of a surface of device 100) or laterally (e.g., back and forth in the same plane as a surface of device 100). In some embodiments, at least one tactile output generator sensor is located on the back of device 100, opposite touch screen display 112 which is located on the front of device 100.

Device 100 optionally also includes one or more accelerometers 168. FIG. 1A shows accelerometer 168 coupled to peripherals interface 118. Alternately, accelerometer 168 is, optionally, coupled to an input controller 160 in I/O subsystem 106. In some embodiments, information is displayed on the touch screen display in a portrait view or a landscape view based on an analysis of data received from the one or more accelerometers. Device 100 optionally includes, in addition to accelerometer(s) 168, a magnetometer (not shown) and a GPS (or GLONASS or other global navigation system) receiver (not shown) for obtaining information concerning the location and orientation (e.g., portrait or landscape) of device 100.

Figure 3:
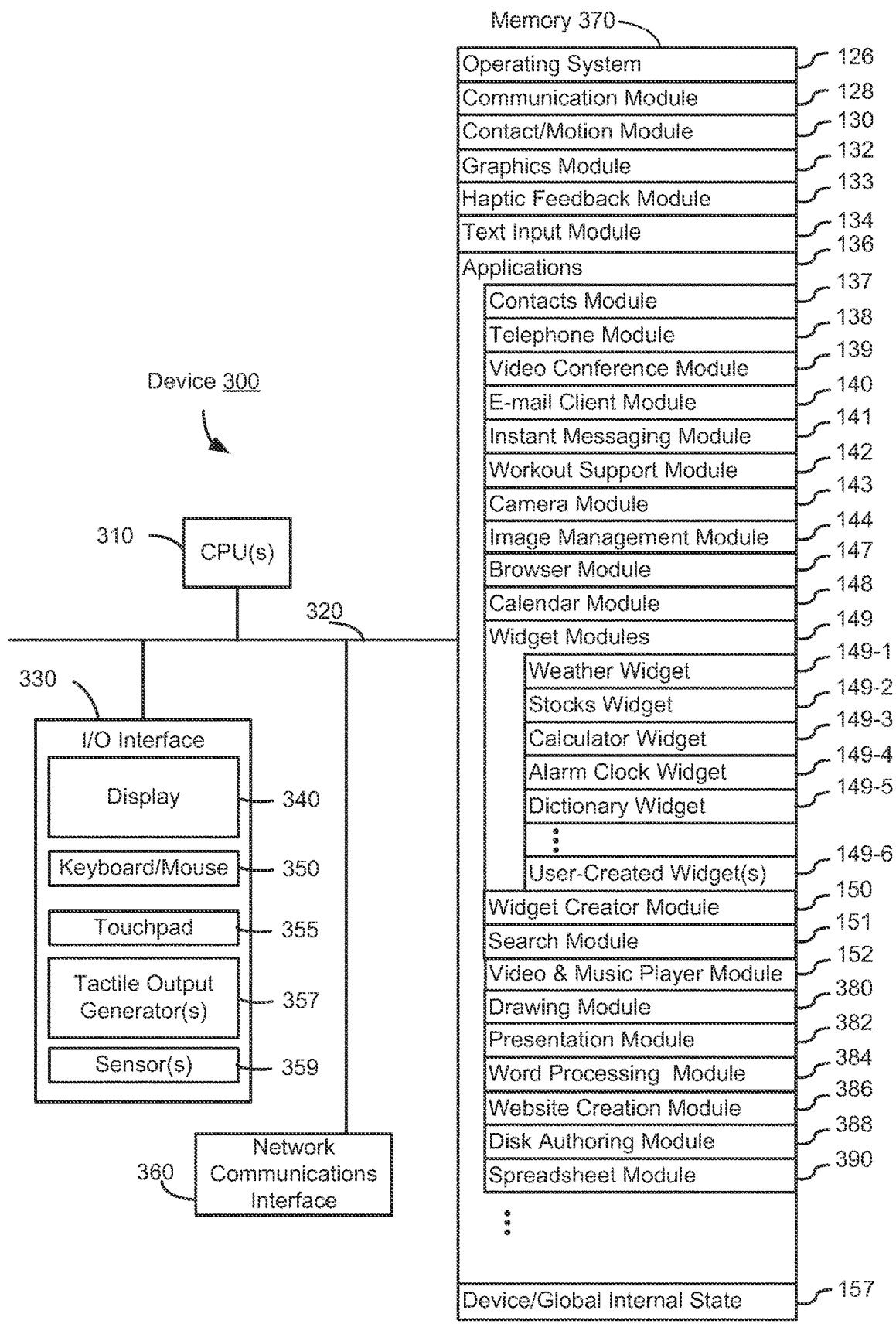
FIG. 3 is a block diagram of an exemplary multifunction device with a display and a touch-sensitive surface in accordance with some embodiments.

In some embodiments, the software components stored in memory 102 include operating system 126, communication module (or set of instructions) 128, contact/motion module (or set of instructions) 130, graphics module (or set of instructions) 132, text input module (or set of instructions) 134, Global Positioning System (GPS) module (or set of instructions) 135, and applications (or sets of instructions) 136. Furthermore, in some embodiments memory 102 stores device/global internal state 157, as shown in FIGS. 1A and 3. Device/global internal state 157 includes one or more of: active application state, indicating which applications, if any, are currently active; display state, indicating what applications, views or other information occupy various regions of touch screen display 112; sensor state, including information obtained from the device's various sensors and input control devices 116; and location information concerning the device's location and/or attitude.

Operating system 126 (e.g., Darwin, RTXC, LINUX, UNIX, OS X, WINDOWS, or an embedded operating system such as VxWorks) includes various software components and/or drivers for controlling and managing general system tasks (e.g., memory management, storage device control, power management, etc.) and facilitates communication between various hardware and software components.

Communication module 128 facilitates communication with other devices over one or more external ports 124 and also includes various software components for handling data received by RF circuitry 108 and/or external port 124. External port 124 (e.g., Universal Serial Bus (USB), FIRE-WIRE, etc.) is adapted for coupling directly to other devices or indirectly over a network (e.g., the Internet, wireless LAN, etc.). In some embodiments, the external port is a multi-pin (e.g., 30-pin) connector that is the same as, or similar to and/or compatible with the 30-pin connector used on iPod (trademark of Apple Inc.) devices.

Contact/motion module 130 optionally detects contact with touch screen 112 (in conjunction with display controller 156) and other touch-sensitive devices (e.g., a touchpad or physical click wheel). Contact/motion module 130 includes various software components for performing various operations related to detection of contact, such as determining if contact has occurred (e.g., detecting a finger-down event), determining an intensity of the contact (e.g., the force or pressure of the contact or a substitute for the force or pressure of the contact) determining if there is movement of the contact and tracking the movement across the touch-sensitive surface (e.g., detecting one or more finger-dragging events), and determining if the contact has ceased (e.g., detecting a finger-up event or a break in contact). Contact/motion module 130 receives contact data from the touch-sensitive surface. Determining movement of the point of contact, which is represented by a series of contact data, optionally includes determining speed (magnitude), velocity (magnitude and direction), and/or an acceleration (a change in magnitude and/or direction) of the point of contact. These operations are, optionally, applied to single contacts (e.g., one finger contacts) or to multiple simultaneous contacts (e.g., "multitouch"/multiple finger contacts). In some embodiments, contact/motion module 130 and display controller 156 detect contact on a touchpad.

In some embodiments, contact/motion module 130 uses a set of one or more intensity thresholds to determine whether an operation has been performed by a user (e.g., to determine whether a user has "clicked" on an icon). In some embodiments at least a subset of the intensity thresholds are determined in accordance with software parameters (e.g., the intensity thresholds are not determined by the activation thresholds of particular physical actuators and can be adjusted without changing the physical hardware of device 100). For example, a mouse "click" threshold of a trackpad or touch screen display can be set to any of a large range of predefined thresholds values without changing the trackpad or touch screen display hardware. Additionally, in some implementations a user of the device is provided with software settings for adjusting one or more of the set of intensity thresholds (e.g., by adjusting individual intensity thresholds and/or by adjusting a plurality of intensity thresholds at once with a system-level click "intensity" parameter).

Contact/motion module 130 optionally detects a gesture input by a user. Different gestures on the touch-sensitive surface have different contact patterns and intensities. Thus, a gesture is, optionally, detected by detecting a particular contact pattern. For example, detecting a finger tap gesture includes detecting a finger-down event followed by detecting a finger-up (lift off) event at the same position (or substantially the same position) as the finger-down event (e.g., at the position of an icon). As another example, detecting a finger swipe gesture on the touch-sensitive surface includes detecting a finger-down event followed by detecting one or more finger-dragging events, and subsequently followed by detecting a finger-up (lift off) event.

Graphics module 132 includes various known software components for rendering and displaying graphics on touch screen 112 or other display, including components for changing the visual impact (e.g., brightness, transparency, saturation, contrast or other visual property) of graphics that are displayed. As used herein, the term "graphics" includes any object that can be displayed to a user, including without limitation text, web pages, icons (such as user-interface objects including soft keys), digital images, videos, animations and the like.

In some embodiments, graphics module 132 stores data representing graphics to be used. Each graphic is, optionally, assigned a corresponding code. Graphics module 132 receives, from applications etc., one or more codes specifying graphics to be displayed along with, if necessary, coordinate data and other graphic property data, and then generates screen image data to output to display controller 156.

Haptic feedback module 133 includes various software components for generating instructions used by tactile output generator(s) 167 to produce tactile outputs at one or more locations on device 100 in response to user interactions with device 100.

Text input module 134, which is, optionally, a component of graphics module 132, provides soft keyboards for entering text in various applications (e.g., contacts 137, e-mail client module 140, IM 141, browser 147, and any other application that needs text input).

GPS module 135 determines the location of the device and provides this information for use in various applications (e.g., to telephone module 138 for use in location-based dialing, to camera module 143 as picture/video metadata, and to applications that provide location-based services such as weather widgets, local yellow page widgets, and map/navigation widgets).

Applications 136 optionally include the following modules (or sets of instructions), or a subset or superset thereof:
  contacts module 137 (sometimes called an address book or contact list);
  telephone module 138;
  video conferencing module 139;
  e-mail client module 140;
  instant messaging (IM) module 141;
  workout support module 142;
  camera module 143 for still and/or video images;
  image management module 144;
  browser module 147;
  calendar module 148;
  widget modules 149, which optionally include one or more of: weather widget 149-1, stocks widget 149-2, calculator widget 149-3, alarm clock widget 149-4, dictionary widget 149-5, and other widgets obtained by the user, as well as user-created widgets 149-6;
  widget creator module 150 for making user-created widgets 149-6;
  search module 151;
  video and music player module 152, which is, optionally, made up of a video player module and a music player module;
  notes module 153;
  map module 154;
  online video module 155.

Examples of other applications 136 that are, optionally, stored in memory 102 include other word processing applications, other image editing applications, drawing applications, presentation applications, JAVA-enabled applications, encryption, digital rights management, voice recognition, and voice replication.

In conjunction with touch screen 112, display controller 156, contact module 130, graphics module 132, and text input module 134, contacts module 137 are, optionally, used to manage an address book or contact list (e.g., stored in application internal state 192 of contacts module 137 in memory 102 or memory 370), including: adding name(s) to the address book; deleting name(s) from the address book; associating telephone number(s), e-mail address(es), physical address(es) or other information with a name; associating an image with a name; categorizing and sorting names; providing telephone numbers or e-mail addresses to initiate and/or facilitate communications by telephone 138, video conference 139, e-mail 140, or IM 141; and so forth.

In conjunction with RF circuitry 108, audio circuitry 110, speaker 111, microphone 113, touch screen 112, display controller 156, contact module 130, graphics module 132, and text input module 134, telephone module 138 are, optionally, used to enter a sequence of characters corresponding to a telephone number, access one or more telephone numbers in address book 137, modify a telephone number that has been entered, dial a respective telephone number, conduct a conversation and disconnect or hang up when the conversation is completed. As noted above, the wireless communication optionally uses any of a plurality of communications standards, protocols and technologies.

In conjunction with RF circuitry 108, audio circuitry 110, speaker 111, microphone 113, touch screen 112, display controller 156, optical sensor 164, optical sensor controller 158, contact module 130, graphics module 132, text input module 134, contact list 137, and telephone module 138, videoconferencing module 139 includes executable instructions to initiate, conduct, and terminate a video conference between a user and one or more other participants in accordance with user instructions.

In conjunction with RF circuitry 108, touch screen 112, display controller 156, contact module 130, graphics module 132, and text input module 134, e-mail client module 140 includes executable instructions to create, send, receive, and manage e-mail in response to user instructions. In conjunction with image management module 144, e-mail client module 140 makes it very easy to create and send e-mails with still or video images taken with camera module 143.

In conjunction with RF circuitry 108, touch screen 112, display controller 156, contact module 130, graphics module 132, and text input module 134, the instant messaging module 141 includes executable instructions to enter a sequence of characters corresponding to an instant message, to modify previously entered characters, to transmit a respective instant message (for example, using a Short Message Service (SMS) or Multimedia Message Service (MMS) protocol for telephony-based instant messages or using XMPP, SIMPLE, or IMPS for Internet-based instant messages), to receive instant messages and to view received instant messages. In some embodiments, transmitted and/or received instant messages optionally include graphics, photos, audio files, video files and/or other attachments as are supported in a MMS and/or an Enhanced Messaging Service (EMS). As used herein, "instant messaging" refers to both telephony-based messages (e.g., messages sent using SMS or MMS) and Internet-based messages (e.g., messages sent using XMPP, SIMPLE, or IMPS).

In conjunction with RF circuitry 108, touch screen 112, display controller 156, contact module 130, graphics module 132, text input module 134, GPS module 135, map module 154, and music player module 146, workout support module 142 includes executable instructions to create workouts (e.g., with time, distance, and/or calorie burning goals); communicate with workout sensors (sports devices); receive workout sensor data; calibrate sensors used to monitor a workout; select and play music for a workout; and display, store and transmit workout data.

In conjunction with touch screen 112, display controller 156, optical sensor(s) 164, optical sensor controller 158, contact module 130, graphics module 132, and image management module 144, camera module 143 includes executable instructions to capture still images or video (including a video stream) and store them into memory 102, modify characteristics of a still image or video, or delete a still image or video from memory 102.

In conjunction with touch screen 112, display controller 156, contact module 130, graphics module 132, text input module 134, and camera module 143, image management module 144 includes executable instructions to arrange, modify (e.g., edit), or otherwise manipulate, label, delete, present (e.g., in a digital slide show or album), and store still and/or video images.

In conjunction with RF circuitry 108, touch screen 112, display system controller 156, contact module 130, graphics module 132, and text input module 134, browser module 147 includes executable instructions to browse the Internet in accordance with user instructions, including searching, linking to, receiving, and displaying web pages or portions thereof, as well as attachments and other files linked to web pages.

In conjunction with RF circuitry 108, touch screen 112, display system controller 156, contact module 130, graphics module 132, text input module 134, e-mail client module 140, and browser module 147, calendar module 148 includes executable instructions to create, display, modify, and store calendars and data associated with calendars (e.g., calendar entries, to do lists, etc.) in accordance with user instructions.

In conjunction with RF circuitry 108, touch screen 112, display system controller 156, contact module 130, graphics module 132, text input module 134, and browser module 147, widget modules 149 are mini-applications that are, optionally, downloaded and used by a user (e.g., weather widget 149-1, stocks widget 149-2, calculator widget 149-3, alarm clock widget 149-4, and dictionary widget 149-5) or created by the user (e.g., user-created widget 149-6). In some embodiments, a widget includes an HTML (Hypertext Markup Language) file, a CSS (Cascading Style Sheets) file, and a JavaScript file. In some embodiments, a widget includes an XML (Extensible Markup Language) file and a JavaScript file (e.g., Yahoo! Widgets).

In conjunction with RF circuitry 108, touch screen 112, display system controller 156, contact module 130, graphics module 132, text input module 134, and browser module 147, the widget creator module 150 are, optionally, used by a user to create widgets (e.g., turning a user-specified portion of a web page into a widget).

In conjunction with touch screen 112, display system controller 156, contact module 130, graphics module 132, and text input module 134, search module 151 includes executable instructions to search for text, music, sound, image, video, and/or other files in memory 102 that match one or more search criteria (e.g., one or more user-specified search terms) in accordance with user instructions.

In conjunction with touch screen 112, display system controller 156, contact module 130, graphics module 132, audio circuitry 110, speaker 111, RF circuitry 108, and browser module 147, video and music player module 152 includes executable instructions that allow the user to download and play back recorded music and other sound files stored in one or more file formats, such as MP3 or AAC files, and executable instructions to display, present or otherwise play back videos (e.g., on touch screen 112 or on an external, connected display via external port 124). In some embodiments, device 100 optionally includes the functionality of an MP3 player, such as an iPod (trademark of Apple Inc.).

In conjunction with touch screen 112, display controller 156, contact module 130, graphics module 132, and text input module 134, notes module 153 includes executable instructions to create and manage notes, to do lists, and the like in accordance with user instructions.

In conjunction with RF circuitry 108, touch screen 112, display system controller 156, contact module 130, graphics module 132, text input module 134, GPS module 135, and browser module 147, map module 154 are, optionally, used to receive, display, modify, and store maps and data associated with maps (e.g., driving directions; data on stores and other points of interest at or near a particular location; and other location-based data) in accordance with user instructions.

In conjunction with touch screen 112, display system controller 156, contact module 130, graphics module 132, audio circuitry 110, speaker 111, RF circuitry 108, text input module 134, e-mail client module 140, and browser module 147, online video module 155 includes instructions that allow the user to access, browse, receive (e.g., by streaming and/or download), play back (e.g., on the touch screen or on an external, connected display via external port 124), send an e-mail with a link to a particular online video, and otherwise manage online videos in one or more file formats, such as H.264. In some embodiments, instant messaging module 141, rather than e-mail client module 140, is used to send a link to a particular online video.

Each of the above identified modules and applications correspond to a set of executable instructions for performing one or more functions described above and the methods described in this application (e.g., the computer-implemented methods and other information processing methods described herein). These modules (i.e., sets of instructions) need not be implemented as separate software programs, procedures or modules, and thus various subsets of these modules are, optionally, combined or otherwise re-arranged in various embodiments. In some embodiments, memory 102 optionally stores a subset of the modules and data structures identified above. Furthermore, memory 102 optionally stores additional modules and data structures not described above.

In some embodiments, device 100 is a device where operation of a predefined set of functions on the device is performed exclusively through a touch screen and/or a touchpad (whether included in device 100 or on a separate device, such as an input device). By using a touch screen and/or a touchpad as the primary input control device for operation of device 100, the number of physical input control devices (such as push buttons, dials, and the like) on device 100 is, optionally, reduced.

The predefined set of functions that are performed exclusively through a touch screen and/or a touchpad optionally include navigation between user interfaces. In some embodiments, the touchpad, when touched by the user, navigates device 100 to a main, home, or root menu from any user interface that is displayed on device 100. In such embodiments, a "menu button" is implemented using a touchpad. In some other embodiments, the menu button is a physical push button or other physical input control device instead of a touchpad.

Figure 1B:
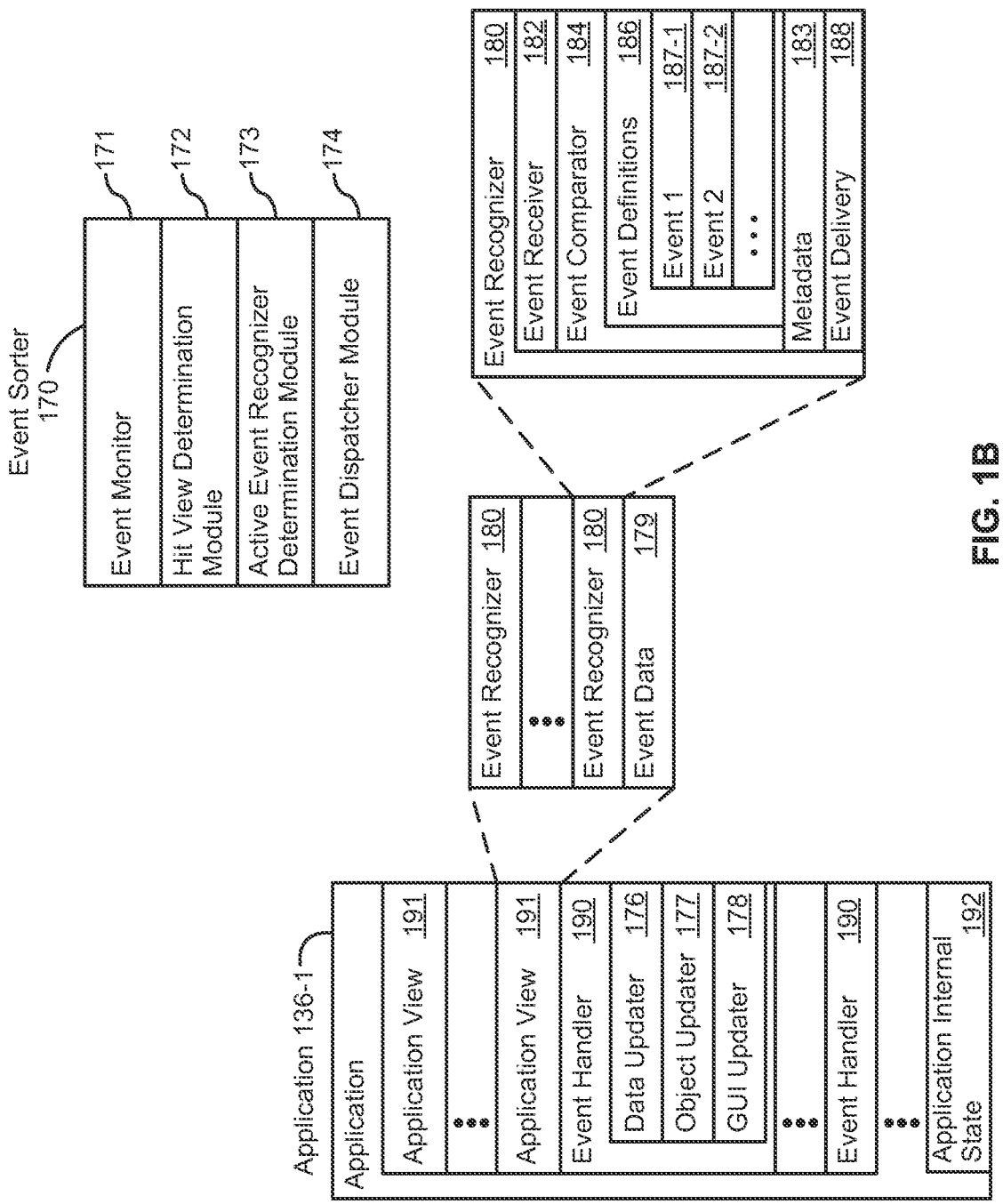
FIG. 1B is a block diagram illustrating exemplary components for event handling in accordance with some embodiments.

FIG. 1B is a block diagram illustrating exemplary components for event handling in accordance with some embodiments. In some embodiments, memory 102 (in FIG. 1A) or 370 (FIG. 3) includes event sorter 170 (e.g., in operating system 126) and a respective application 136-1 (e.g., any of the aforementioned applications 137-151, 155, 380-390).

Event sorter 170 receives event information and determines the application 136-1 and application view 191 of application 136-1 to which to deliver the event information. Event sorter 170 includes event monitor 171 and event dispatcher module 174. In some embodiments, application 136-1 includes application internal state 192, which indicates the current application view(s) displayed on touch-sensitive display 112 when the application is active or executing. In some embodiments, device/global internal state 157 is used by event sorter 170 to determine which application(s) is (are) currently active, and application internal state 192 is used by event sorter 170 to determine application views 191 to which to deliver event information.

In some embodiments, application internal state 192 includes additional information, such as one or more of: resume information to be used when application 136-1 resumes execution, user interface state information that indicates information being displayed or that is ready for display by application 136-1, a state queue for enabling the user to go back to a prior state or view of application 136-1, and a redo/undo queue of previous actions taken by the user.

Event monitor 171 receives event information from peripherals interface 118. Event information includes information about a sub-event (e.g., a user touch on touch-sensitive display 112, as part of a multi-touch gesture). Peripherals interface 118 transmits information it receives from I/O subsystem 106 or a sensor, such as proximity sensor 166, accelerometer(s) 168, and/or microphone 113 (through audio circuitry 110). Information that peripherals interface 118 receives from I/O subsystem 106 includes information from touch-sensitive display 112 or a touch-sensitive surface.

In some embodiments, event monitor 171 sends requests to the peripherals interface 118 at predetermined intervals. In response, peripherals interface 118 transmits event information. In other embodiments, peripheral interface 118 transmits event information only when there is a significant event (e.g., receiving an input above a predetermined noise threshold and/or for more than a predetermined duration).

In some embodiments, event sorter 170 also includes a hit view determination module 172 and/or an active event recognizer determination module 173.

Hit view determination module 172 provides software procedures for determining where a sub-event has taken place within one or more views, when touch-sensitive display 112 displays more than one view. Views are made up of controls and other elements that a user can see on the display.

Another aspect of the user interface associated with an application is a set of views, sometimes herein called application views or user interface windows, in which information is displayed and touch-based gestures occur. The application views (of a respective application) in which a touch is detected optionally correspond to programmatic levels within a programmatic or view hierarchy of the application. For example, the lowest level view in which a touch is detected is, optionally, called the hit view, and the set of events that are recognized as proper inputs are, optionally, determined based, at least in part, on the hit view of the initial touch that begins a touch-based gesture.

Hit view determination module 172 receives information related to sub-events of a touch-based gesture. When an application has multiple views organized in a hierarchy, hit view determination module 172 identifies a hit view as the lowest view in the hierarchy which should handle the sub-event. In most circumstances, the hit view is the lowest level view in which an initiating sub-event occurs (i.e., the first sub-event in the sequence of sub-events that form an event or potential event). Once the hit view is identified by the hit view determination module, the hit view typically receives all sub-events related to the same touch or input source for which it was identified as the hit view.

Active event recognizer determination module 173 determines which view or views within a view hierarchy should receive a particular sequence of sub-events. In some embodiments, active event recognizer determination module 173 determines that only the hit view should receive a particular sequence of sub-events. In other embodiments, active event recognizer determination module 173 determines that all views that include the physical location of a sub-event are actively involved views, and therefore determines that all actively involved views should receive a particular sequence of sub-events. In other embodiments, even if touch sub-events were entirely confined to the area associated with one particular view, views higher in the hierarchy would still remain as actively involved views.

Event dispatcher module 174 dispatches the event information to an event recognizer (e.g., event recognizer 180). In embodiments including active event recognizer determination module 173, event dispatcher module 174 delivers the event information to an event recognizer determined by active event recognizer determination module 173. In some embodiments, event dispatcher module 174 stores in an event queue the event information, which is retrieved by a respective event receiver module 182.

In some embodiments, operating system 126 includes event sorter 170. Alternatively, application 136-1 includes event sorter 170. In yet other embodiments, event sorter 170 is a stand-alone module, or a part of another module stored in memory 102, such as contact/motion module 130.

In some embodiments, application 136-1 includes a plurality of event handlers 190 and one or more application views 191, each of which includes instructions for handling touch events that occur within a respective view of the application's user interface. Each application view 191 of the application 136-1 includes one or more event recognizers 180. Typically, a respective application view 191 includes a plurality of event recognizers 180. In other embodiments, one or more of event recognizers 180 are part of a separate module, such as a user interface kit (not shown) or a higher level object from which application 136-1 inherits methods and other properties. In some embodiments, a respective event handler 190 includes one or more of: data updater 176, object updater 177, GUI updater 178, and/or event data 179 received from event sorter 170. Event handler 190 optionally utilizes or calls data updater 176, object updater 177 or GUI updater 178 to update the application internal state 192. Alternatively, one or more of the application views 191 includes one or more respective event handlers 190. Also, in some embodiments, one or more of data updater 176, object updater 177, and GUI updater 178 are included in a respective application view 191.

A respective event recognizer 180 receives event information (e.g., event data 179) from event sorter 170, and identifies an event from the event information. Event recognizer 180 includes event receiver 182 and event comparator 184. In some embodiments, event recognizer 180 also includes at least a subset of: metadata 183, and event delivery instructions 188 (which optionally include sub-event delivery instructions).

Event receiver 182 receives event information from event sorter 170. The event information includes information about a sub-event, for example, a touch or a touch movement. Depending on the sub-event, the event information also includes additional information, such as location of the sub-event. When the sub-event concerns motion of a touch, the event information optionally also includes speed and direction of the sub-event. In some embodiments, events include rotation of the device from one orientation to another (e.g., from a portrait orientation to a landscape orientation, or vice versa), and the event information includes corresponding information about the current orientation (also called device attitude) of the device.

Event comparator 184 compares the event information to predefined event or sub-event definitions and, based on the comparison, determines an event or sub-event, or determines or updates the state of an event or sub-event. In some embodiments, event comparator 184 includes event definitions 186. Event definitions 186 contain definitions of events (e.g., predefined sequences of sub-events), for example, event 1 (187-1), event 2 (187-2), and others. In some embodiments, sub-events in an event 187 include, for example, touch begin, touch end, touch movement, touch cancellation, and multiple touching. In one example, the definition for event 1 (187-1) is a double tap on a displayed object. The double tap, for example, comprises a first touch (touch begin) on the displayed object for a predetermined phase, a first lift-off (touch end) for a predetermined phase, a second touch (touch begin) on the displayed object for a predetermined phase, and a second lift-off (touch end) for a predetermined phase. In another example, the definition for event 2 (187-2) is a dragging on a displayed object. The dragging, for example, comprises a touch (or contact) on the displayed object for a predetermined phase, a movement of the touch across touch-sensitive display 112, and lift-off of the touch (touch end). In some embodiments, the event also includes information for one or more associated event handlers 190.

In some embodiments, event definition 187 includes a definition of an event for a respective user-interface object. In some embodiments, event comparator 184 performs a hit test to determine which user-interface object is associated with a sub-event. For example, in an application view in which three user-interface objects are displayed on touch-sensitive display 112, when a touch is detected on touch-sensitive display 112, event comparator 184 performs a hit test to determine which of the three user-interface objects is associated with the touch (sub-event). If each displayed object is associated with a respective event handler 190, the event comparator uses the result of the hit test to determine which event handler 190 should be activated. For example, event comparator 184 selects an event handler associated with the sub-event and the object triggering the hit test.

In some embodiments, the definition for a respective event 187 also includes delayed actions that delay delivery of the event information until after it has been determined whether the sequence of sub-events does or does not correspond to the event recognizer's event type.

When a respective event recognizer 180 determines that the series of sub-events do not match any of the events in event definitions 186, the respective event recognizer 180 enters an event impossible, event failed, or event ended state, after which it disregards subsequent sub-events of the touch-based gesture. In this situation, other event recognizers, if any, that remain active for the hit view continue to track and process sub-events of an ongoing touch-based gesture.

In some embodiments, a respective event recognizer 180 includes metadata 183 with configurable properties, flags, and/or lists that indicate how the event delivery system should perform sub-event delivery to actively involved event recognizers. In some embodiments, metadata 183 includes configurable properties, flags, and/or lists that indicate how event recognizers interact, or are enabled to interact, with one another. In some embodiments, metadata 183 includes configurable properties, flags, and/or lists that indicate whether sub-events are delivered to varying levels in the view or programmatic hierarchy.

In some embodiments, a respective event recognizer 180 activates event handler 190 associated with an event when one or more particular sub-events of an event are recognized. In some embodiments, a respective event recognizer 180 delivers event information associated with the event to event handler 190. Activating an event handler 190 is distinct from sending (and deferred sending) sub-events to a respective hit view. In some embodiments, event recognizer 180 throws a flag associated with the recognized event, and event handler 190 associated with the flag catches the flag and performs a predefined process.

In some embodiments, event delivery instructions 188 include sub-event delivery instructions that deliver event information about a sub-event without activating an event handler. Instead, the sub-event delivery instructions deliver event information to event handlers associated with the series of sub-events or to actively involved views. Event handlers associated with the series of sub-events or with actively involved views receive the event information and perform a predetermined process.

In some embodiments, data updater 176 creates and updates data used in application 136-1. For example, data updater 176 updates the telephone number used in contacts module 137, or stores a video file used in video player module 145. In some embodiments, object updater 177 creates and updates objects used in application 136-1. For example, object updater 177 creates a new user-interface object or updates the position of a user-interface object. GUI updater 178 updates the GUI. For example, GUI updater 178 prepares display information and sends it to graphics module 132 for display on a touch-sensitive display.

In some embodiments, event handler(s) 190 includes or has access to data updater 176, object updater 177, and GUI updater 178. In some embodiments, data updater 176, object updater 177, and GUI updater 178 are included in a single module of a respective application 136-1 or application view 191. In other embodiments, they are included in two or more software modules.

It shall be understood that the foregoing discussion regarding event handling of user touches on touch-sensitive displays and/or touchpads also applies to other forms of user inputs to operate multifunction devices 100 with input-devices, not all of which are initiated on touch screens. For example, mouse movement and mouse button presses, optionally coordinated with single or multiple keyboard presses or holds; contact movements such as taps, drags, scrolls, etc., on touch-pads; pen stylus inputs; movement of the device; oral instructions; detected eye movements; biometric inputs; and/or any combination thereof are optionally utilized as inputs corresponding to sub-events which define an event to be recognized.

Figure 2:
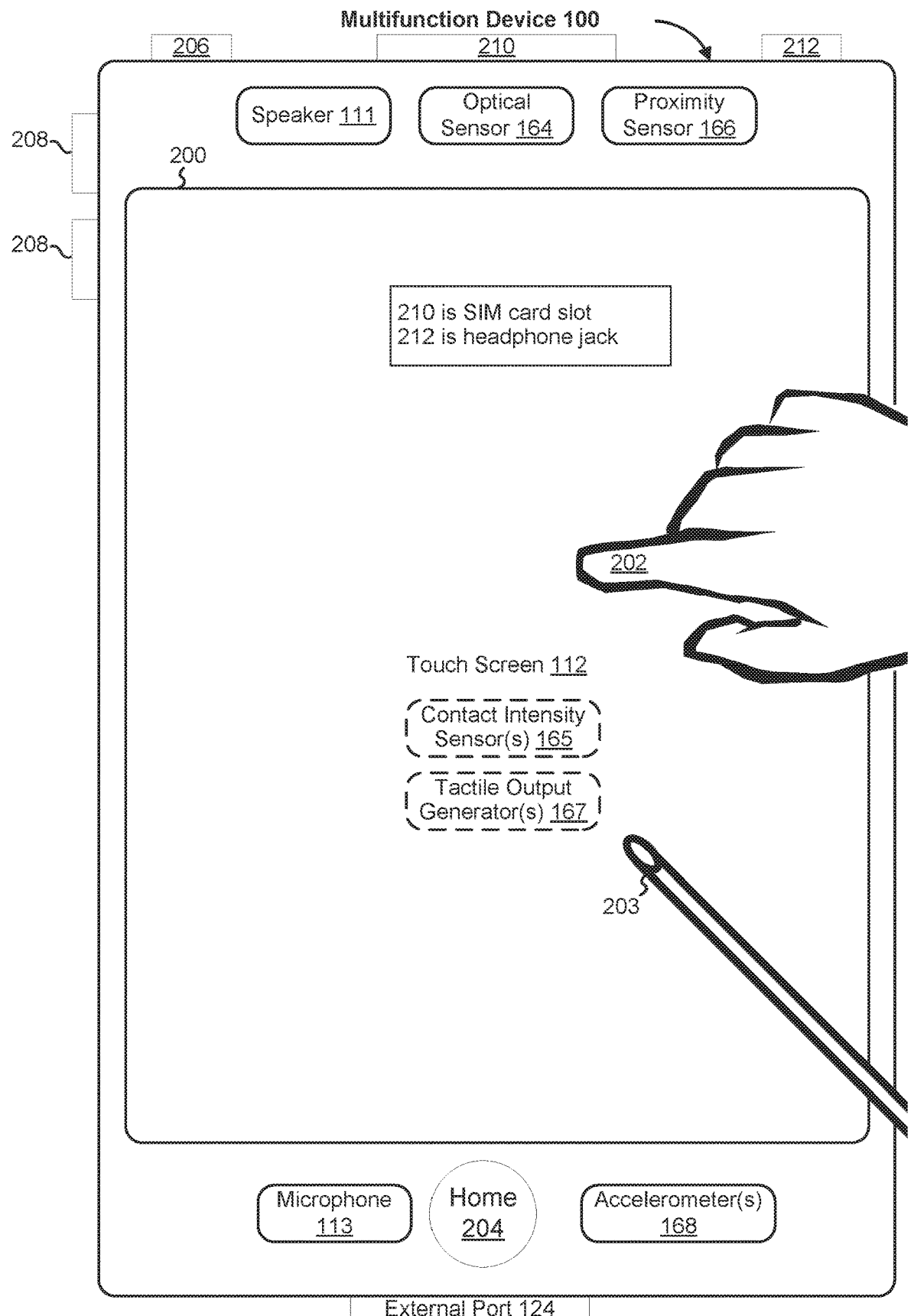
FIG. 2 illustrates a multifunction device having a touch screen in accordance with some embodiments.

FIG. 2 illustrates a portable or non-portable multifunction device 100 having a touch screen 112 in accordance with some embodiments. As stated above, multifunction device 100 is described as having the various illustrated structures (such as touch screen 112, speaker 111, accelerometer 168, microphone 113, etc.); however, it is understood that these structures optionally reside on separate devices. For example, display-related structures (e.g., display, speaker, etc.) and/or functions optionally reside on a separate display device, input-related structures (e.g., touch-sensitive surface, microphone, accelerometer, etc.) and/or functions optionally reside on a separate input device, and remaining structures and/or functions optionally reside on multifunction device 100.

The touch screen 112 optionally displays one or more graphics within user interface (UI) 200. In this embodiment, as well as others described below, a user is enabled to select one or more of the graphics by making a gesture on the graphics, for example, with one or more fingers 202 (not drawn to scale in the figure) or one or more styluses 203 (not drawn to scale in the figure). In some embodiments, selection of one or more graphics occurs when the user breaks contact with the one or more graphics. In some embodiments, the gesture optionally includes one or more taps, one or more swipes (from left to right, right to left, upward and/or downward) and/or a rolling of a finger (from right to left, left to right, upward and/or downward) that has made contact with device 100. In some implementations or circumstances, inadvertent contact with a graphic does not select the graphic. For example, a swipe gesture that sweeps over an application icon optionally does not select the corresponding application when the gesture corresponding to selection is a tap.

Device 100 optionally also includes one or more physical buttons, such as "home" or menu button 204. As described previously, menu button 204 is, optionally, used to navigate to any application 136 in a set of applications that are, optionally executed on device 100. Alternatively, in some embodiments, the menu button is implemented as a soft key in a GUI displayed on touch screen 112.

In one embodiment, device 100 includes touch screen 112, menu button 204, push button 206 for powering the device on/off and locking the device, volume adjustment button(s) 208, Subscriber Identity Module (SIM) card slot 210, head set jack 212, and docking/charging external port 124. Push button 206 is, optionally, used to turn the power on/off on the device by depressing the button and holding the button in the depressed state for a predefined time interval; to lock the device by depressing the button and releasing the button before the predefined time interval has elapsed; and/or to unlock the device or initiate an unlock process. In an alternative embodiment, device 100 also accepts verbal input for activation or deactivation of some functions through microphone 113. Device 100 also, optionally, includes one or more contact intensity sensors 165 for detecting intensity of contacts on touch screen 112 and/or one or more tactile output generators 167 for generating tactile outputs for a user of device 100.

FIG. 3 is a block diagram of an exemplary multifunction device with a display and a touch-sensitive surface in accordance with some embodiments. Device 300 need not include the display and the touch-sensitive surface, as described above, but rather, in some embodiments, optionally communicates with the display and the touch-sensitive surface on other devices. Additionally, device 300 need not be portable. In some embodiments, device 300 is a laptop computer, a desktop computer, a tablet computer, a multimedia player device (such as a television or a set-top box), a navigation device, an educational device (such as a child's learning toy), a gaming system, or a control device (e.g., a home or industrial controller). Device 300 typically includes one or more processing units (CPU's) 310, one or more network or other communications interfaces 360, memory 370, and one or more communication buses 320 for interconnecting these components. Communication buses 320 optionally include circuitry (sometimes called a chipset) that interconnects and controls communications between system components. Device 300 includes input/output (I/O) interface 330 comprising display 340, which is typically a touch screen display. I/O interface 330 also optionally includes a keyboard and/or mouse (or other pointing device) 350 and touchpad 355, tactile output generator 357 for generating tactile outputs on device 300 (e.g., similar to tactile output generator(s) 167 described above with reference to FIG. 1A), sensors 359 (e.g., optical, acceleration, proximity, touch-sensitive, and/or contact intensity sensors similar to contact intensity sensor(s) 165 described above with reference to FIG. 1A). Memory 370 includes high-speed random access memory, such as DRAM, SRAM, DDR RAM or other random access solid state memory devices; and optionally includes non-volatile memory, such as one or more magnetic disk storage devices, optical disk storage devices, flash memory devices, or other non-volatile solid state storage devices. Memory 370 optionally includes one or more storage devices remotely located from CPU(s) 310. In some embodiments, memory 370 stores programs, modules, and data structures analogous to the programs, modules, and data structures stored in memory 102 of portable or non-portable multifunction device 100 (FIG. 1A), or a subset thereof. Furthermore, memory 370 optionally stores additional programs, modules, and data structures not present in memory 102 of portable or non-portable multifunction device 100. For example, memory 370 of device 300 optionally stores drawing module 380, presentation module 382, word processing module 384, website creation module 386, disk authoring module 388, and/or spreadsheet module 390, while memory 102 of portable or non-portable multifunction device 100 (FIG. 1A) optionally does not store these modules.

Each of the above identified elements in FIG. 3 are, optionally, stored in one or more of the previously mentioned memory devices. Each of the above identified modules corresponds to a set of instructions for performing a function described above. The above identified modules or programs (i.e., sets of instructions) need not be implemented as separate software programs, procedures or modules, and thus various subsets of these modules are, optionally, combined or otherwise re-arranged in various embodiments. In some embodiments, memory 370 optionally stores a subset of the modules and data structures identified above. Furthermore, memory 370 optionally stores additional modules and data structures not described above.

FIG. 4 illustrates an exemplary user interface on a device (e.g., device 300, FIG. 3) with a touch-sensitive surface 451 (e.g., a tablet or touchpad 355, FIG. 3) that is separate from the display 450 (e.g., touch screen display 112). Device 300 also, optionally, includes one or more contact intensity sensors (e.g., one or more of sensors 357) for detecting intensity of contacts on touch-sensitive surface 451 and/or one or more tactile output generators 359 for generating tactile outputs for a user of device 300.

Although some of the examples which follow will be given with reference to inputs on touch screen display 112 (where the touch sensitive surface and the display are combined), in some embodiments, the device detects inputs on a touch-sensitive surface that is separate from the display, as shown in FIG. 4. In some embodiments the touch sensitive surface (e.g., 451 in FIG. 4) has a primary axis (e.g., 452 in FIG. 4) that corresponds to a primary axis (e.g., 453 in FIG. 4) on the display (e.g., 450). In accordance with these embodiments, the device detects contacts (e.g., 460 and 462 in FIG. 4) with the touch-sensitive surface 451 at locations that correspond to respective locations on the display (e.g., in FIG. 4, 460 corresponds to 468 and 462 corresponds to 470). In this way, user inputs (e.g., contacts 460 and 462, and movements thereof) detected by the device on the touch-sensitive surface (e.g., 451 in FIG. 4) are used by the device to manipulate the user interface on the display (e.g., 450 in FIG. 4) of the multifunction device when the touch-sensitive surface is separate from the display. It should be understood that similar methods are, optionally, used for other user interfaces described herein.

Additionally, while the following examples are given primarily with reference to finger inputs (e.g., finger contacts, finger tap gestures, finger swipe gestures), it should be understood that, in some embodiments, one or more of the finger inputs are replaced with input from another input device (e.g., a mouse based input or stylus input). For example, a swipe gesture is, optionally, replaced with a mouse click (e.g., instead of a contact) followed by movement of the cursor along the path of the swipe (e.g., instead of movement of the contact). As another example, a tap gesture is, optionally, replaced with a mouse click while the cursor is located over the location of the tap gesture (e.g., instead of detection of the contact followed by ceasing to detect the contact). Similarly, when multiple user inputs are simultaneously detected, it should be understood that multiple computer mice are, optionally, used simultaneously, or a mouse and finger contacts are, optionally, used simultaneously.

As used herein, the term "focus selector" refers to an input element that indicates a current part of a user interface with which a user is interacting. In some implementations that include a cursor or other location marker, the cursor acts as a "focus selector," so that when an input (e.g., a press input) is detected on a touch-sensitive surface (e.g., touchpad 355 in FIG. 3 or touch-sensitive surface 451 in FIG. 4) while the cursor is over a particular user interface element (e.g., a button, window, slider or other user interface element), the particular user interface element is adjusted in accordance with the detected input. In some implementations that include a touch-screen display (e.g., touch-sensitive display system 112 in FIG. 1A or touch screen 112 in FIG. 4A) that enables direct interaction with user interface elements on the touch-screen display, a detected contact on the touch-screen acts as a "focus selector," so that when an input (e.g., a press input by the contact) is detected on the touch-screen display at a location of a particular user interface element (e.g., a button, window, slider or other user interface element), the particular user interface element is adjusted in accordance with the detected input. In some implementations focus is moved from one region of a user interface to another region of the user interface without corresponding movement of a cursor or movement of a contact on a touch-screen display (e.g., by using a tab key or arrow keys to move focus from one button to another button); in these implementations, the focus selector moves in accordance with movement of focus between different regions of the user interface. Without regard to the specific form taken by the focus selector, the focus selector is generally the user interface element (or contact on a touch-screen display) that is controlled by the user so as to communicate the user's intended interaction with the user interface (e.g., by indicating, to the device, the element of the user interface with which the user is intending to interact). For example, the location of a focus selector (e.g., a cursor, a contact or a selection box) over a respective button while a press input is detected on the touch-sensitive surface (e.g., a touchpad or touch screen) will indicate that the user is intending to activate the respective button (as opposed to other user interface elements shown on a display of the device).

In some embodiments described herein, one or more operations are performed in response to detecting a gesture that includes a respective press input or in response to detecting the respective press input performed with a respective contact (or a plurality of contacts), where the respective press input is detected based at least in part on detecting an increase in intensity of the contact (or plurality of contacts) above a press-input intensity threshold. In some embodiments, the respective operation is performed in response to detecting the increase in intensity of the respective contact above the press-input intensity threshold (e.g., a "down stroke" of the respective press input). In some embodiments, the press input includes an increase in intensity of the respective contact above the press-input intensity threshold and a subsequent decrease in intensity of the contact below the press-input intensity threshold, and the respective operation is performed in response to detecting the subsequent decrease in intensity of the respective contact below the press-input threshold (e.g., an "up stroke" of the respective press input).

In some embodiments, the device employs intensity hysteresis to avoid accidental inputs sometimes termed "jitter," where the device defines or selects a hysteresis intensity threshold with a predefined relationship to the press-input intensity threshold (e.g., the hysteresis intensity threshold is X intensity units lower than the press-input intensity threshold or the hysteresis intensity threshold is 75%, 90% or some reasonable proportion of the press-input intensity threshold). Thus, in some embodiments, the press input includes an increase in intensity of the respective contact above the press-input intensity threshold and a subsequent decrease in intensity of the contact below the hysteresis intensity threshold that corresponds to the press-input intensity threshold, and the respective operation is performed in response to detecting the subsequent decrease in intensity of the respective contact below the hysteresis intensity threshold (e.g., an "up stroke" of the respective press input). Similarly, in some embodiments, the press input is detected only when the device detects an increase in intensity of the contact from an intensity at or below the hysteresis intensity threshold to an intensity at or above the press-input intensity threshold and, optionally, a subsequent decrease in intensity of the contact to an intensity at or below the hysteresis intensity, and the respective operation is performed in response to detecting the press input (e.g., the increase in intensity of the contact or the decrease in intensity of the contact, depending on the circumstances).

For ease of explanation, the description of operations performed in response to a press input associated with a press-input intensity threshold or in response to a gesture including the press input are, optionally, triggered in response to detecting either: an increase in intensity of a contact above the press-input intensity threshold, an increase in intensity of a contact from an intensity below the hysteresis intensity threshold to an intensity above the press-input intensity threshold, a decrease in intensity of the contact below the press-input intensity threshold, and/or a decrease in intensity of the contact below the hysteresis intensity threshold corresponding to the press-input intensity threshold. Additionally, in examples where an operation is described as being performed in response to detecting a decrease in intensity of a contact below the press-input intensity threshold, the operation is, optionally, performed in response to detecting a decrease in intensity of the contact below a hysteresis intensity threshold corresponding to, and lower than, the press-input intensity threshold.

Figure 5:
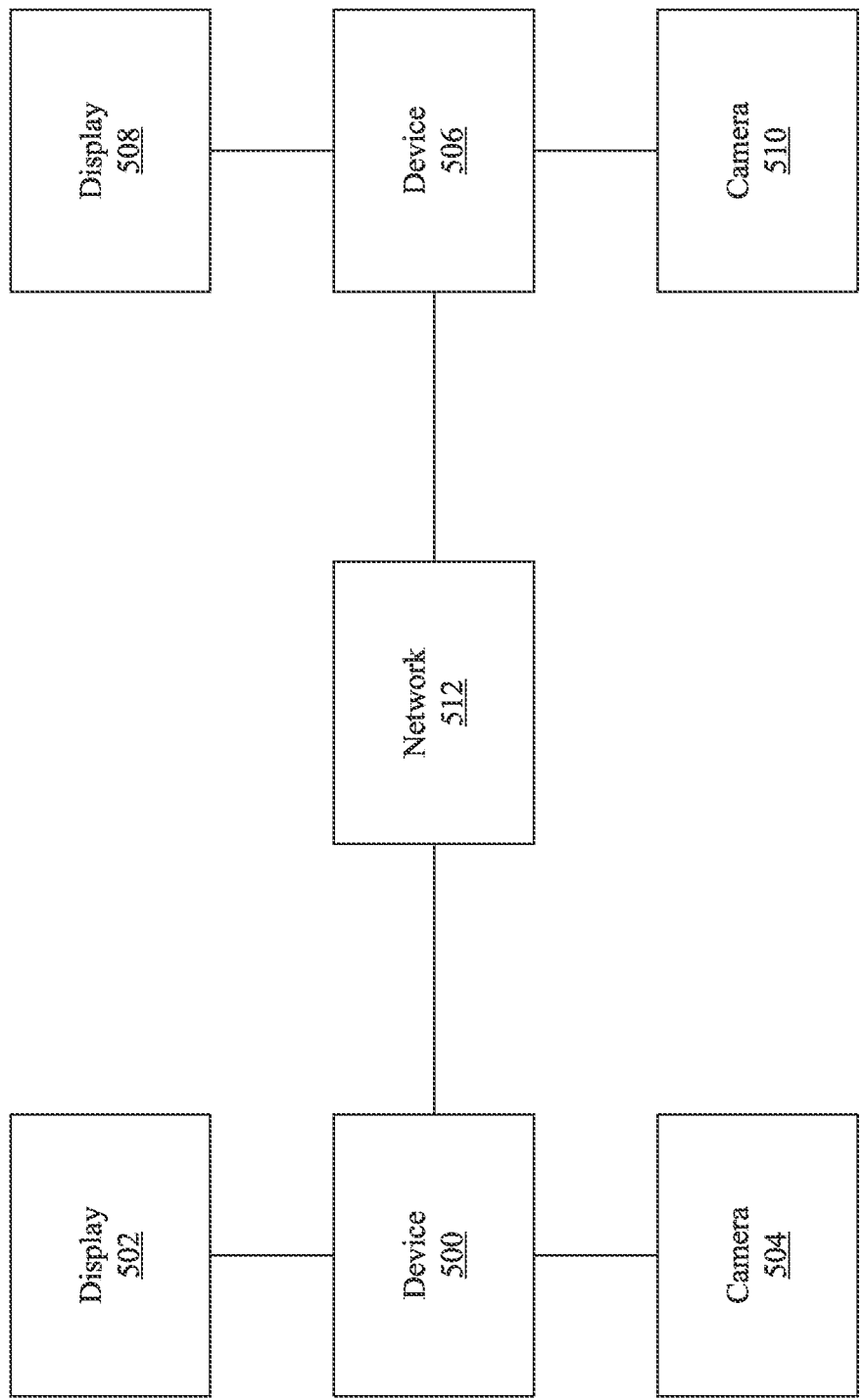
FIG. 5 illustrates a block diagram of exemplary electronic devices in communication with each other in accordance with some embodiments.

FIG. 5 illustrates a block diagram of exemplary electronic devices in communication with each other in accordance with some embodiments. First electronic device 500 and second electronic device 506 are optionally any electronic device, such as multifunction devices 100 or 300, as illustrated in FIGS. 1A-B, 2, and 3 (e.g., phones, tablets, laptop computers, set-top boxes, etc.). In some embodiments, the devices 500 and 506 are in communication with each other either directly or over a network 512 (e.g., a local area network, a wide area network such as the Internet, etc.).

In some embodiments, one or more of devices 500 and 506 automatically crop video content captured by cameras 504 and/or 510 for display on displays 502 and/or 508. For example, the first electronic device 500 automatically crops video content captured by camera 504 and sends the cropped video content to the second electronic device 506 for display on the display 508. In another example, the first electronic device 500 receives video content captured by the camera 510 from the second electronic device 506, and the first electronic device 506 displays the cropped video content on the display 502.

User Interfaces and Associated Processes

Electronic devices are often equipped with a camera for capturing video content and/or a display for displaying video content. However, amateur users often capture video content without regard to composition, framing, or camera movement, resulting in video content that can be jarring or confusing to viewers. There is a need to automate the processing and presentation of video content in an aesthetically pleasing manner. The embodiments described below provide a method of automatically cropping video content for presentation on a display.

FIGS. 6A-6LL illustrate exemplary video content automatically cropped in accordance with some embodiments. The video content in these figures are used to illustrate the processes described below, including the processes described below with reference to FIGS. 7A-7D.

FIG. 6A illustrates exemplary video content 602 as captured by a camera (e.g., cameras 504 or 510 in FIG. 5) and displayed on a display 600 (e.g., displays 200, 340, 502, or 508 in FIGS. 2-5). The video content 602 includes subject 606 and is cropped according to a cropping 604. The display 600 optionally only displays portions of the video content 602 within the cropping 604 and does not display portions of the video content that are outside the cropping 604.

Figure 6B:
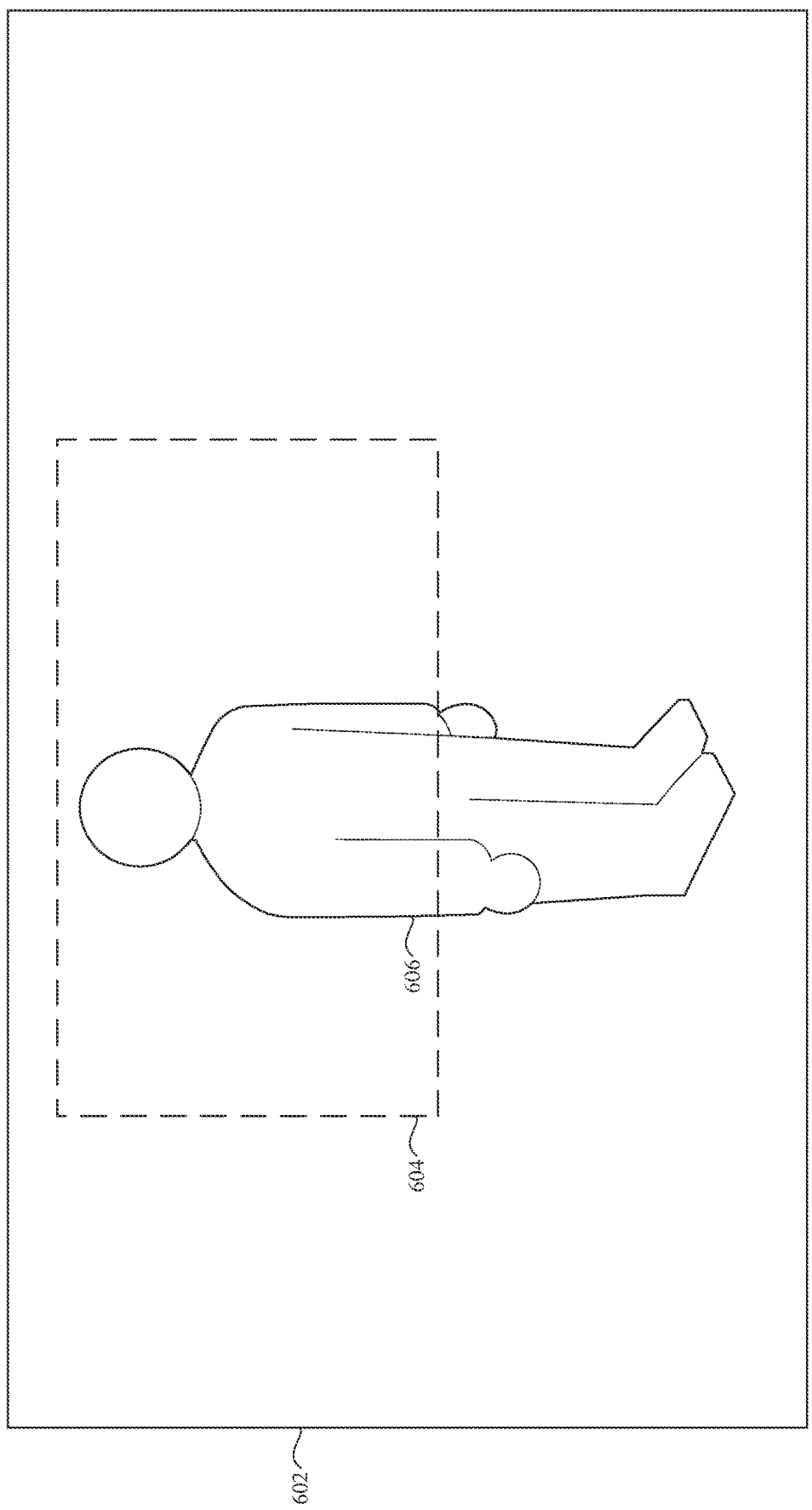
FIGS. 6A-6LL illustrate exemplary cropping of video content in accordance with some embodiments.
Figure 6C:
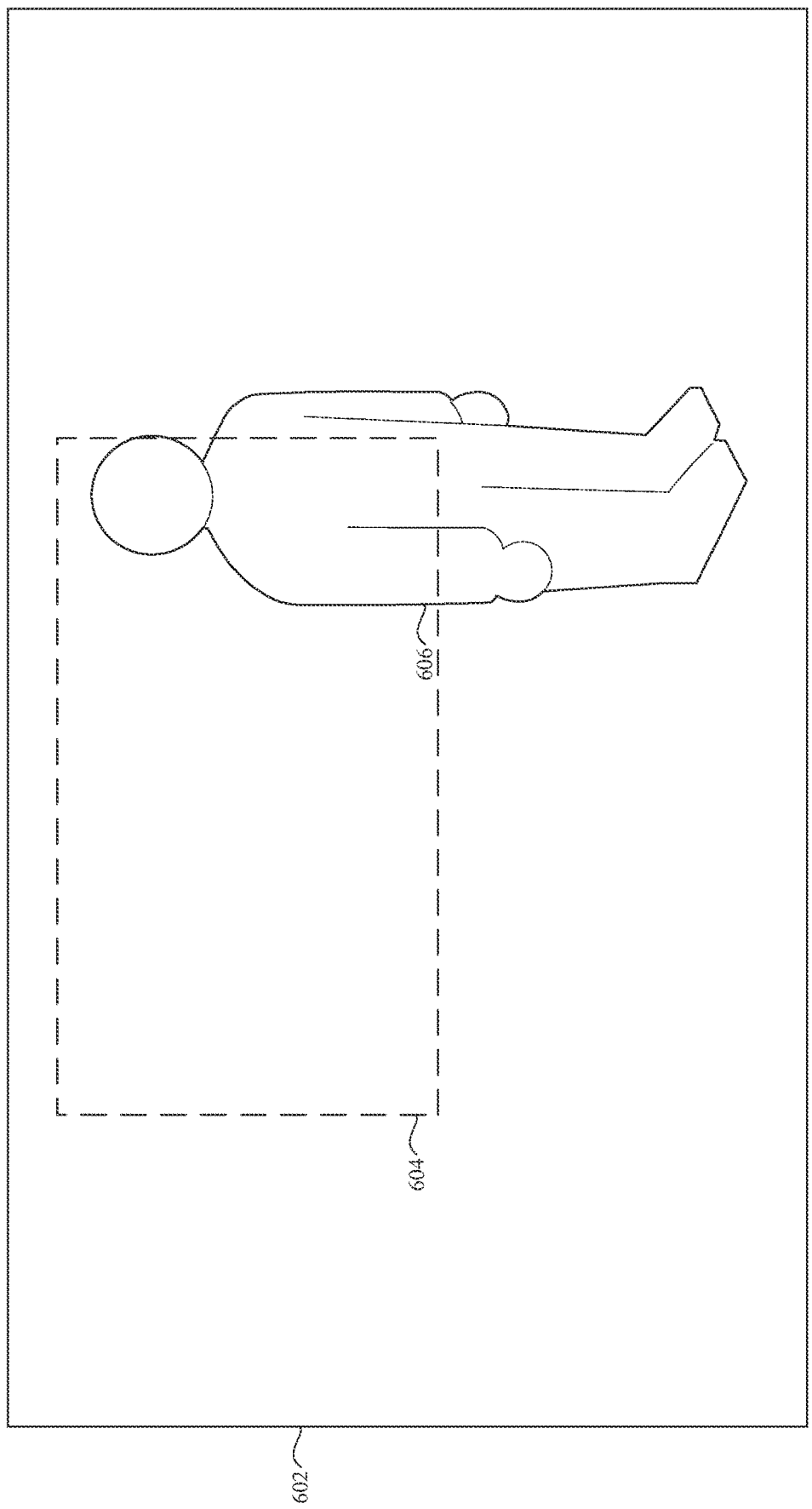
Figure 6D:
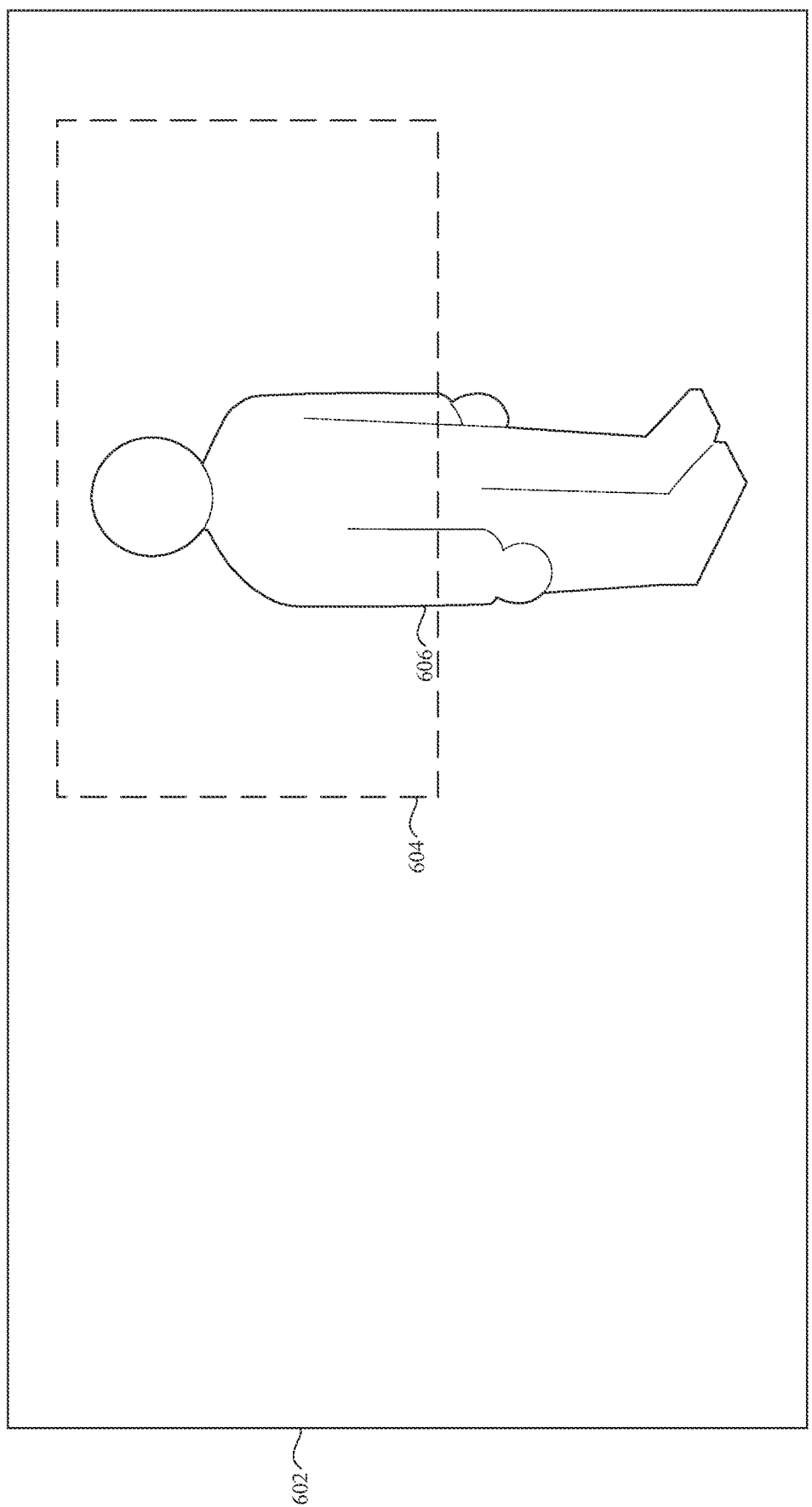
Figure 6E:
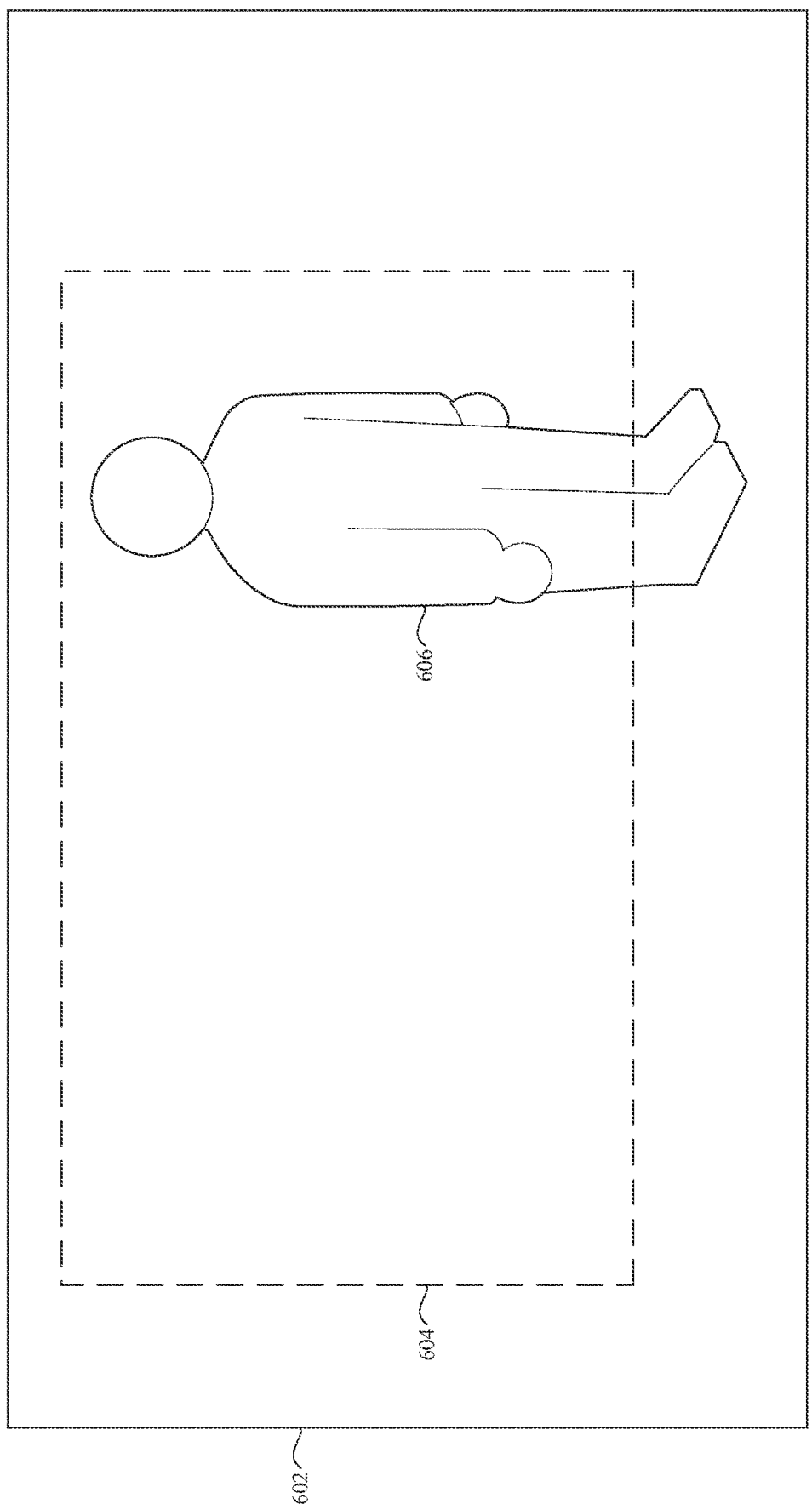

FIGS. 6B-6G illustrate determining a cropping 604 based on a subject 606 in the video content 602. For example, the cropping is optionally determined so as to keep the subject 606 within a threshold area (discussed in further detail below) in the cropped video content. In some embodiments, the threshold area is optionally defined by the cropping itself. In FIG. 6B, the torso of the subject 606 is within the cropping 604. In FIG. 6C, the torso of the subject 606 has moved outside the cropping 604. In response to movement outside the threshold area, a new cropping is optionally determined, as illustrated in FIGS. 6D and 6E. In FIG. 6D, the cropping 604 is panned with respect to the cropping FIG. 6C (e.g., the cropping 604 has the same dimensions in both FIGS. 6C and 6D, but the cropping is at a different position in FIG. 6D). In FIG. 6E, the cropping 604 is zoomed out with respect to the cropping in FIG. 6C (e.g., the cropping has increased in size in FIG. 6E compared to FIG. 6C).

Figure 6F:
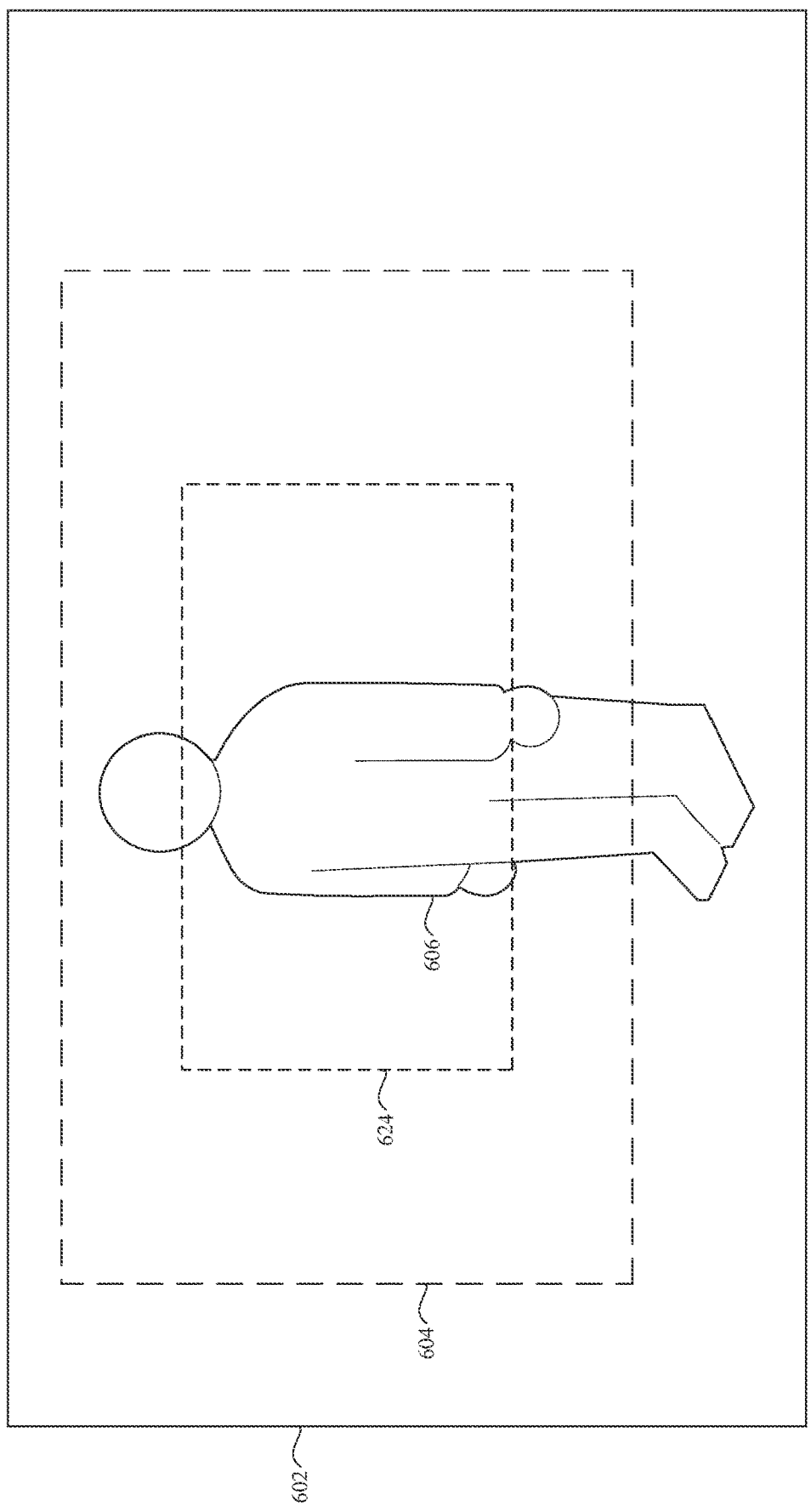
Figure 6G:
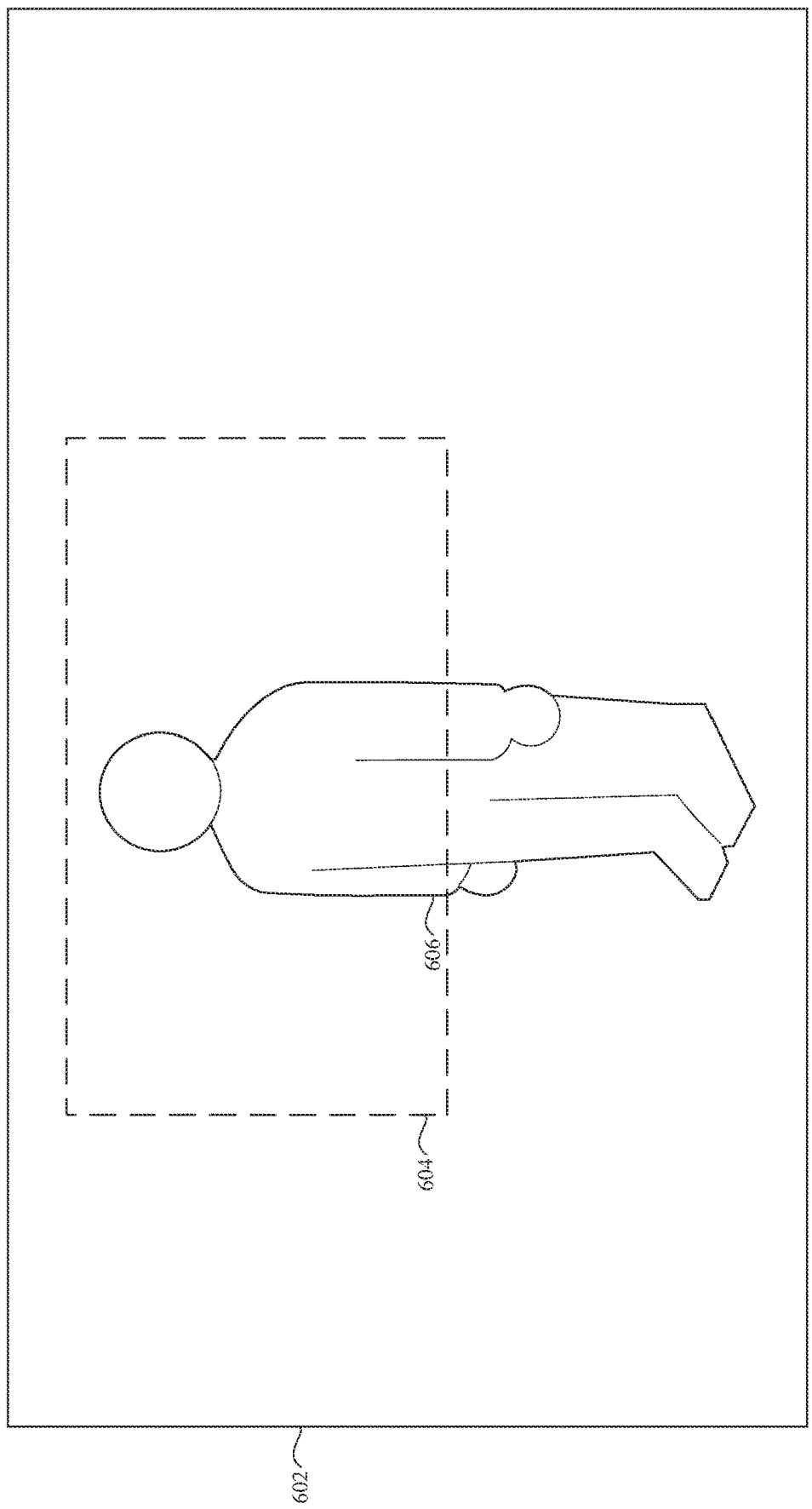
Figure 6H:
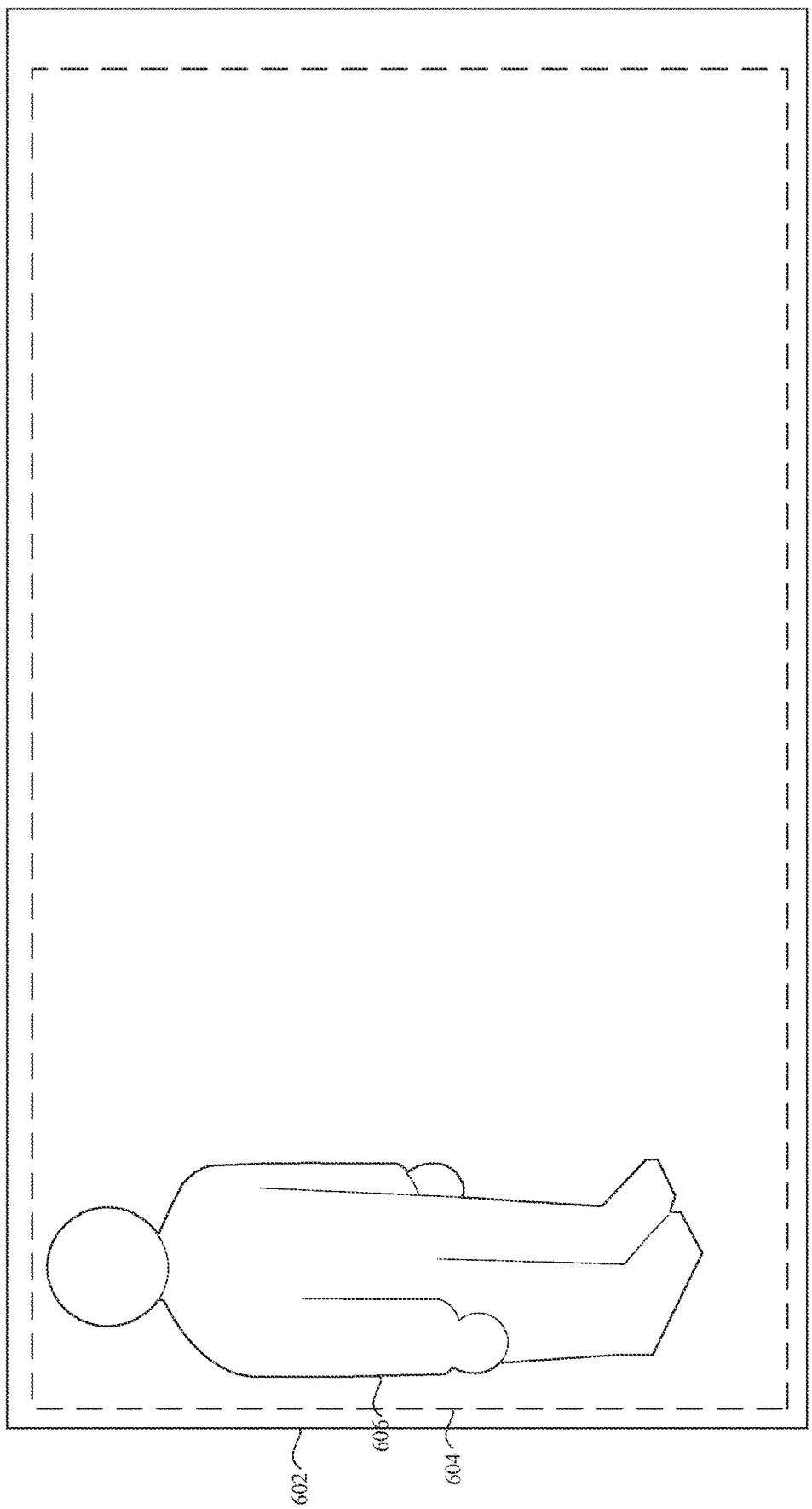
Figure 61:
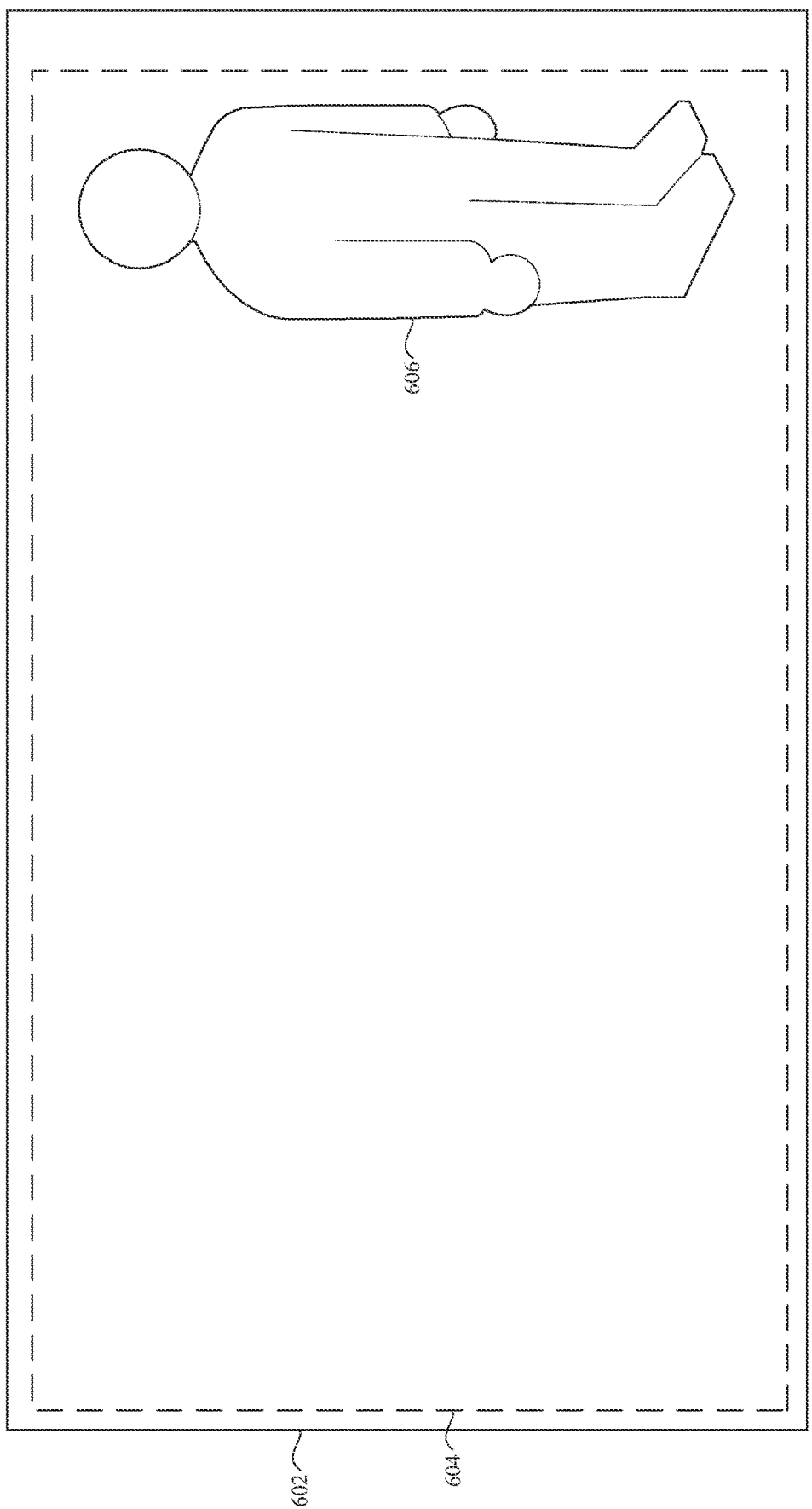

In some embodiments, a threshold area is optionally defined as smaller or larger than the cropping itself. For example, the threshold area is optionally defined by a rectangle surrounding an inner third of the cropping area. In FIG. 6F, the subject 606 enters the inner third threshold area 624 of the cropping 604. In response to the movement of the subject into the threshold area 624, a new cropping is optionally determined, as illustrated in FIG. 6G. FIG. 6G illustrates a cropping 604 that is zoomed in with respect to the cropping in FIG. 6F.

FIGS. 6H-6R illustrate determining a cropping 604 based on a determined range of movement of the subject 606 in the video content 602. For example, a range of movement is optionally determined based on the movement of the subject from FIG. 6H to FIG. 6I. The range of movement and its relationship to a cropping is optionally determined using information about the environment in the field of view of the camera obtained from one or more sensors, and/or information from the video content itself, as will be explained in further detail below. In this example, the range of movement (1) does not fall outside the cropping 604 and (2) spans from one edge of the cropping to the other (e.g., the endpoints of the movement fall within a threshold distance of the edges of the cropping). In response to this determination, the cropping 604 is optionally maintained.

Figure 6K:
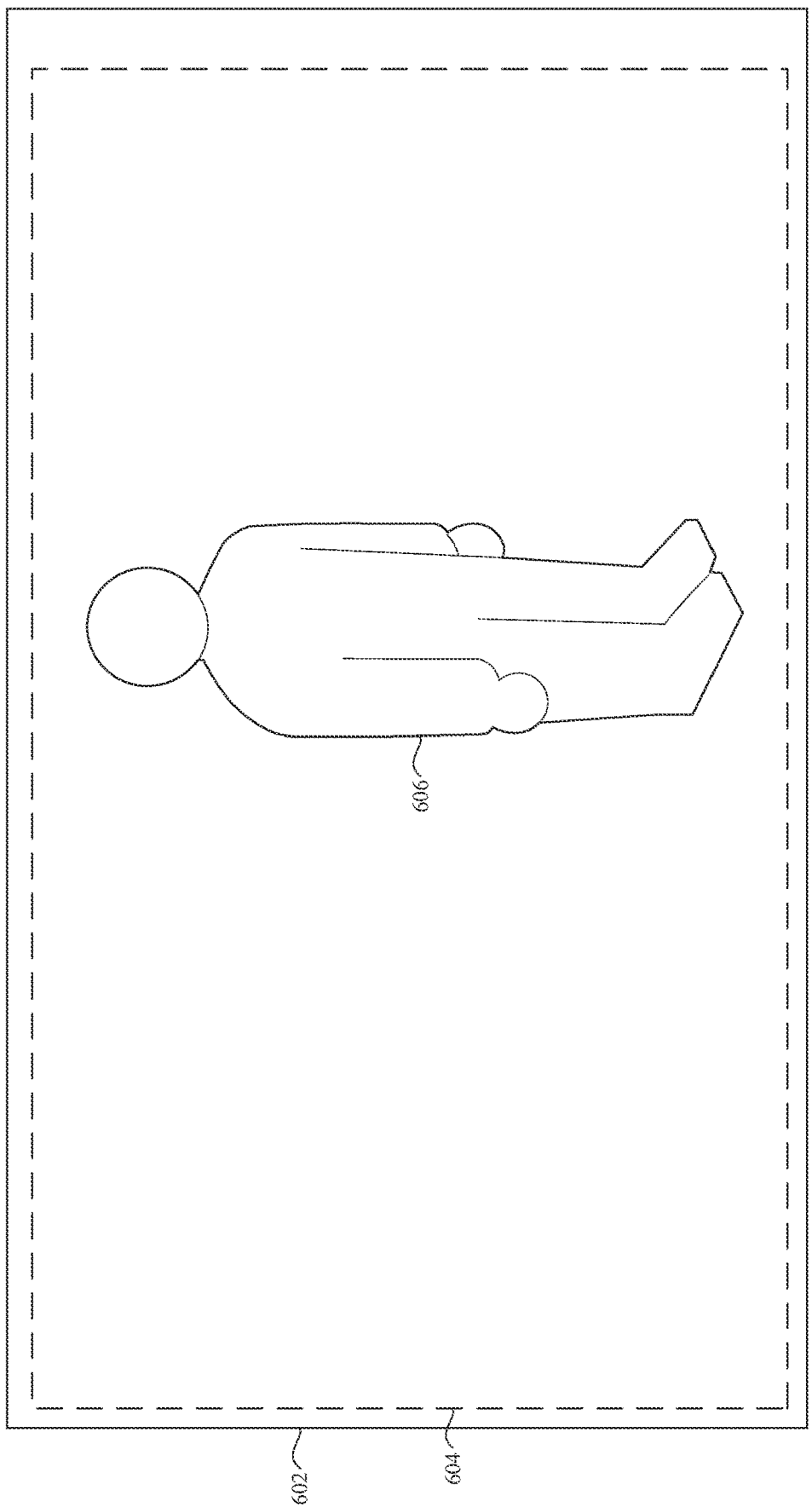
Figure 6L:
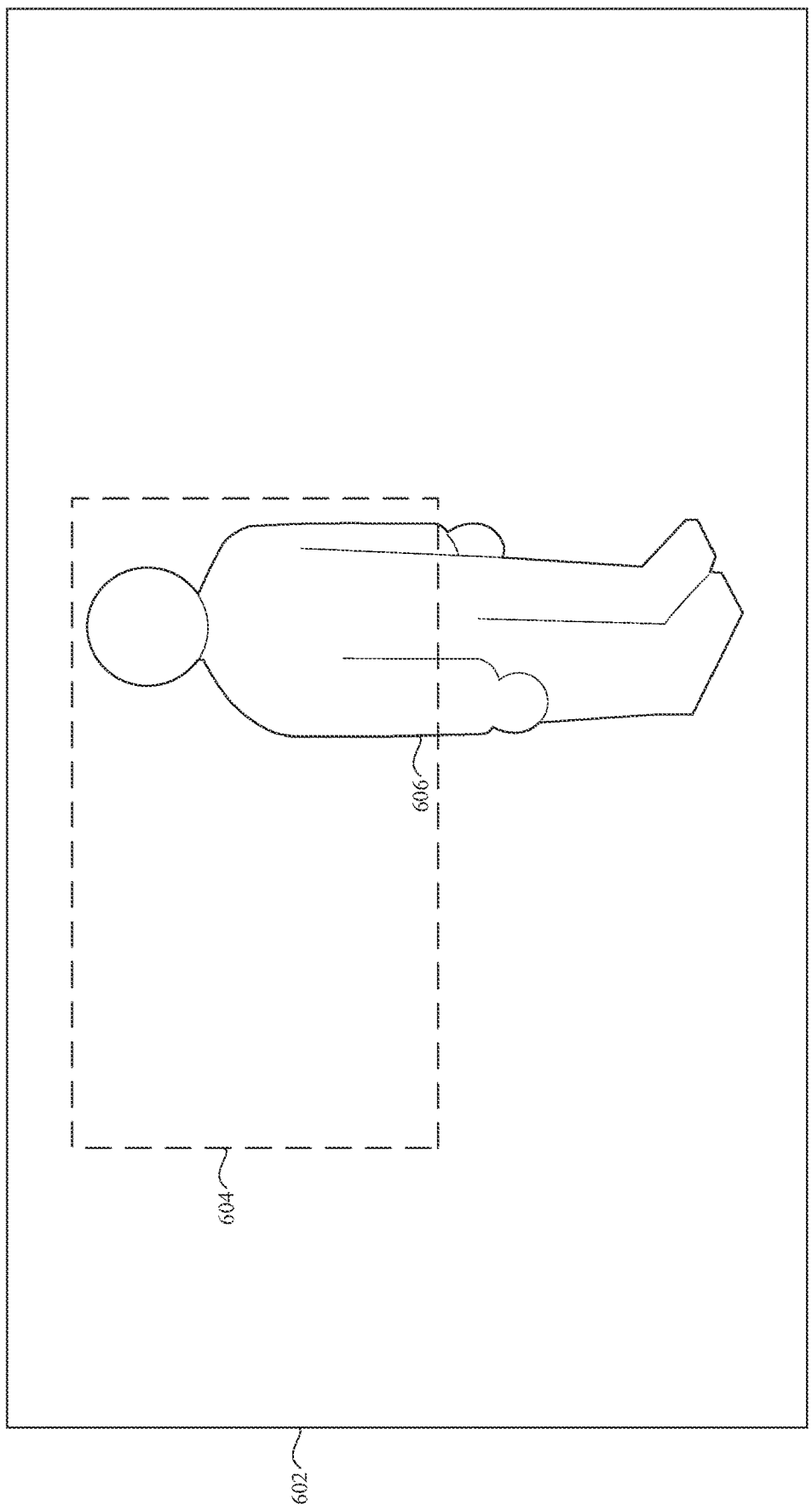
Figure 6M:
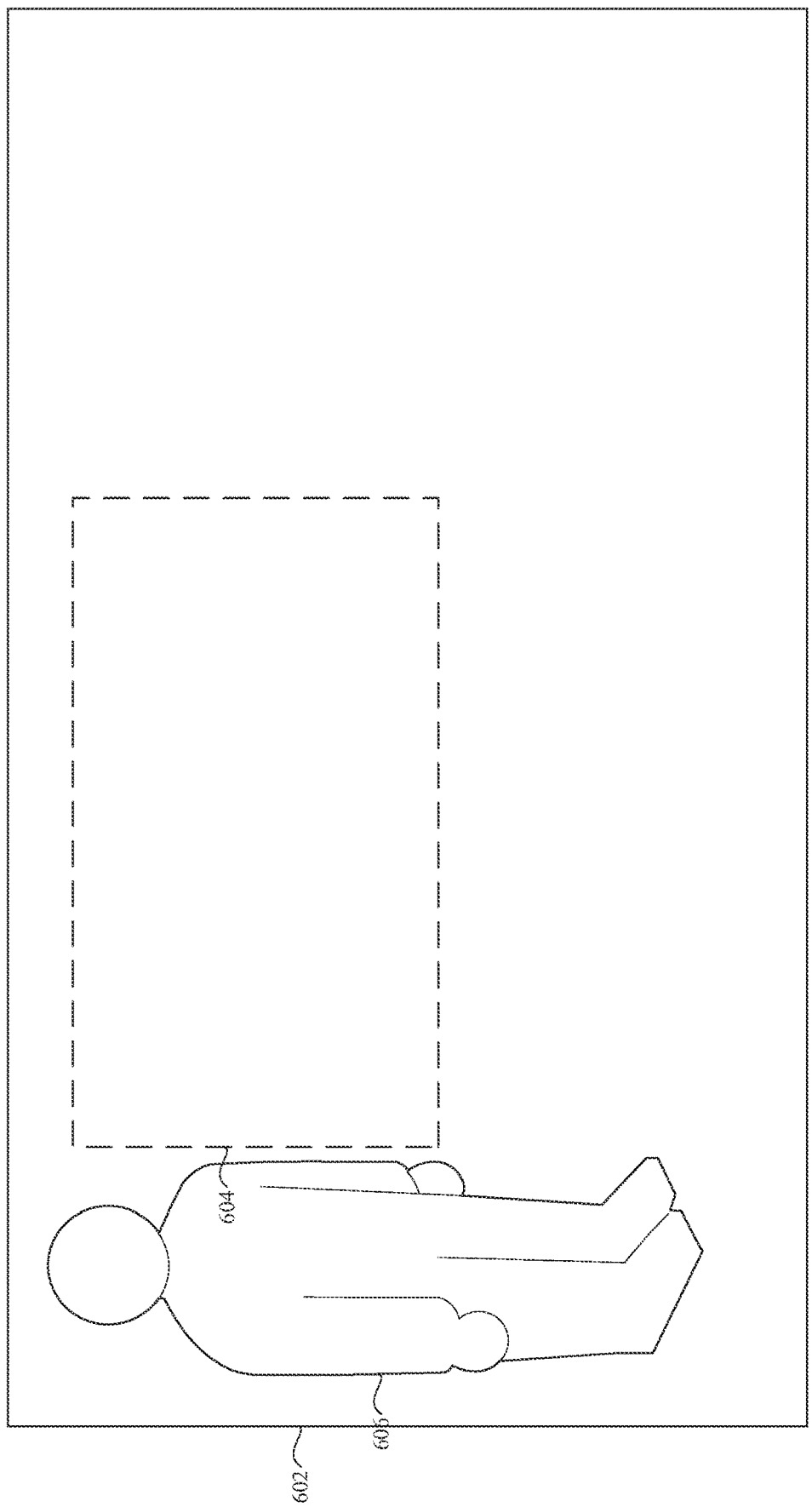
Figure 6N:
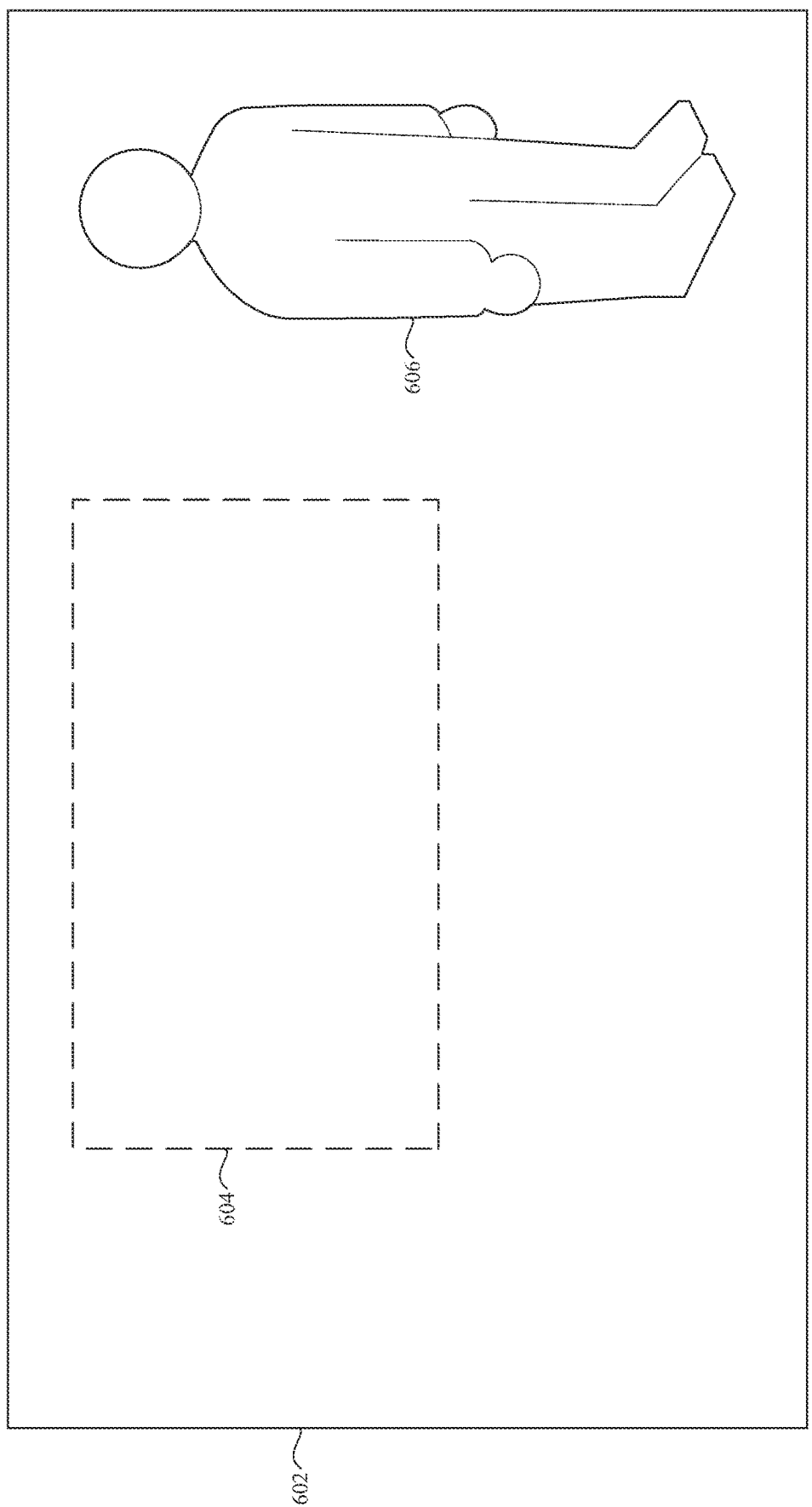
Figure 60:
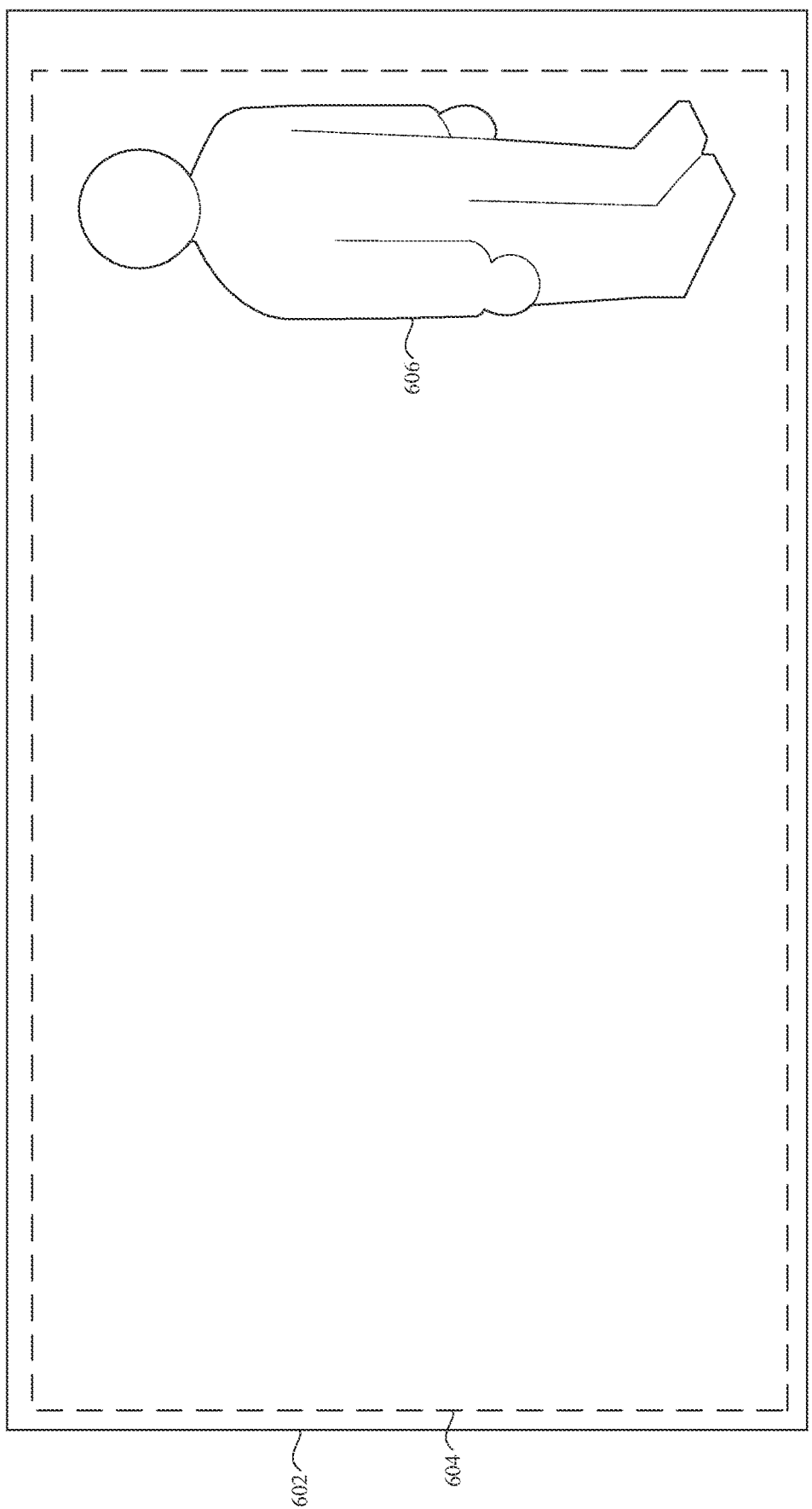

In contrast, the range of movement of the subject 606 from FIG. 6J to FIG. 6K is much shorter than the length of the cropping 604 (e.g., the endpoints of the movement do not fall within the threshold distance of the edges of the cropping). In response to a determination of the range of movement from FIG. 6J to FIG. 6K, a new cropping 604 is optionally determined as illustrated in FIG. 6L that corresponds with the smaller range of movement. The cropping in FIG. 6L allows the subject 606 to occupy more of the frame while still keeping the subject in the frame as long as the range of movement is maintained. In FIGS. 6M and 6N, the range of movement of the subject 606 brings the subject outside the cropping 604. In response to determining that the range of movement exceeds the bounds of the cropping 604, a new cropping 604 is optionally determined as illustrated in FIG. 6O that is expanded to correspond to the larger range of movement.

Figure 6Q:
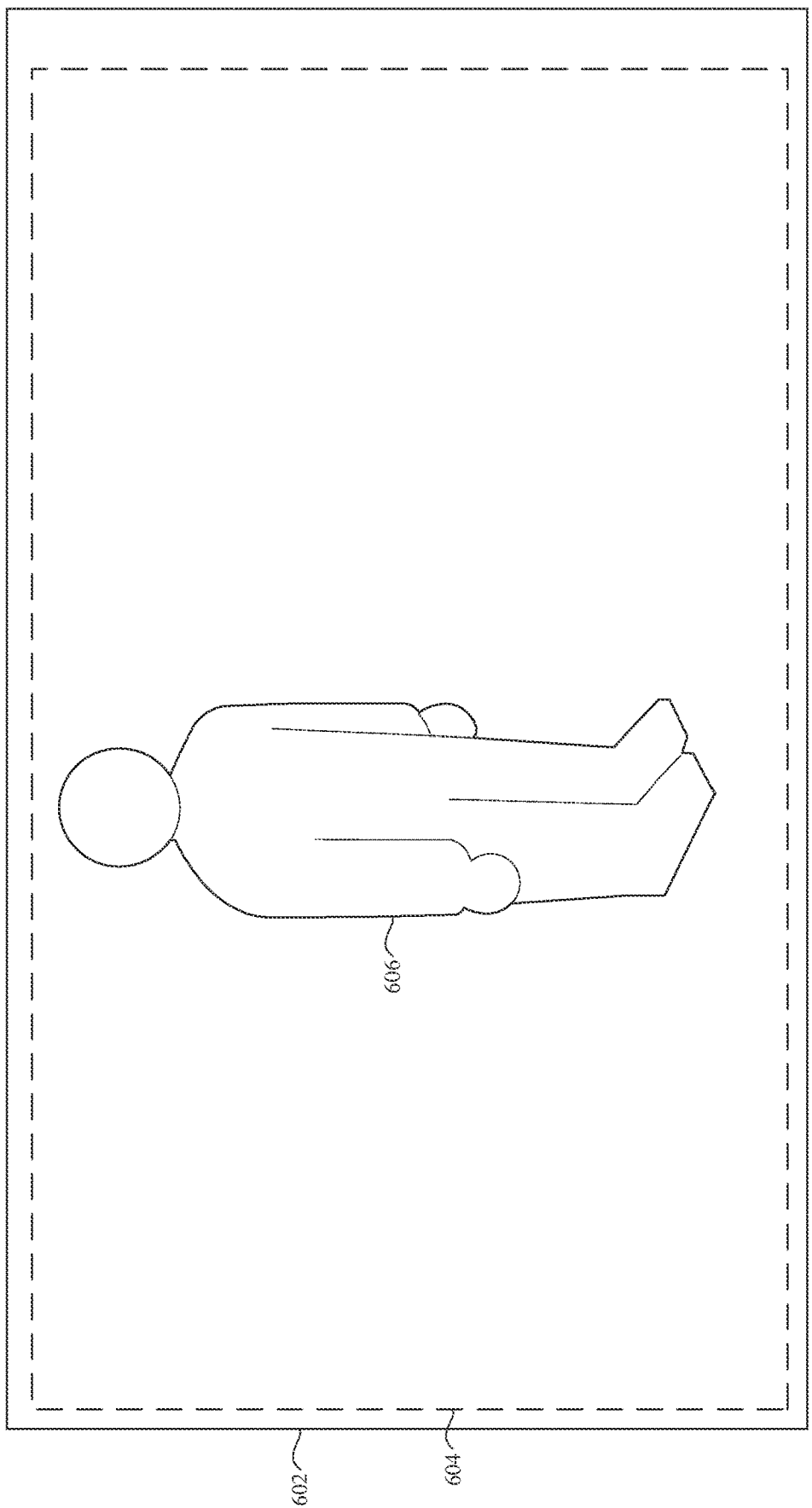
Figure 6R:
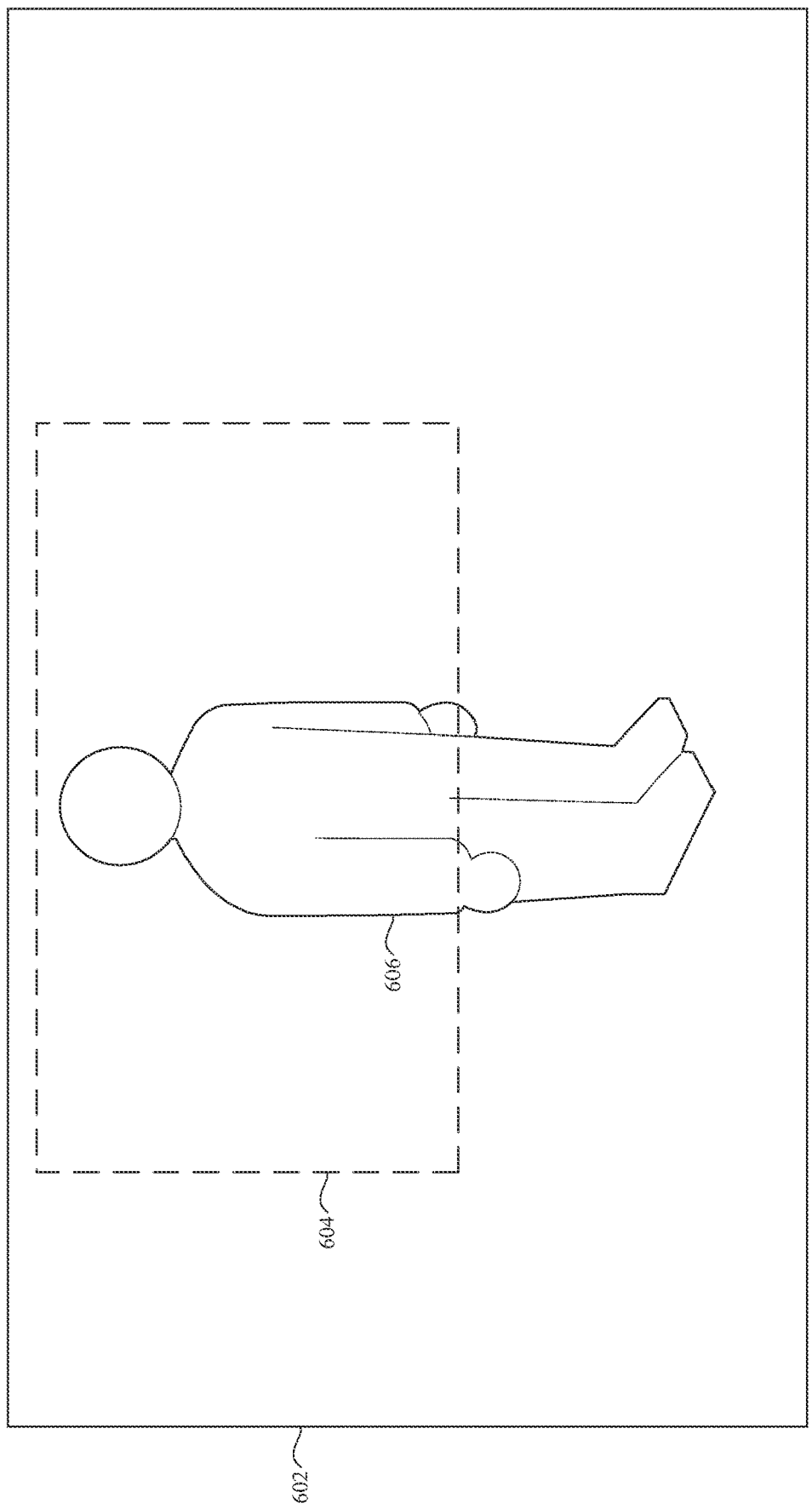

In some embodiments, a cropping is optionally determined in response to a determination that the subject has stopped moving. For example, FIG. 6P illustrates a moving subject 606. In FIG. 6Q, the subject 606 has stopped moving. In response to determining that the subject 606 has stopped moving, a new cropping 604 is optionally determined as illustrated in FIG. 6R that is zoomed in on the stationary subject 606 with respect to the cropping in FIG. 6Q.

Figure 6S:
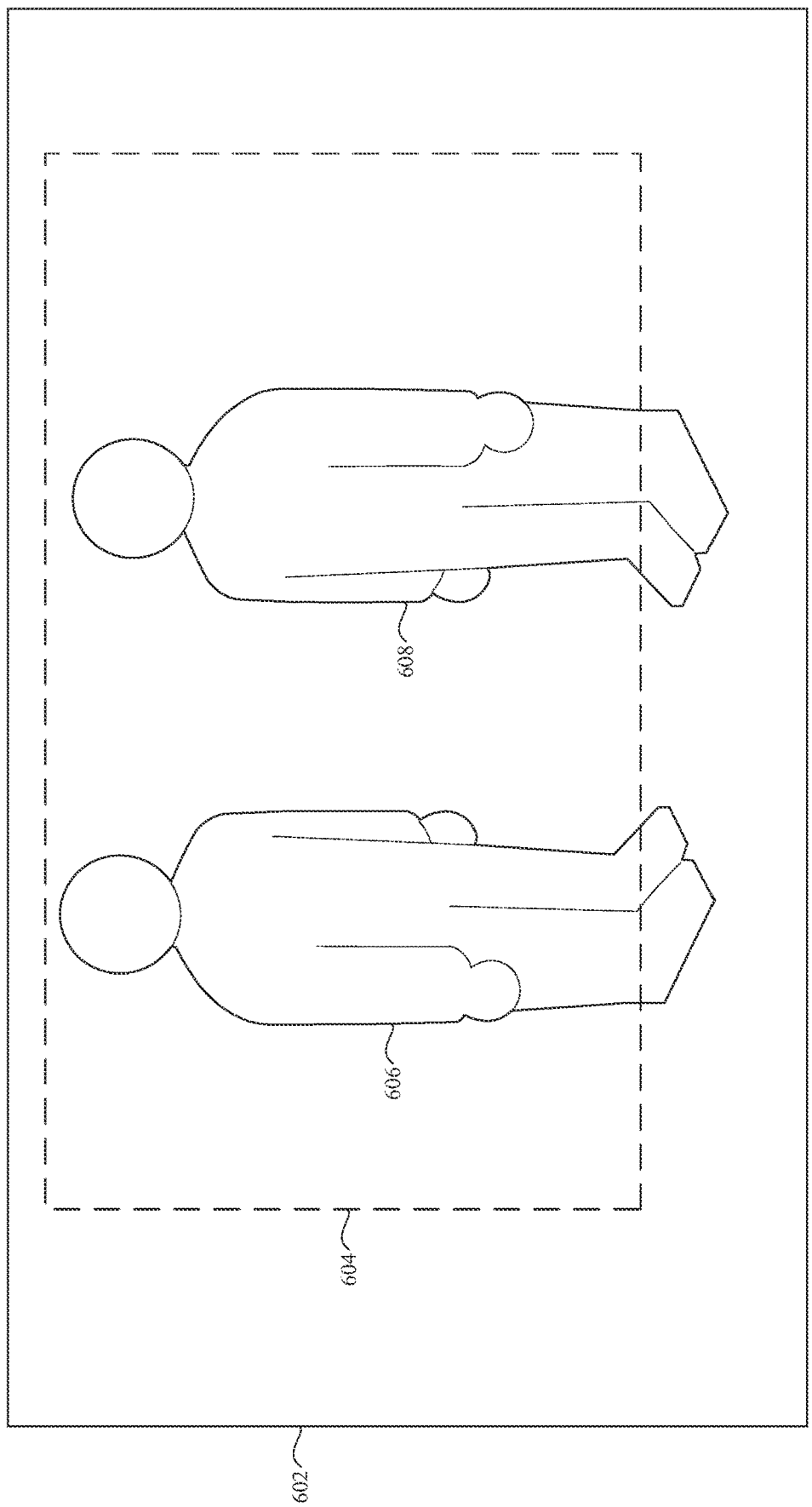

FIGS. 6S-6EE illustrate determining a cropping based on a determination that a subject 606 is active or inactive. Active or inactive status is optionally determined based on the existence of objects identified in the frame, their relationship to each other, their positions or movements within the frame, or other information as will be discussed in further detail below. In some embodiments, activity status is optionally determined based on a subject using another electronic device, such as a phone.

Figure 6T:
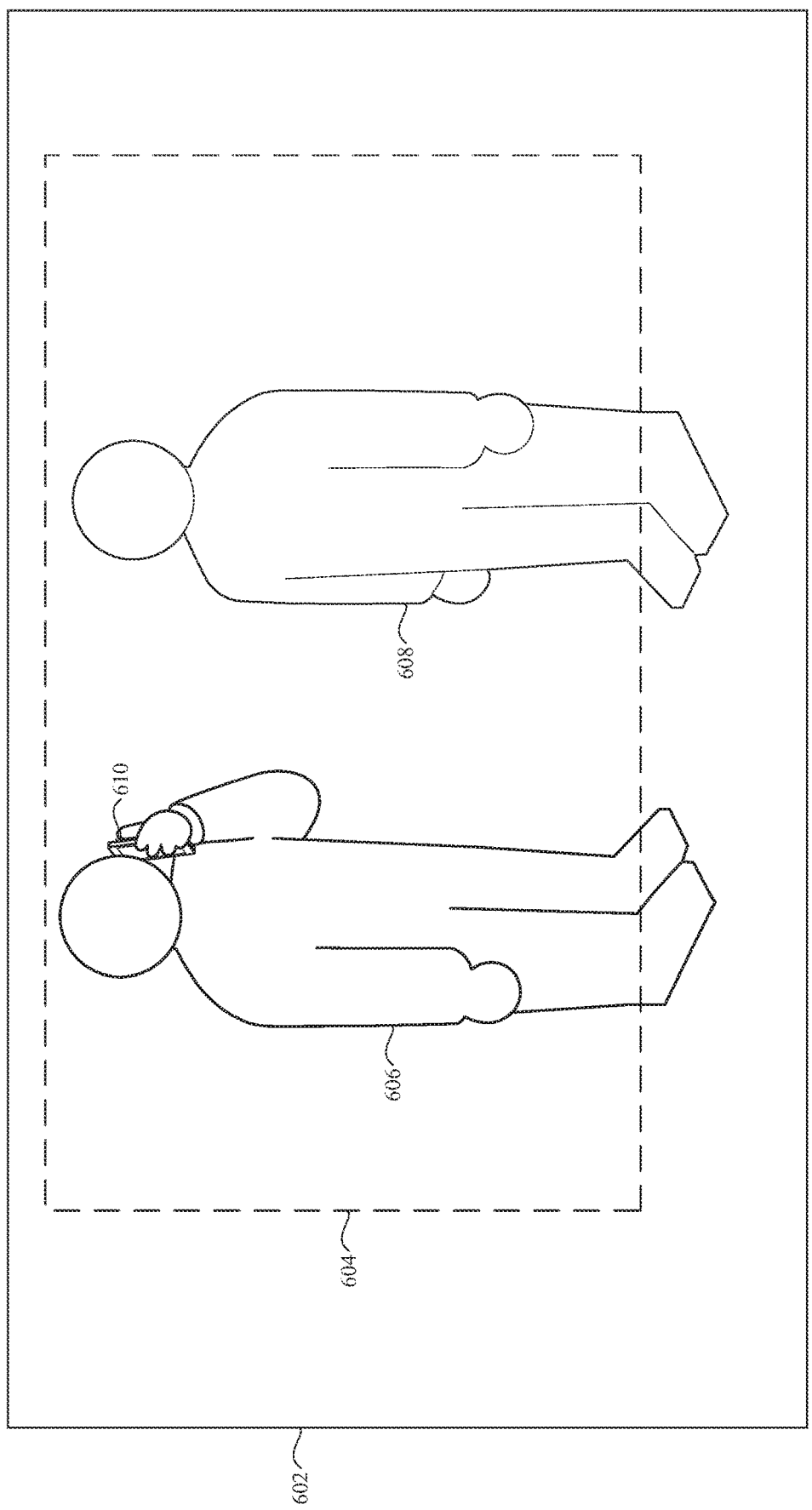

FIG. 6S illustrates subjects 606 and 608 in video content 602. FIG. 6T illustrates subject 606 using phone 610. In response to determining that the subject 606 is using a phone (e.g., based on information received from the phone 610, or based on image recognition of the phone in the hand of subject 606, etc.), it is optionally determined that the subject 606 is inactive. In accordance with a determination that the subject 606 is inactive, the subject 606 is optionally deemphasized in a new cropping 604 illustrated in FIG. 6U, where the cropping 604 is zoomed in on the subject 608 and the subject 606 is excluded from the cropping.

Figure 6U:
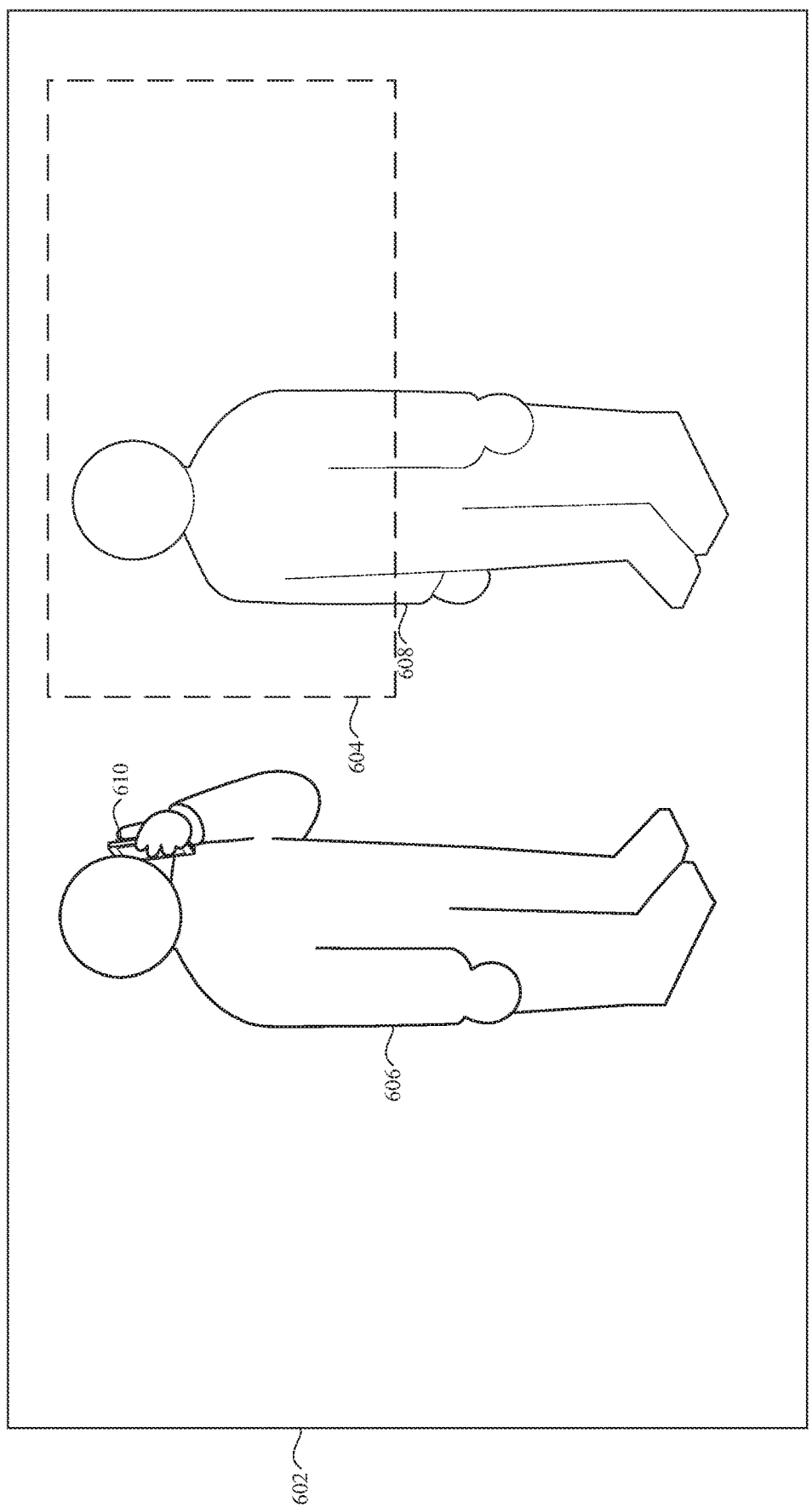
Figure 6V:
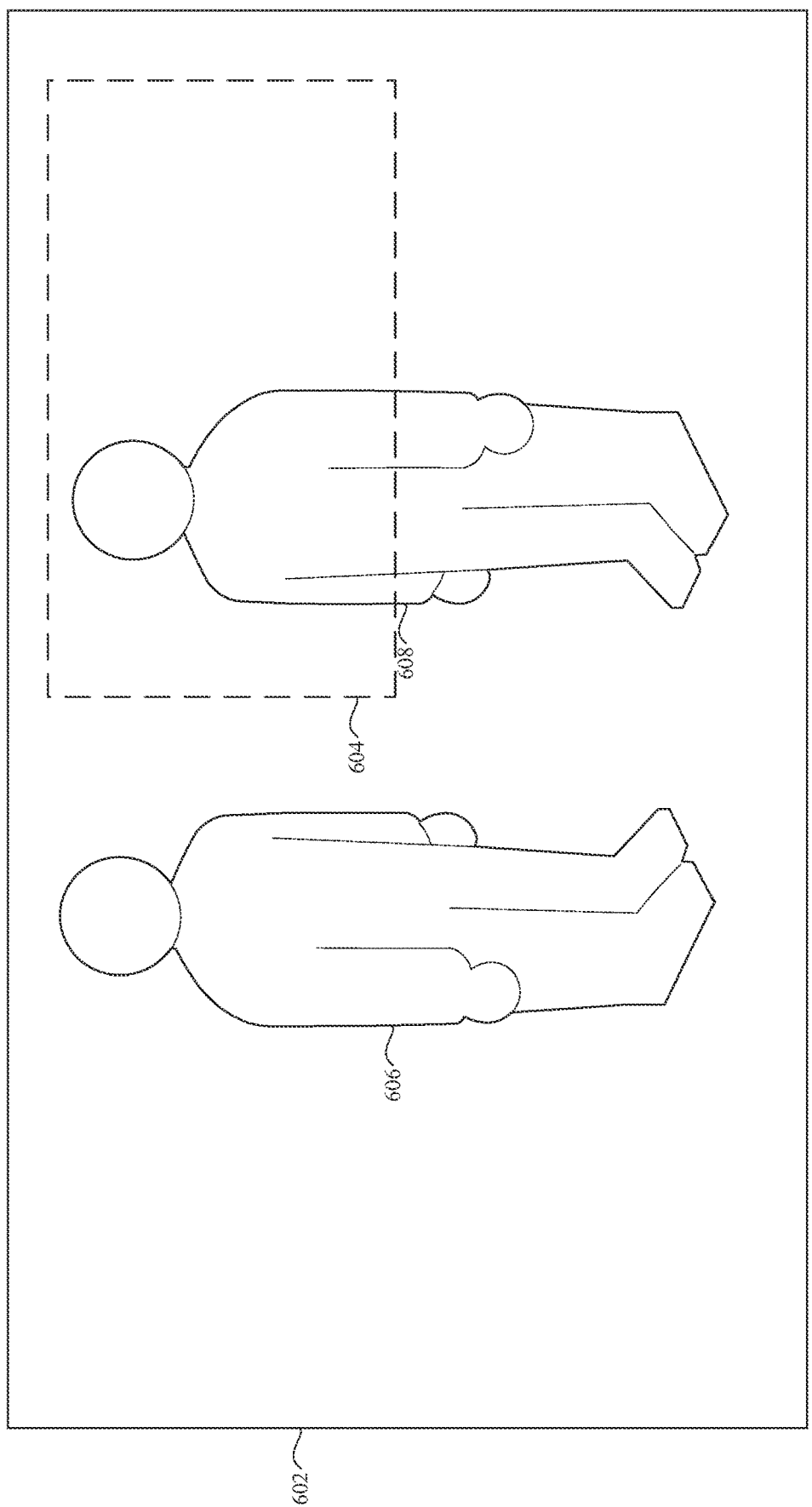

In FIG. 6V, the subject 606 has stopped using the phone 610. In response to determining that the subject 606 is no longer using a phone (e.g., based on information received from the phone 610, or based on image recognition that the phone is no longer in the hand of subject 606, etc.), it is optionally determined that the subject 606 is active. In accordance with a determination that the subject 606 is active, the subject 606 is optionally emphasized in a new cropping 604 illustrated in FIG. 6W, where the cropping 604 is zoomed out to include both subjects 606 and 608.

Figure 6X:
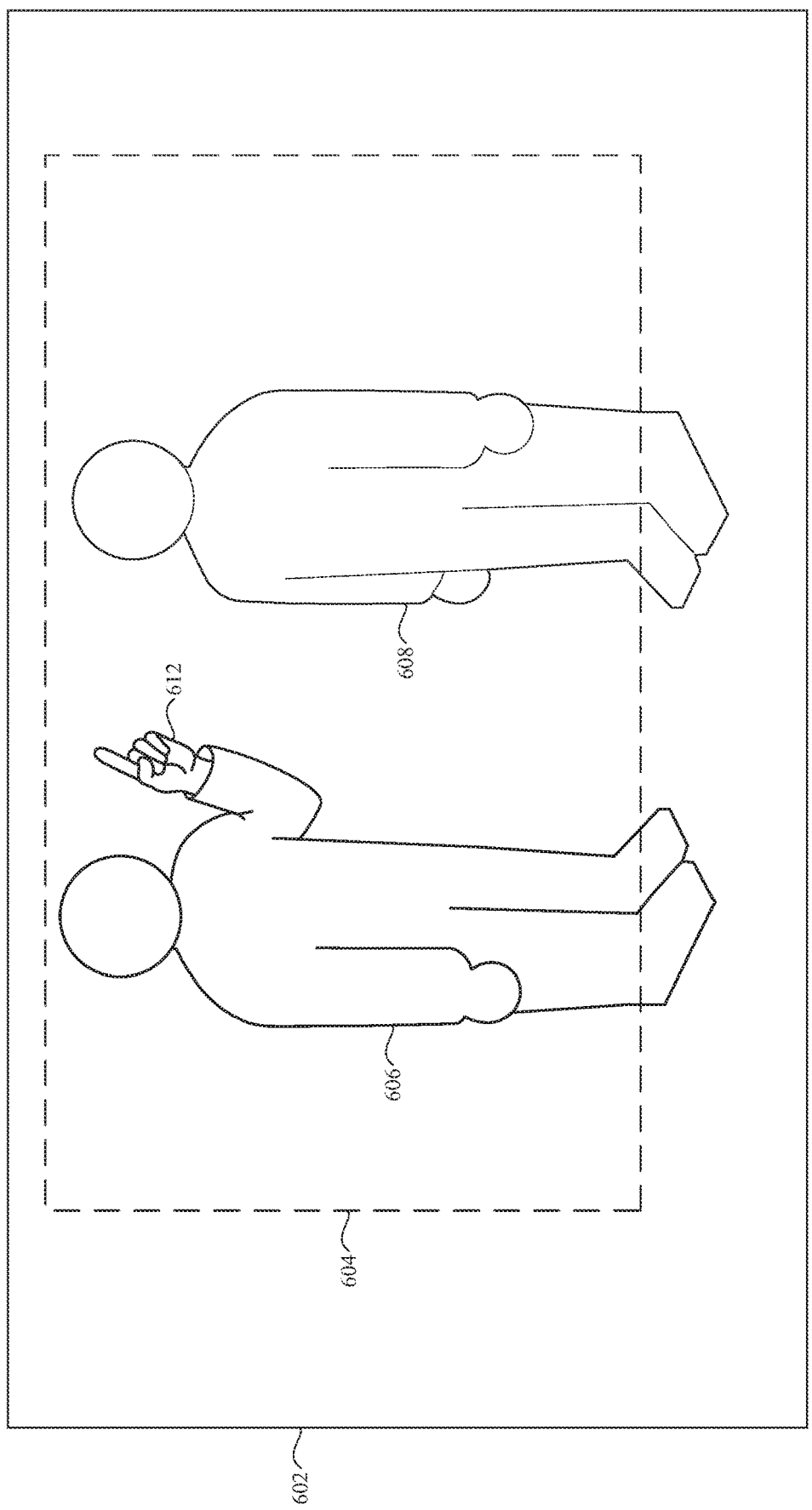
Figure 6Y:
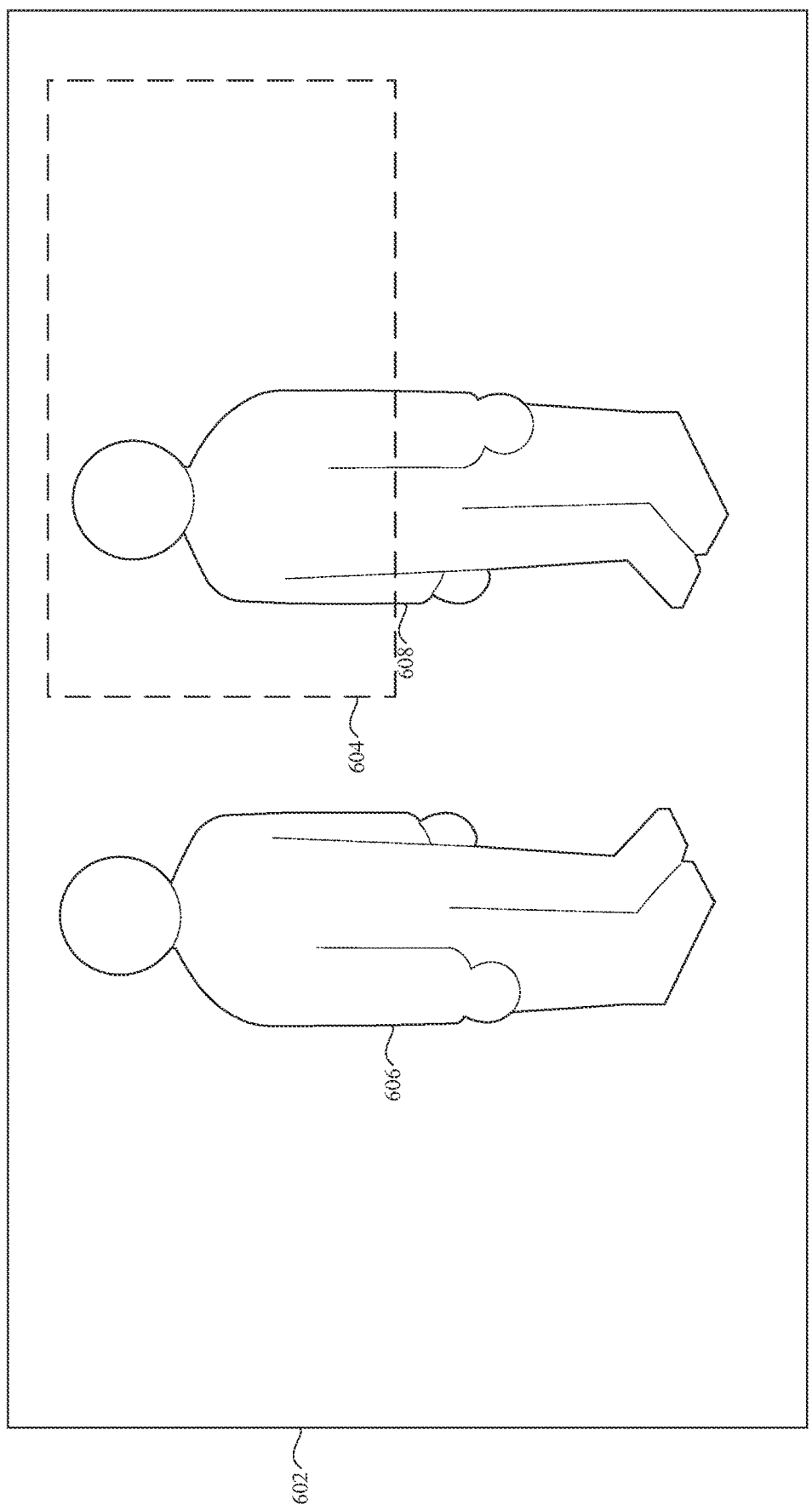
Figure 6Z:
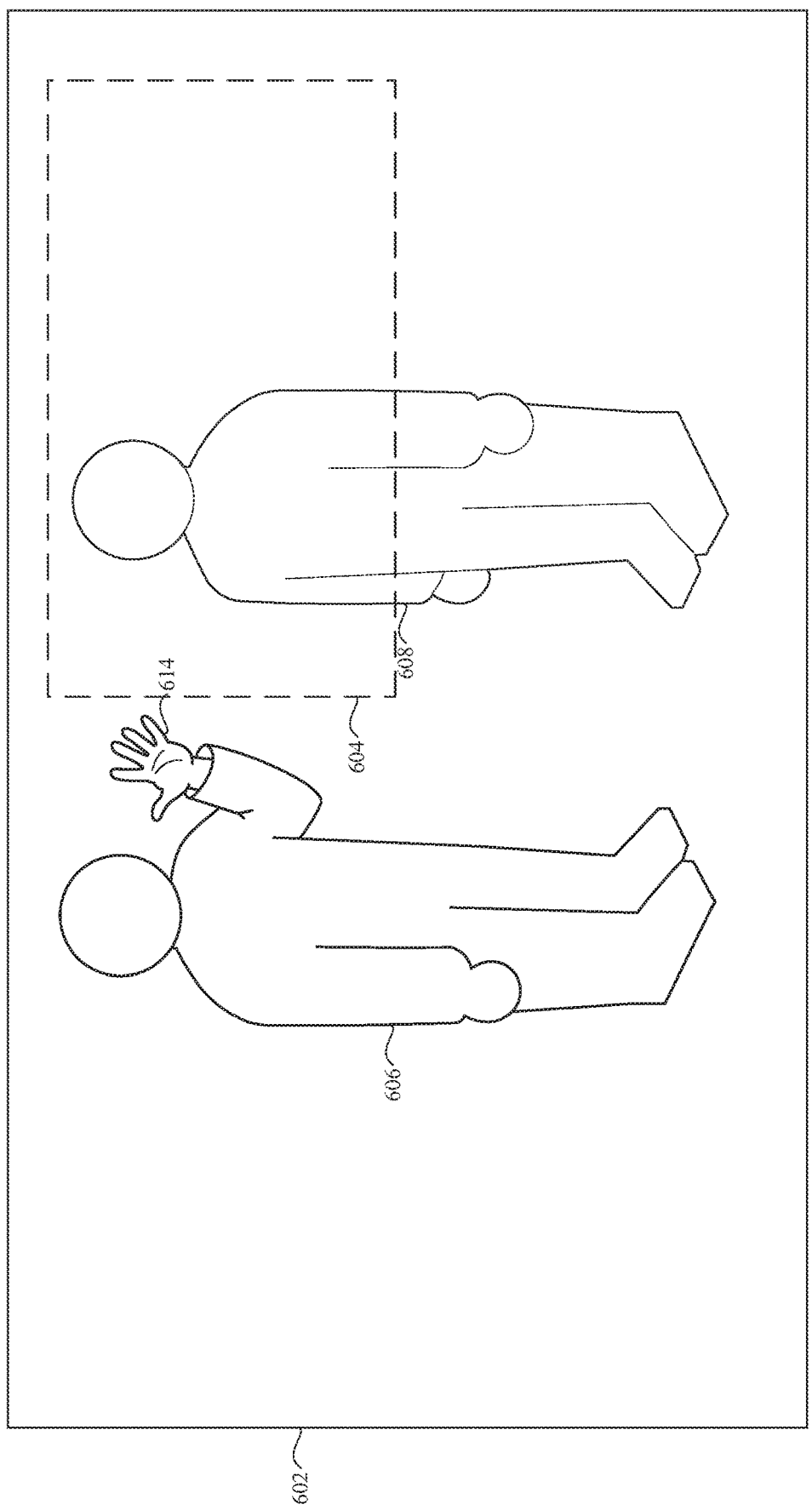
Figure 6C:
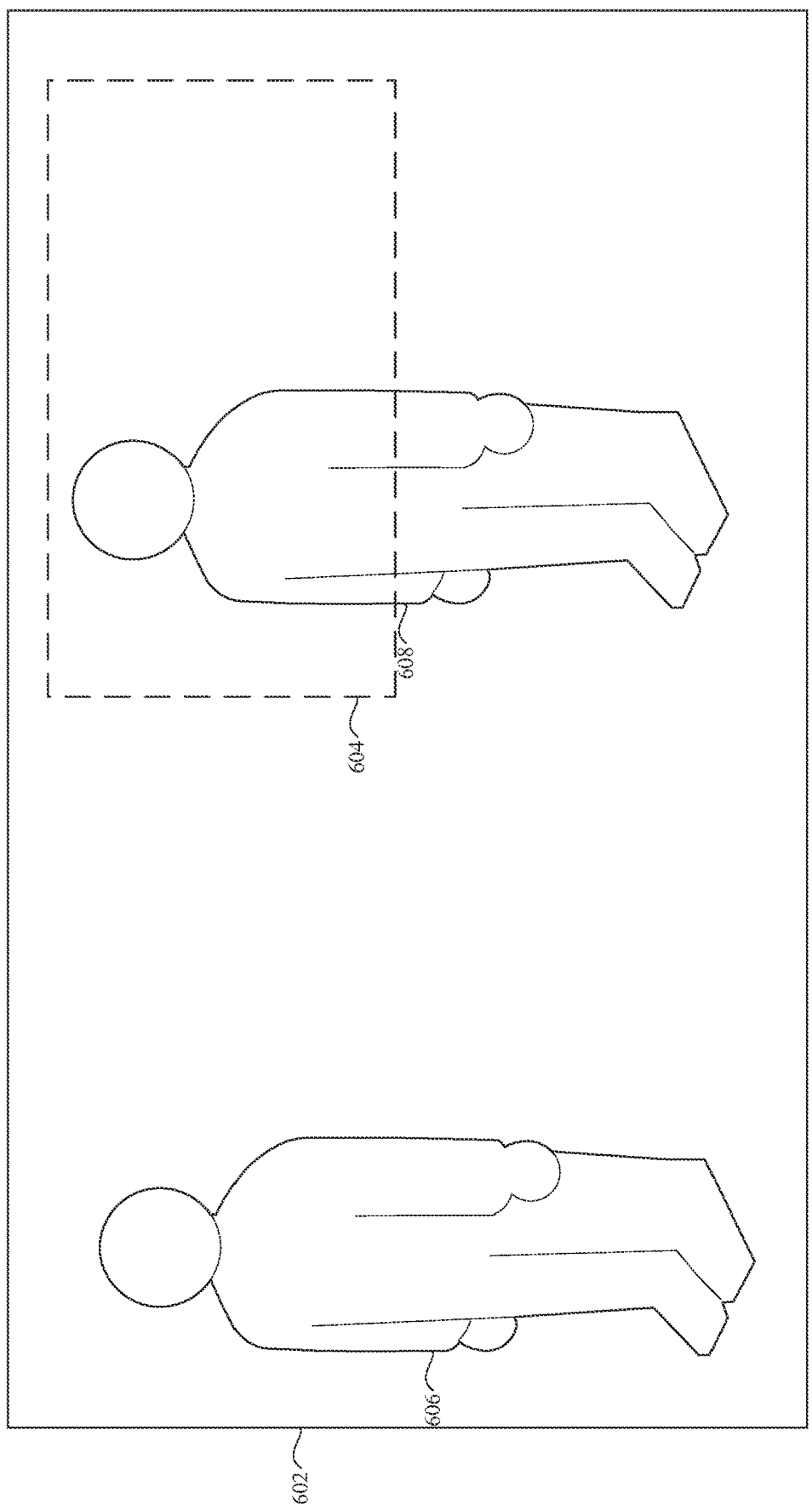
Figure 6D:
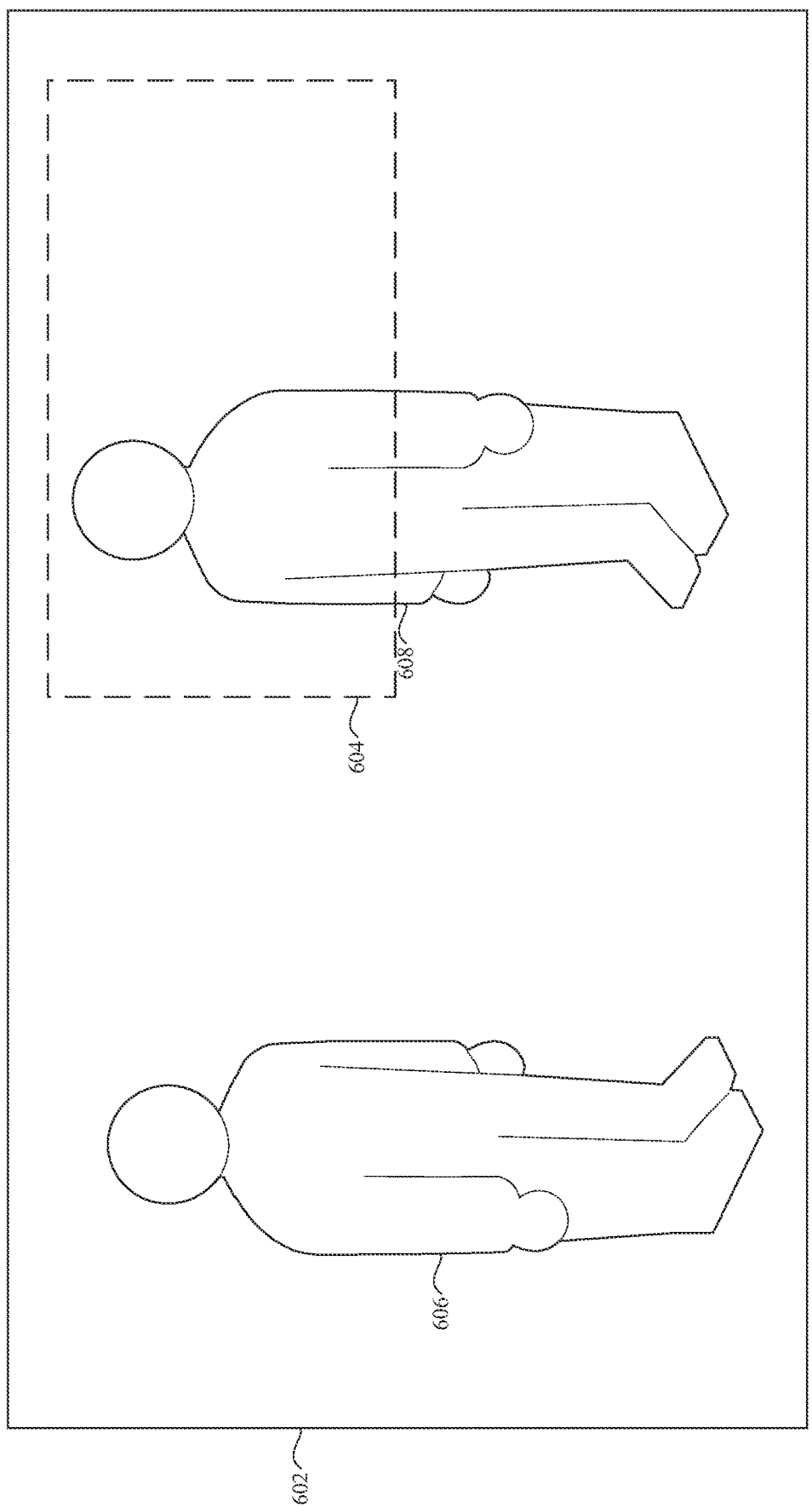
Figure 6E:
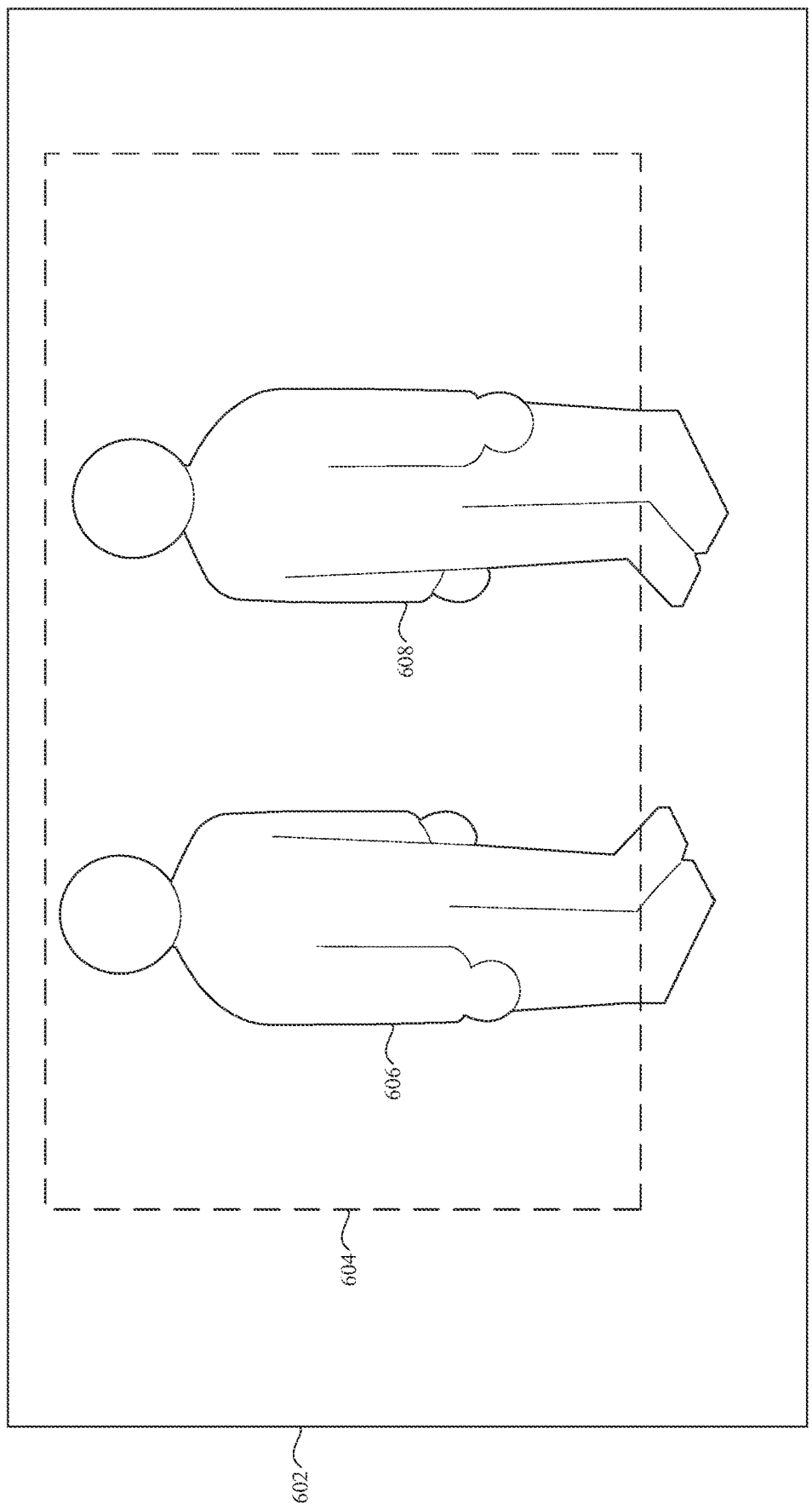
Figure 6F:
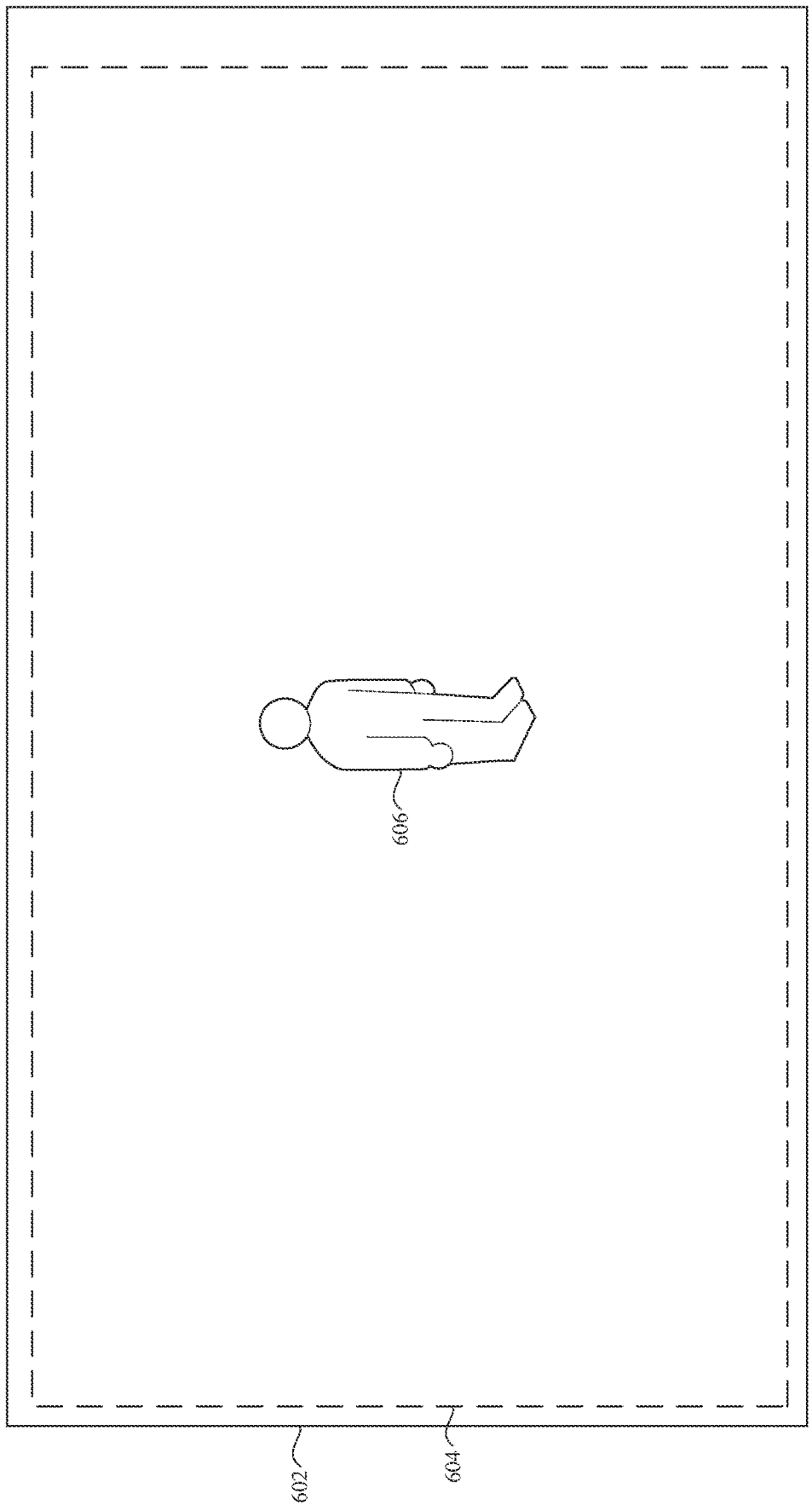
Figure 6G:
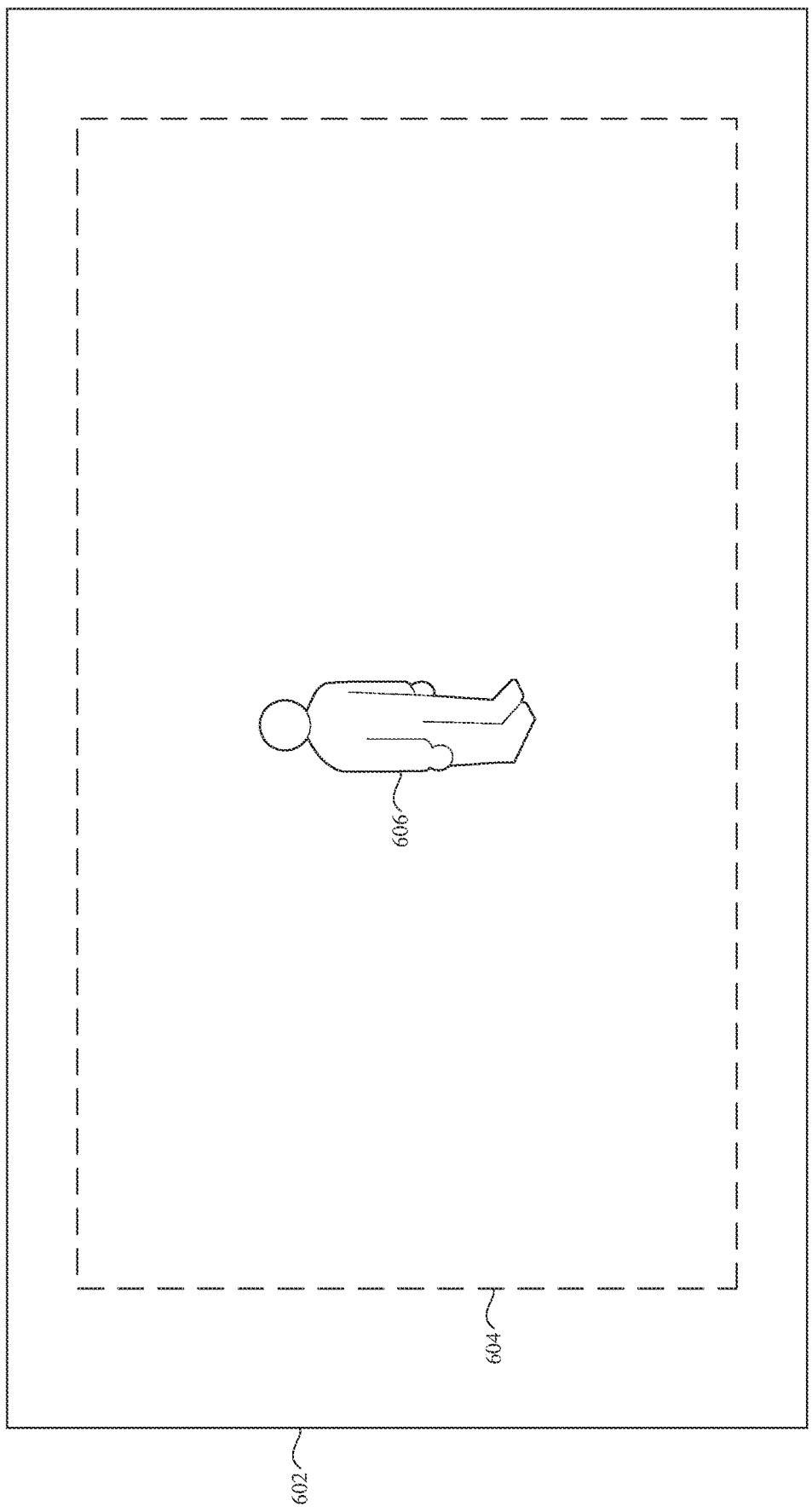
Figure 6H:
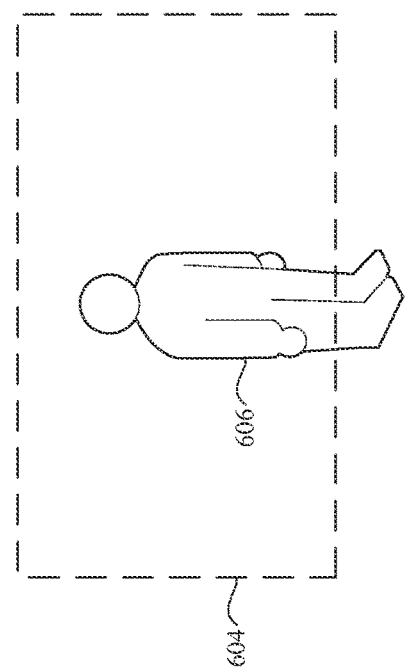
Figure 6K:
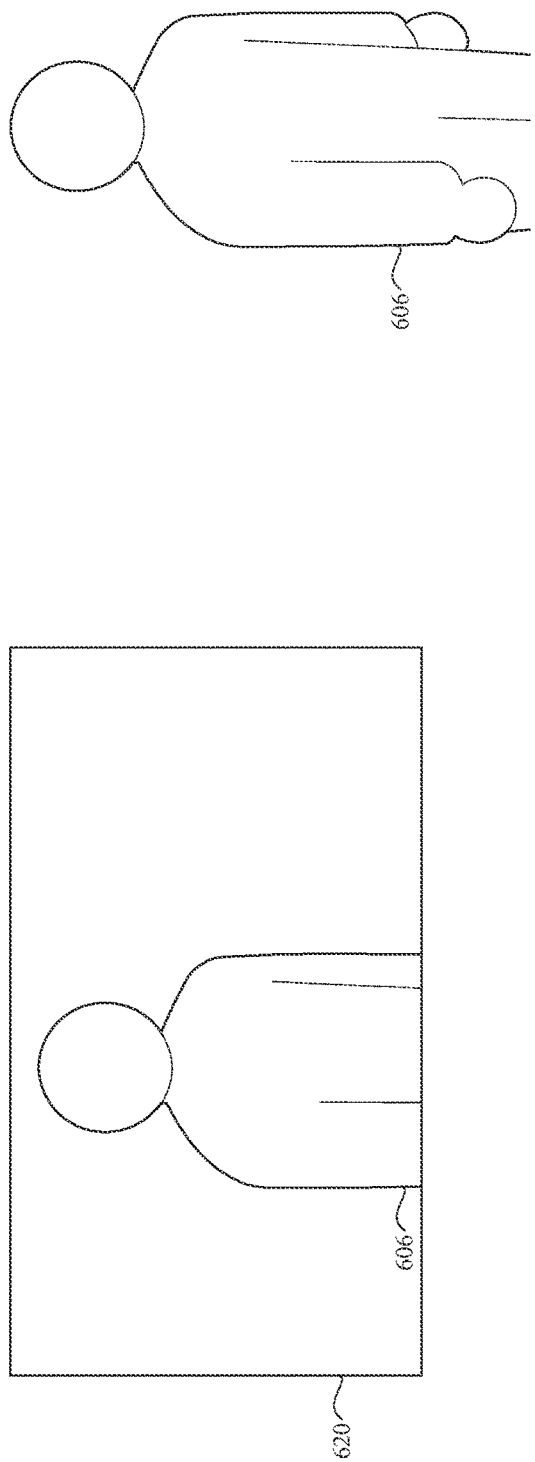
Figure 7A:
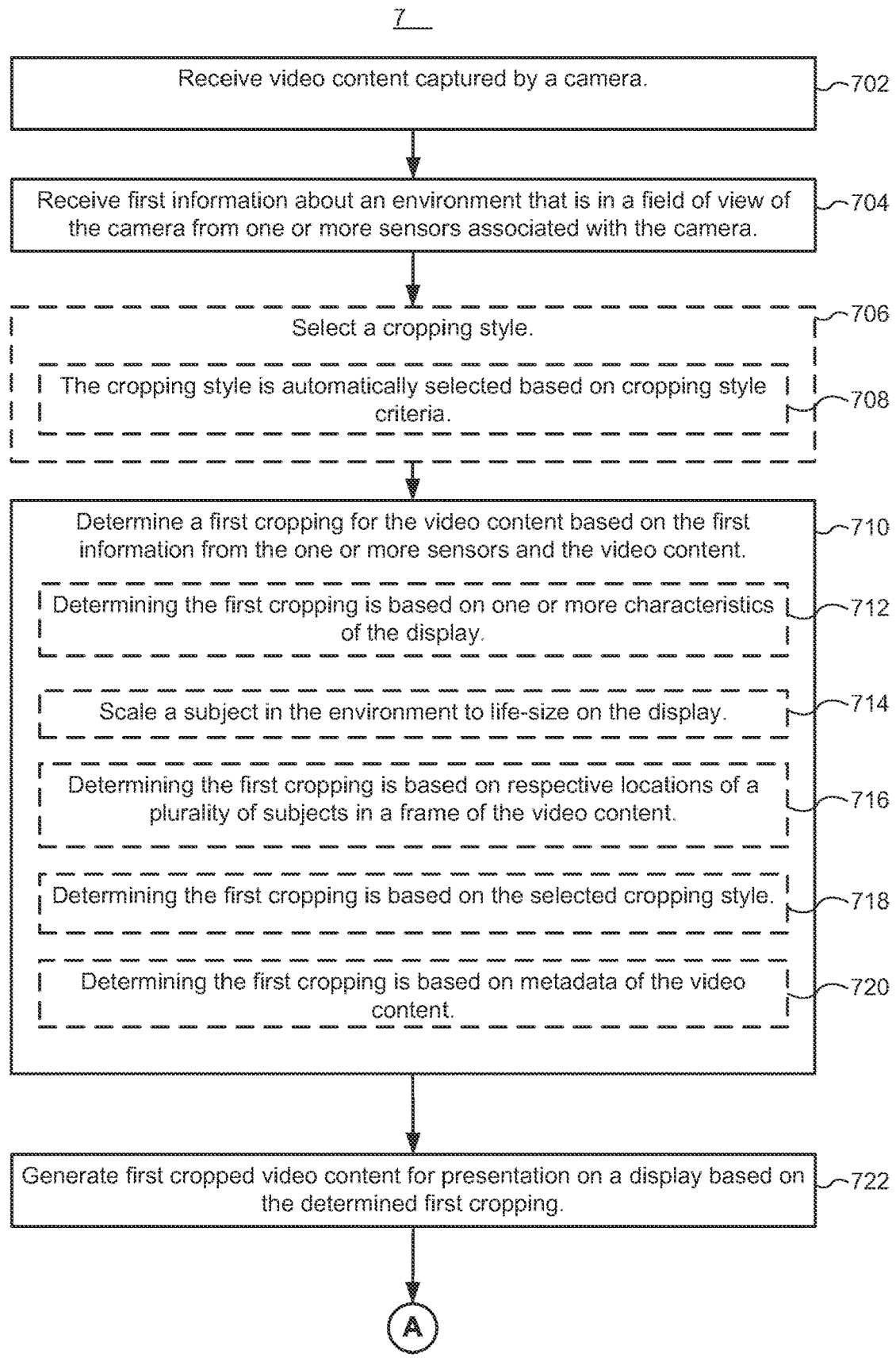
FIGS. 7A-7D are flow diagrams illustrating a method for automatic cropping of video content in accordance with some embodiments.
Figure 7B:
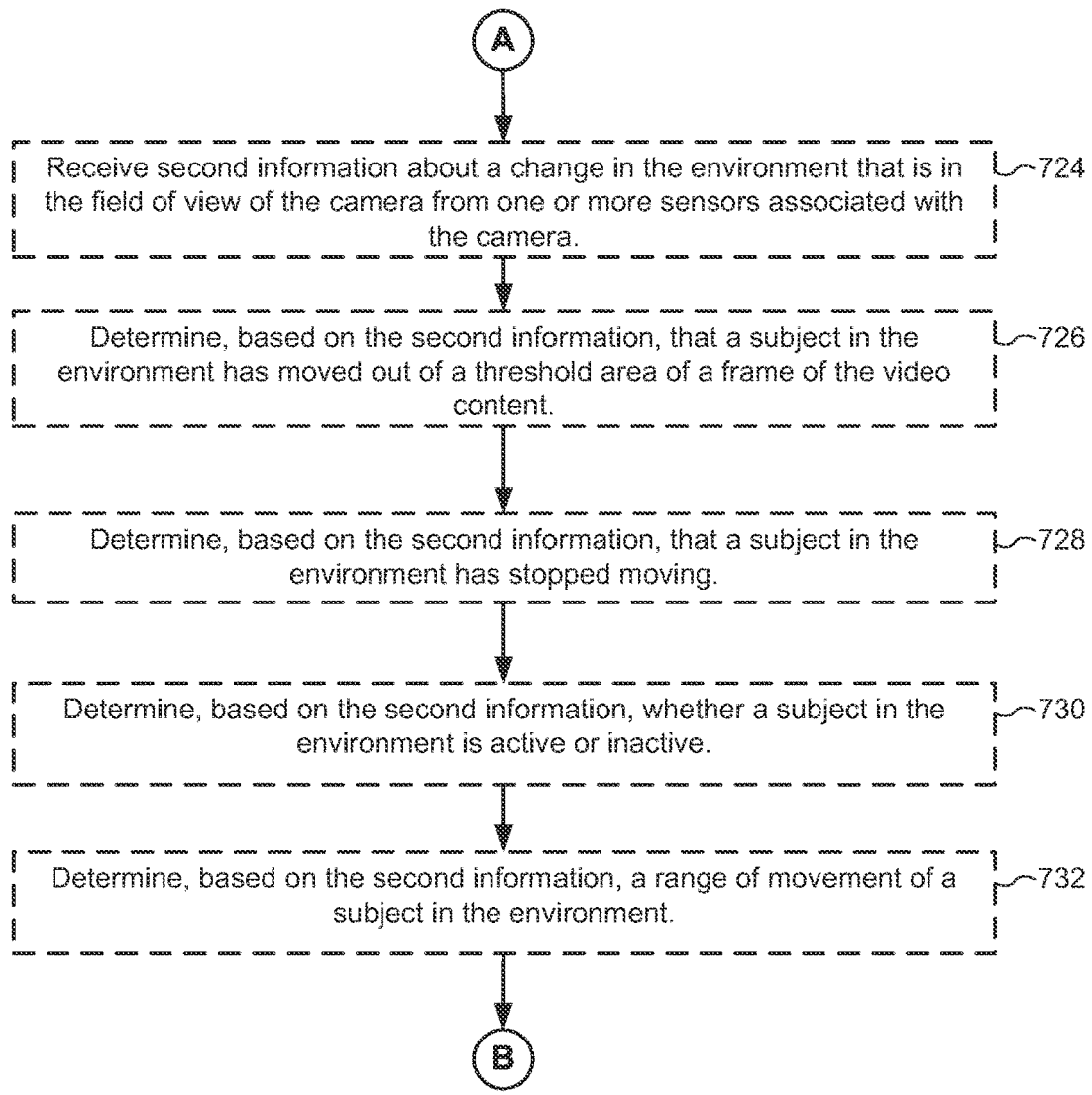
Figure 7C:
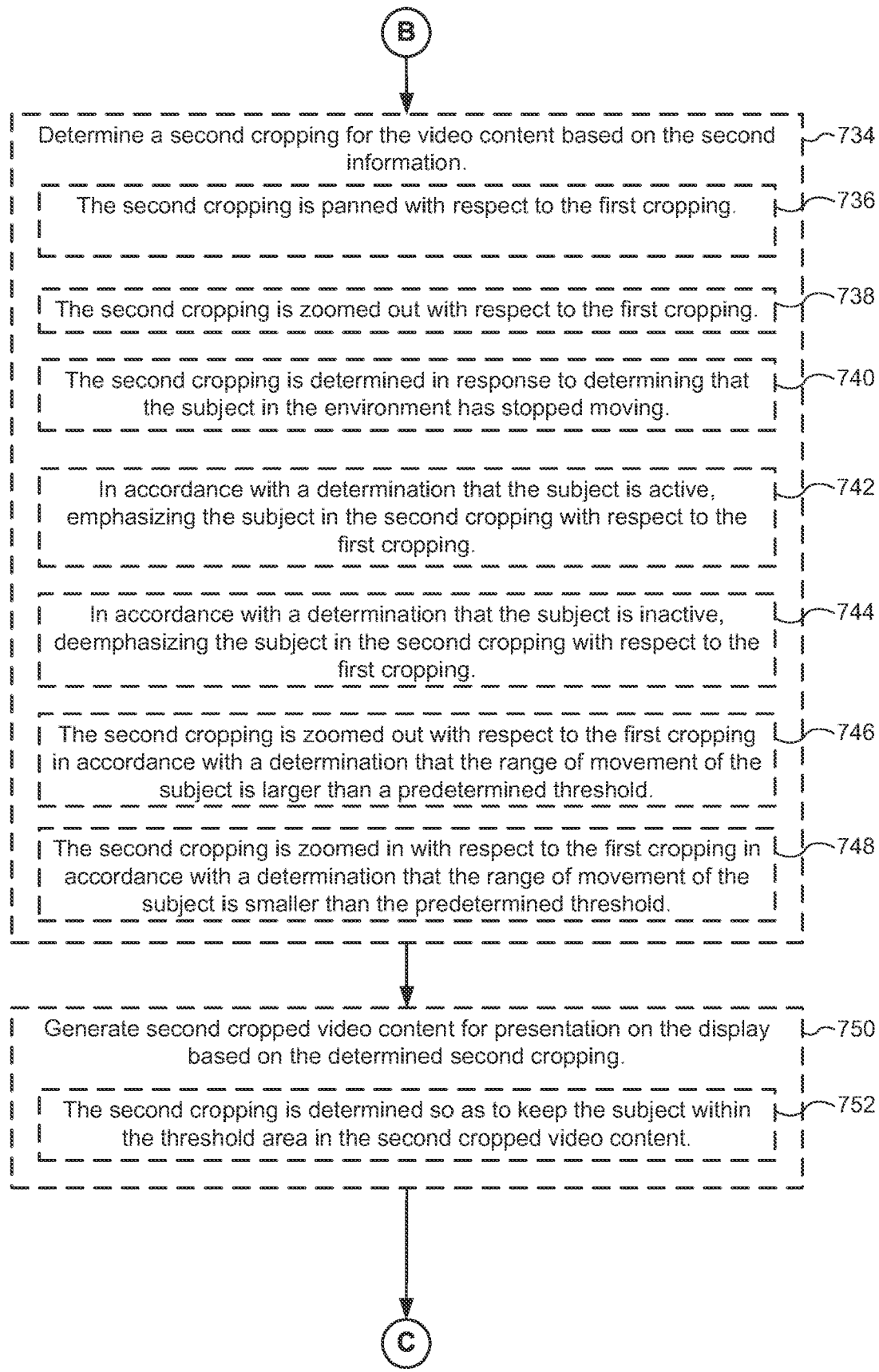
Figure 7D:
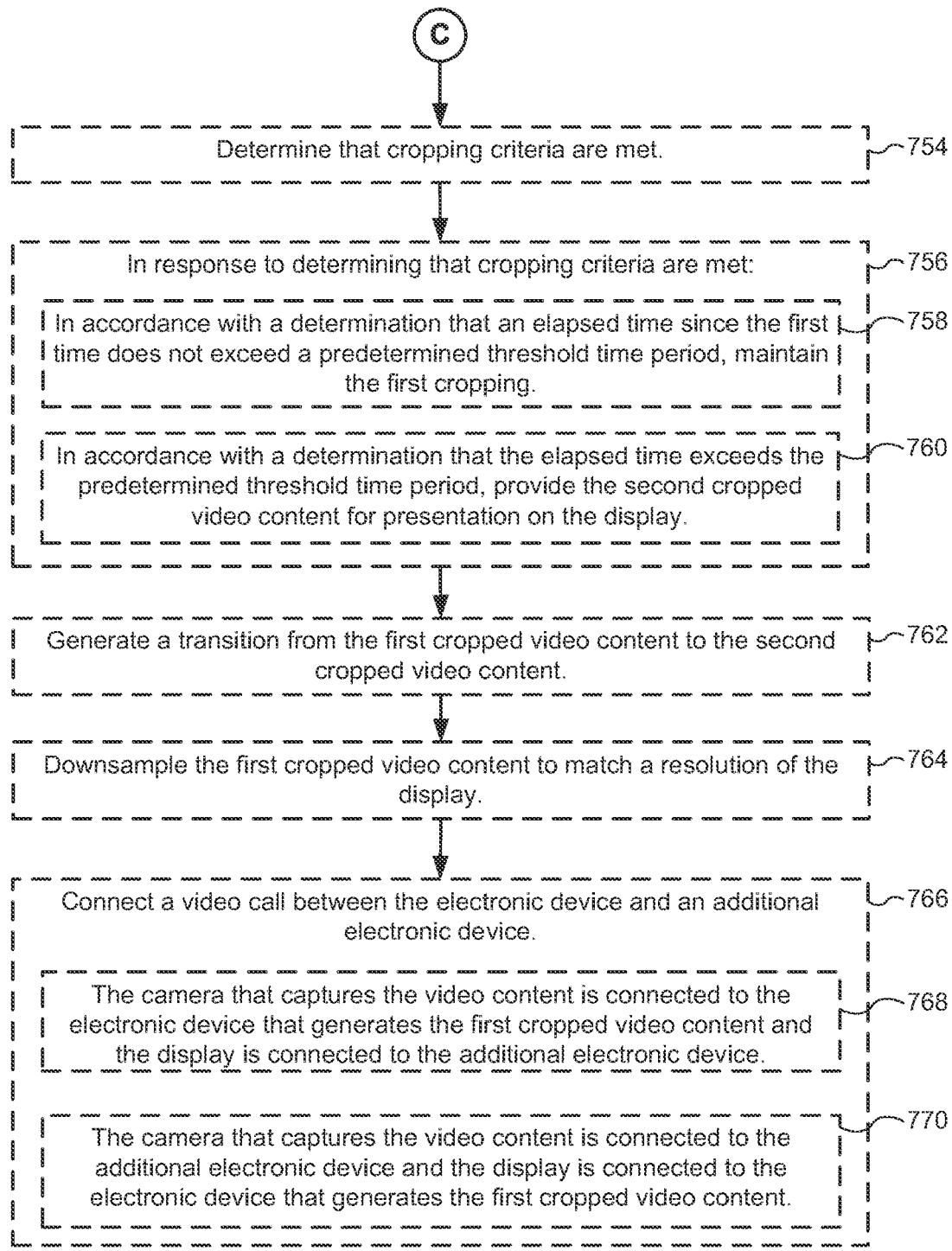

In some embodiments, activity status is optionally determined based on gestures, such as hand gestures. FIG. 6X illustrates subject 606 making a first gesture 612 indicating an inactive status (e.g., holding up a single finger). In response to the first gesture 612, the subject 606 is optionally deemphasized in a new cropping 604 illustrated in FIG. 6Y. FIG. 6Z illustrates subject 606 making a second gesture 614 indicating an active status (e.g., waving a hand). In response to the second gesture 614, the subject 606 is optionally emphasized in a new cropping 604 illustrated in FIG. 6AA.

In some embodiments, activity status is optionally determined based on posture of a subject and/or movement of a subject. FIG. 6BB illustrates subject 606 facing away from subject 608, indicating a desire to leave and, thereby, an inactive status. Optionally, subject 606 may be walking away from subject 608, indicating an inactive status. In response to the posture and/or movement of subject 606, the subject 606 is optionally deemphasized in a new cropping 604 illustrated in FIG. 6CC. FIG. 6DD illustrates the subject 606 facing towards the subject 608, indicating engagement with subject 608 and an active status. Optionally, subject 606 may be walking toward the subject 608, indicating an active status. In response to the posture and/or movement of subject 606, the subject 606 is optionally emphasized in a new cropping 604 in FIG. 6EE.

In some embodiments, a transition from first cropped video content to second cropped video content is optionally generated. For example, FIG. 6FF illustrates a first cropping and FIG. 6II illustrates a second cropping. A jump cut from the cropping in FIG. 6FF to the cropping in FIG. 6II might be jarring for a viewer. One or more intervening croppings are optionally generated to simulate a smooth zoom from, as illustrated in sequence from FIGS. 6FF-6II to create a more aesthetically pleasing viewing experience.

FIGS. 6JJ-6LL illustrate determining a cropping based on a physical size of a display such that the subject is scaled to life-size on the display. For example, the device determines a physical size of the display (e.g., based on metadata about the display), determines a physical size of the subject's face (e.g., based on information from a depth camera), and determines a cropping that will scale the subject's face so that when it is displayed on the display, the face will have physical dimensions that are approximately the same as the subject's face.

FIG. 6JJ illustrates video content 602 including subject 606 and cropped according to the cropping 604. The cropped video content is displayed on display 618, and the face of the subject 606 on the display 618 is illustrated as having approximately the same physical dimensions as the subject's actual face. FIGS. 6KK and 6LL illustrate different sized displays 620 and 622 and corresponding croppings. As illustrated in FIGS. 6JJ-6LL, on a smaller display the cropping is closer to the subject's face so that the subject's face takes up more of the display, whereas on a larger display, the cropping is further from the subject's face so that the subject's face takes up less of the display. Thus, in some embodiments, the cropping of the video is based at least in part on a size of the display on which the cropped video is to be displayed. In some embodiments, when the video is switched from a first display to a second display that is a different size from the first display, the cropping changes to account for the different sizes of the first and second displays.

FIGS. 7A-7D are flow diagrams illustrating a method for automatically cropping video content in accordance with some embodiments. The method is optionally performed at an electronic device as described above with reference to FIGS. 1A-B and 2-5 (e.g., electronic device 100, 300, 500, or 506, etc.). Optional or alternative operations in FIGS. 7A-7D are indicated in dashed boxes. Some operations in method 700 are, optionally, combined and/or the order of some operations is, optionally, changed.

As described below, the method 700 provides ways automatically cropping video content. The method reduces the cognitive burden on a user when interacting with a user interface on the device by automatically selecting a desirable cropping presentation for video content so that the user does not need to manually determine an appropriate cropping, thereby creating a more efficient human-machine interface. For battery-operated electronic devices, increasing the efficiency of the user's interaction with the user interfaces conserves power and increases the time between battery charges.

An electronic device 500 (e.g., a set top box or other device that is optionally in communication with a display device and/or a camera) with one or more processors and memory receives (702) video content (e.g., video content 602) captured by a camera (e.g., camera 504 or 510). The electronic device optionally receives (704) first information about an environment that is in a field of view of the camera from one or more sensors associated with the camera (e.g., a microphone, a depth camera, a thermal camera, a video camera, or other sensors, including sensors of a local device or a remote device separate from the electronic device that are sensing objects and/or activity in the field of view of the camera).

The electronic device determines (710) a first cropping (e.g., cropping 604) for the video content based on one or more of the first information from the one or more sensors and the video content (e.g., image recognition information), and generates (722) first cropped video content for presentation on a display (e.g., a display 508 of a an additional device 506 or a display 502 of the electronic device 500) based on the determined first cropping. For example, FIG. 6A illustrates video content 602 cropped according to cropping 604 displayed on display 600.

In some embodiments, the electronic device 500 optionally receives (724) second information about a change in the environment that is in the field of view of the camera from one or more sensors associated with the camera, and/or a change in the video content, determines (734) a second cropping for the video content based on the second information, and generates (750) second cropped video content for presentation on the display based on the determined second cropping.

In some embodiments, the electronic device 500 optionally determines (726), based on the second information and/or changes in the video content, that a subject (e.g., a person such as subject 606 in FIG. 6C) in the environment has moved out of a threshold area of a frame of the video content (e.g., the threshold area is defined by a rectangle surrounding the inner two-thirds of the frame that corresponds to the first cropping of the vide content, among other possibilities), and the second cropping is determined (752) so as to keep the subject within the threshold area in the second cropped video content (e.g., as illustrated in FIGS. 6D and 6E, showing new croppings 604 that keep the subject 606 within the cropping). In some embodiments, the second cropping is panned (736) with respect to the first cropping (as illustrated in FIG. 6D). In some embodiments, the second cropping is zoomed out (738) with respect to the first cropping (as illustrated in FIG. 6E).

In some embodiments, the electronic device 500 determines that a subject (e.g., a person such as subject 606 in FIG. 6F) in the environment is within a threshold area of a frame of the video content (e.g., the threshold area is defined by a rectangle surrounding the inner one-third of the frame, among other possibilities), the second cropping is determined in response to determining that the subject in the environment is within the threshold area, and the second cropping is zoomed in with respect to the first cropping (as illustrated in FIG. 6G, showing a new cropping 604 that is zoomed in on subject 606).

In some embodiments, the electronic device 500 determines (728), based on the second information and/or changes in the video content, that a subject (e.g., a person such as subject 606 in FIG. 6Q) in the environment has stopped moving, and the second cropping is determined (740) in response to determining that the subject in the environment has stopped moving (as illustrated in FIG. 6R, showing a new cropping 604 that is zoomed in on the stationary subject 606).

In some embodiments, the electronic device 500 determines (754) that cropping criteria are met (e.g., a subject has moved outside a threshold area or within a threshold area, a subject has stopped moving, etc.). In response to determining that the cropping criteria are met (756), in accordance with a determination that an elapsed time since the first cropping was determined does not exceed a predetermined threshold time period, the electronic device maintains (758) the first cropping (e.g., so that the image is not re-cropped too often). In accordance with a determination that the elapsed time exceeds the predetermined threshold time period, the electronic device provides (760) the second cropped video content for presentation on the display (e.g., once the threshold time period is met, automatically re-crop in response to determining that the cropping criteria are met).

In some embodiments, the electronic device 500 determines (730), based on the first or second information and/or the video content whether a subject in the environment is active or inactive (e.g., based on information indicating that the subject 606 is on the phone 610, as illustrated in FIG. 6T; in response to a gesture 612 or 614 with hand, device, or object, as illustrated in FIGS. 6X and 6Z; or recognizing posture/movement of a subject getting up to leave or returning to the conversation, as illustrated in FIGS. 6BB and 6DD). In accordance with a determination that the subject is active, the electronic device emphasizes (742) (e.g. zooming in on) the subject in the second cropping with respect to the first cropping (e.g., to focus on the active subject 606, as illustrated in FIGS. 6W, 6AA, and 6EE). In accordance with a determination that the subject is inactive, the electronic device deemphasizes (744) the subject in the second cropping with respect to the first cropping. (e.g., cropping out the inactive subject 606, as illustrated in FIGS. 6U, 6Y, and 6CC).

In some embodiments, the electronic device 500 determines (732), based on the second information, a range of movement of a subject in the environment (e.g., determine bounds of the range of movement of the subject and/or determine if the movement is outside the first cropping for the video content, as illustrated in FIGS. 6H-6R). The second cropping is optionally zoomed out (746) with respect to the first cropping (e.g., zoomed out to fit a relatively large range of movement, as illustrated in FIG. 6O) in accordance with a determination that the range of movement of the subject is larger than a predetermined threshold (e.g., a threshold determined based on the first cropping for the video content, such as the cropping in FIGS. 6M and 6N). The second cropping is optionally zoomed in (748) with respect to the first cropping (e.g., zoomed out to fit a relatively small range of movement, as illustrated in FIG. 6L) in accordance with a determination that the range of movement of the subject is smaller than the predetermined threshold (e.g., as illustrated in FIGS. 6J and 6K).

In some embodiments, the electronic device 500 generates (762) a transition from the first cropped video content to the second cropped video content (e.g., generating one or more intervening croppings between the first cropping and the second cropping to simulate a smooth zoom and/or pan, as illustrated in FIGS. 6FF-6II).

In some embodiments, the display has one or more characteristics (e.g., a physical size, a resolution, a color depth, or other display characteristics) and determining the first cropping is based on the one or more characteristics of the display (712). In some embodiments, determining the first cropping includes scaling (714) a subject in the environment to life-size on the display. For example, the device determines a physical size of the display, determines a physical size of the subject's face, and determines a cropping that will scale the subject's face so that when it is displayed on the display, the face will have physical dimensions that are approximately the same as the subject's face. Thus, on a smaller display the cropping would be closer to the subject's face so that the subject's face takes up more of the display, whereas on a larger display, the cropping would be further from the subject's face so that the subject's face takes up less of the display, as illustrated in FIGS. 6JJ-6LL. Thus, in some embodiments, the cropping of the video is based at least in part on a size of the display on which the cropped video is to be displayed. In some embodiments, when the video is switched from a first display to a second display that is a different size from the first display, the cropping changes to account for the different sizes of the first and second displays.

In some embodiments, the electronic device 500 determines (716) respective locations of a plurality of subjects in a frame of the video content, wherein the first cropping is determined based on the respective locations (e.g., so that the plurality of the subjects are within the cropped frame, as illustrated in FIGS. 6S, 6W, 6AA, and 6EE).

In some embodiments, the electronic device 500 selects (706) a cropping style (e.g., based on user input or automatically), and the first cropping is determined based on the selected cropping style (718). For example, a style optionally specifies one or more of a frequency of re-determining croppings, a speed of transition between croppings, or a tightness of zoom on subjects, etc. In some embodiments, the cropping style is automatically selected (708) based on cropping style criteria. For example, if subjects move out of the frame more than a threshold number of times during a predetermined time period (e.g., more than three times in a minute), then a new cropping style is optionally selected that does not zoom in as tightly on subjects as in a previously selected cropping style. This newly selected cropping style thereby results in less frequent re-determinations of croppings, avoiding user confusion and discomfort.

In some embodiments, determining the first cropping is further based on metadata (720) of the video content (e.g., resolution of the video content, field of view of the video camera). For example, if the resolution of the video content is relatively high, then more of the content can be cropped out without sacrificing image quality, whereas if the resolution of the video content is relatively low, the content cannot be too tightly cropped without resulting in an image that is of poor quality due to low resolution. In some embodiments, the first cropping includes an entire frame of the video content (e.g., nothing is cropped out of the frame), and the electronic device 500 downsamples (764) the first cropped video content to match a resolution of the display. In some embodiments, the video content has a much higher resolution (e.g., 2×, 4×, 8×) than the display to enable the video content to be cropped at a number of different scale factors while still displaying video at native resolution. Thus, in some circumstances, the video content at the first cropping and the video content at the second cropping are both output at the same resolution (e.g., the resolution of the display), because the video content is downsampled at both the first cropping and the second cropping to the resolution of the display.

In some embodiments, the electronic device 500 connects (766) a video call between the electronic device 500 and an additional electronic device 506. In some embodiments, two different devices (e.g., devices 500 and 506) are sharing video content in a two way video chat and the video captured by a camera 502 of the first device 500 is being panned and/or cropped for the display 508 of the second device 506 while the video content captured by a camera 510 of the second device 506 is being panned and/or cropped for the display 502 of the first device 500. In some embodiments, the video content from the camera 504 of the first device 500 is being downsampled, panned and/or cropped at the first device 500 before being sent to the second device 502 (e.g., so as to conserve bandwidth) and the video content from the camera 510 of the second device 506 is being downsampled, panned and/or cropped at the second device 506 before being sent to the first device 500 (e.g., so as to conserve bandwidth). In such a situation the first device 500 would optionally provide the second device 506 with information about a size and/or resolution of its display 502 so that the second device 506 could take that information into account when downsampling, panning, and/or cropping the video content sent to the first device 500, and vice versa. In some embodiments, the video content from the camera 504 of the first device 500 is being downsampled, panned and/or cropped at the second device 506 after being received from the first device 500 (e.g., so as to improve response time) and the video content from the camera 510 of the second device 506 is being downsampled, panned and/or cropped at the first device 500 after being received from the second device 506 (e.g., so as to improve response time).

In some embodiments, the camera 504 that captures the video content is connected (768) to the electronic device 500 that generates the first cropped video content and the display 508 is connected to the additional electronic device 506. In some embodiments, the camera 510 that captures the video content is connected (770) to the additional electronic device 506 and the display 502 is connected to the electronic device 500 that generates the first cropped video content.

The operations in the information processing methods described above are, optionally, implemented by running one or more functional modules in an information processing apparatus such as general purpose processors (e.g., as described above with respect to FIGS. 1A and 3) or application specific chips.

The operations described above with reference to FIGS. 7A-7D are, optionally, implemented by components depicted in FIGS. 1A-1B. For example, receiving operation 702, receiving operation 704, determining operation 710, and generating operation 722 are, optionally, implemented by event sorter 170, event recognizer 180, and event handler 190. Event monitor 171 in event sorter 170 detects a contact on touch-sensitive display 112, and event dispatcher module 174 delivers the event information to application 136-1. A respective event recognizer 180 of application 136-1 compares the event information to respective event definitions 186, and determines whether a first contact at a first location on the touch-sensitive surface corresponds to a predefined event or sub-event, such as selection of an object on a user interface. When a respective predefined event or sub-event is detected, event recognizer 180 activates an event handler 190 associated with the detection of the event or sub-event. Event handler 190 optionally utilizes or calls data updater 176 or object updater 177 to update the application internal state 192. In some embodiments, event handler 190 accesses a respective GUI updater 178 to update what is displayed by the application. Similarly, it would be clear to a person having ordinary skill in the art how other processes can be implemented based on the components depicted in FIGS. 1A-1B.

It should be understood that the particular order in which the operations in FIGS. 7A-7D have been described is merely exemplary and is not intended to indicate that the described order is the only order in which the operations could be performed. One of ordinary skill in the art would recognize various ways to reorder the operations described herein.

Figure 8:
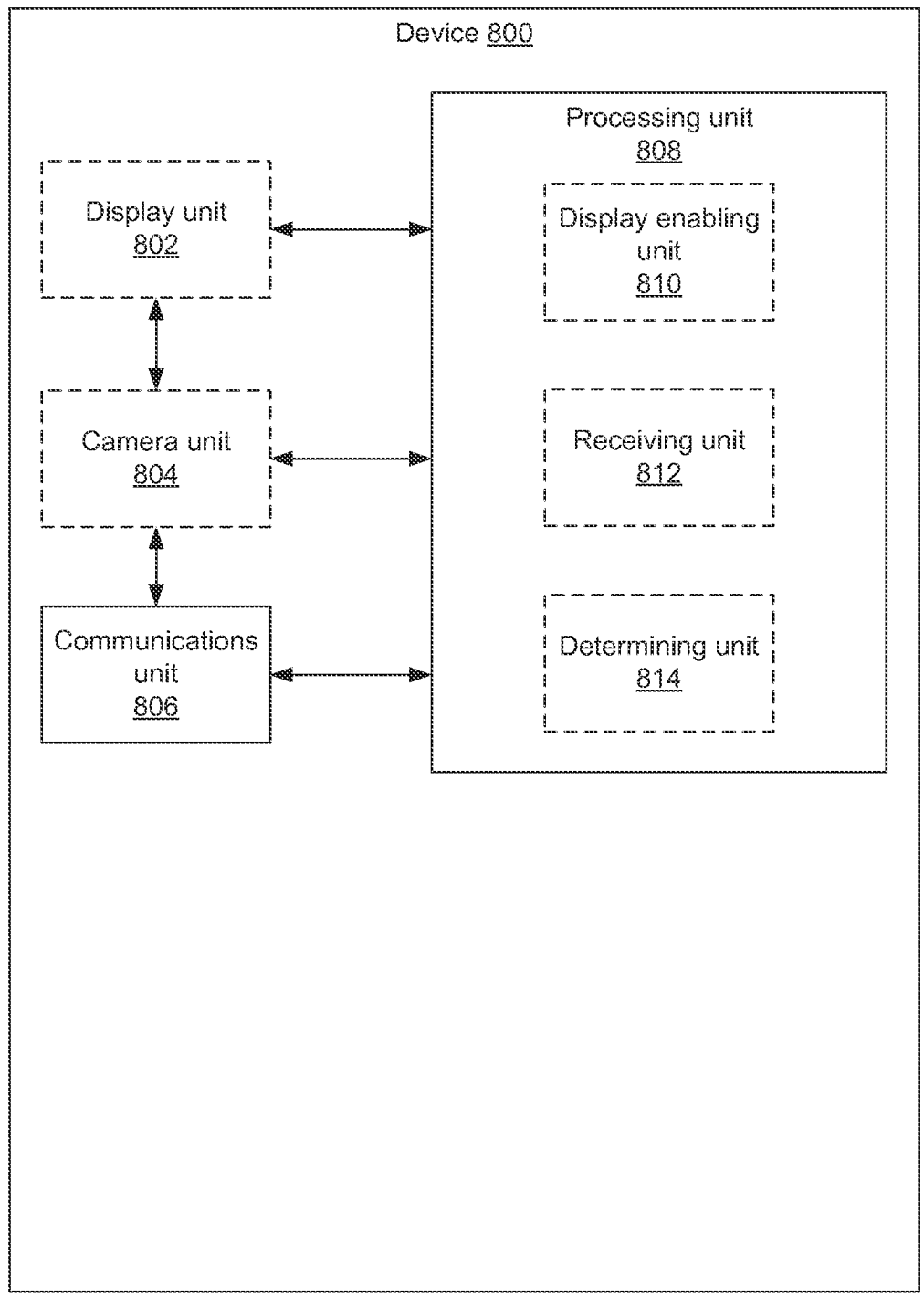
FIG. 8 shows a functional block diagram of an electronic device configured in accordance with the principles of the various described embodiments, in accordance with some embodiments.

In accordance with some embodiments, FIG. 8 shows a functional block diagram of a first electronic device 800 configured in accordance with principles of the various described embodiments. The functional blocks of the device are, optionally, implemented by hardware, software, or a combination of hardware and software to carry out the principles of the various described embodiments. It is understood by persons of skill in the art that the functional blocks described in FIG. 8 are, optionally, combined or separated into sub-blocks to implement the principles of the various described embodiments. Therefore, the description herein optionally supports any possible combination or separation or further definition of the functional blocks described herein.

As shown in FIG. 8, an electronic device 800 optionally includes a display unit 802 configured to display cropped video content; a camera unit 804 to capture video content; and a communications unit 806 to send and receive data from additional electronic devices. In some embodiments, the processing unit 808 optionally includes a display enabling unit 810, a receiving unit 812, and a determining unit 814.

In some embodiments, the processing unit 808 is configured to receive (e.g., with the receiving unit 812) video content captured by a camera, receive (e.g., with the receiving unit 812) first information about an environment that is in a field of view of the camera from one or more sensors associated with the camera, determine (e.g., with the determining unit 814) a first cropping for the video content based on the first information from the one or more sensors and the video content, and generate (e.g., with the display enabling unit 810) first cropped video content for presentation on a display based on the determined first cropping.

In some embodiments, the processing unit 808 is further configured to receive (e.g., with the receiving unit 812) second information about a change in the environment that is in the field of view of the camera from one or more sensors associated with the camera, determine (e.g., with the determining unit 814) a second cropping for the video content based on the second information, and generate (e.g., with the display enabling unit 810) second cropped video content for presentation on the display based on the determined second cropping.

In some embodiments, the processing unit 808 is further configured to determine (e.g., with the determining unit 814), based on the second information, that a subject in the environment has moved out of a threshold area of a frame of the video content wherein the second cropping is determined so as to keep the subject within the threshold area in the second cropped video content. In some embodiments, the second cropping is panned with respect to the first cropping. In some embodiments, the second cropping is zoomed out with respect to the first cropping.

In some embodiments, the processing unit 808 is further configured to determine (e.g., with the determining unit 814), based on the second information, that a subject in the environment has stopped moving, wherein the second cropping is determined in response to determining that the subject in the environment has stopped moving.

In some embodiments, the processing unit 808 is further configured to determine (e.g., with the determining unit 814) that a subject in the environment is within a threshold area of a frame of the video content, wherein the second cropping is determined in response to determining that the subject in the environment is within the threshold area, and the second cropping is zoomed in with respect to the first cropping.

In some embodiments, the first cropping is determined at a first time, and the processing unit 808 is further configured to determine (e.g., with the determining unit 814) that cropping criteria are met, and, in response to determining that the cropping criteria are met, in accordance with a determination that an elapsed time since the first time does not exceed a predetermined threshold time period, maintain (e.g., with the display enabling unit 810) the first cropping, and in accordance with a determination that the elapsed time exceeds the predetermined threshold time period, provide (e.g., with the display enabling unit 810) the second cropped video content for presentation on the display.

In some embodiments, the processing unit 808 is further configured to determine (e.g., with the determining unit 814), based on the second information whether a subject in the environment is active or inactive, in accordance with a determination that the subject is active, emphasize (e.g., with the display enabling unit 810) the subject in the second cropping with respect to the first cropping, and in accordance with a determination that the subject is inactive, deemphasize (e.g., with the display enabling unit 810) the subject in the second cropping with respect to the first cropping.

In some embodiments, the processing unit 808 is further configured to determine (e.g., with the determining unit 814), based on the second information, a range of movement of a subject in the environment, wherein the second cropping is zoomed out with respect to the first cropping in accordance with a determination that the range of movement of the subject is larger than a predetermined threshold, and wherein the second cropping is zoomed in with respect to the first cropping in accordance with a determination that the range of movement of the subject is smaller than the predetermined threshold.

In some embodiments, the processing unit 808 is further configured to generate (e.g., with the display enabling unit 810) a transition from the first cropped video content to the second cropped video content.

In some embodiments, the display has one or more characteristics, and determining the first cropping is based on the one or more characteristics of the display. In some embodiments, determining the first cropping includes scaling a subject in the environment to life-size on the display.

In some embodiments, the processing unit 808 is further configured to: determine (e.g., with the determining unit 814) respective locations of a plurality of subjects in a frame of the video content, wherein the first cropping is determined based on the respective locations.

In some embodiments, the processing unit 808 is further configured to select (e.g., with the determining unit 814) a cropping style, wherein the first cropping is determined based on the selected cropping style. In some embodiments, the cropping style is automatically selected based on cropping style criteria. In some embodiments, determining the first cropping is further based on metadata of the video content. In some embodiments, the first cropping includes an entire frame of the video content, and the processing unit 808 is further configured to downsample (e.g., with the display enabling unit 810) the first cropped video content to match a resolution of the display.

In some embodiments, the processing unit 808 is further configured to connect (e.g., with the receiving unit 812) a video call between the electronic device and an additional electronic device. In some embodiments, the camera that captures the video content is connected to the electronic device that generates the first cropped video content and the display is connected to the additional electronic device. In some embodiments, the camera that captures the video content is connected to the additional electronic device and the display is connected to the electronic device that generates the first cropped video content.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best use the invention and various described embodiments with various modifications as are suited to the particular use contemplated.

The invention claimed is:

1. A method comprising:
   at a first electronic device in communication with a display device:
      displaying, via the display device, a first respective portion of video content corresponding to a video call including the first electronic device and a second electronic device, wherein a second portion of the video content is not displayed, the video content captured by a camera in communication with the second electronic device includes a first subject, and the first respective portion of the video content includes the first subject but not a second subject; and
      while displaying the first respective portion of the video content, detecting a first event corresponding to a determination that the second subject is performing a first motion indicating an active status;
      in response to detecting the first event, updating the display device to display a second respective portion of the video content, different from the first respective portion of the video content, wherein the second respective portion of the video content includes the first subject and the second subject;
      while displaying the second respective portion of the video content including the first subject and the second subject, detecting a second event corresponding to a determination that the second subject is performing a second motion indicating an inactive status, different from the first motion; and
      in response to detecting the second event, updating the display device to display a third respective portion of the video content, different from the second respective portion of the video content, wherein the third respective portion of the video content includes the first subject and not the second subject.

2. The method of claim 1, wherein the first motion is directed to the first subject.

3. The method of claim 2, wherein the first motion includes a first posture of the second subject.

4. The method of claim 3, wherein the first posture of the second subject includes the second subject being oriented towards the first subject.

5. The method of claim 2, wherein the first motion includes movement of the second subject.

6. The method of claim 5, wherein the movement of the second subject is movement of the second subject towards the first subject.

7. The method of claim 2, wherein the first motion includes a first gesture of the second subject.

8. The method of claim 7, wherein the first gesture is a hand gesture of the second subject.

9. The method of claim 1, wherein the second motion is directed away from the first subject.

10. The method of claim 1, wherein:
before the first electronic device displays the first respective portion of the video content:
the second electronic device receives, via one or more sensors associated with the camera and different from the camera, first information about an environment that is in a field of view of the camera; and
the first respective portion of the video content is determined based on the first information; and
before the first electronic device displays the second respective portion of the video content:
the second electronic device receives, via the one or more sensors associated with the camera, second information about a change in the environment that is in the field of view of the camera; and
the second respective portion of the video content is determined based on the second information.

11. The method of claim 1, further comprising:
while displaying the second respective portion of the video content, detecting a third event corresponding to a determination that the second subject is not performing the first motion; and
in response to detecting the third event, updating the display device to display a fourth respective portion of the video content, wherein the fourth respective portion of the video content includes the first subject and not the second subject.

12. The method of claim 11, wherein the determination that the second subject is not performing the first motion includes determining that the second subject is oriented away from the first subject.

13. The method of claim 12, wherein the determination that the second subject is not performing the first motion is based on movement of the second subject.

14. The method of claim 13, wherein the movement of the second subject is movement away from the first subject.

15. A first electronic device, comprising:
one or more processors;
a non-transitory memory; and
one or more programs, wherein the one or more programs are stored in the non-transitory memory and configured to be executed by the one or more processors, the one or more programs including instructions for:
displaying, via a display device, a first respective portion of video content corresponding to a video call including the first electronic device and a second electronic device, wherein a second portion of the video content is not displayed, the video content captured by a camera in communication with the first second electronic device includes a first subject, and the first respective portion of the video content includes the first subject but not a second subject; and
while displaying the first respective portion of the video content, detecting a first event corresponding to a determination that the second subject is performing a first motion indicating an active status;
in response to detecting the first event, updating the display device to display a second respective portion of the video content, different from the first respective portion of the video content, wherein the second respective portion of the video content includes the first subject and the second subject;
while displaying the second respective portion of the video content including the first subject and the second subject, detecting a second event corresponding to a determination that the second subject is performing a second motion indicating an inactive status, different from the first motion; and
in response to detecting the second event, updating the display device to display a third respective portion of the video content, different from the second respective portion of the video content, wherein the third respective portion of the video content includes the first subject and not the second subject.

16. The first electronic device of claim 15, wherein the first motion is directed to the first subject.

17. The first electronic device of claim 16, wherein the first motion includes a first posture of the second subject.

18. The first electronic device of claim 17, wherein the first posture of the second subject includes the second subject being oriented towards the first subject.

19. The first electronic device of claim 16, wherein the first motion includes movement of the second subject.

20. The first electronic device of claim 19, wherein the movement of the second subject is movement of the second subject towards the first subject.

21. The first electronic device of claim 16, wherein the first motion includes a first gesture of the second subject.

22. The first electronic device of claim 21, wherein the first gesture is a hand gesture of the second subject.

23. The first electronic device of claim 15, wherein the second motion is directed away from the first subject.

24. The first electronic device of claim 15, wherein:
before the first electronic device displays the first respective portion of the video content:
the second electronic device receives, via one or more sensors associated with the camera and different from the camera, first information about an environment that is in a field of view of the camera; and
the first respective portion of the video content is determined based on the first information; and
before the first electronic device displays the second respective portion of the video content:
the second electronic device receives, via the one or more sensors associated with the camera, second information about a change in the environment that is in the field of view of the camera; and
the second respective portion of the video content is determined based on the second information.

25. The first electronic device of claim 15, the one or more programs further including instructions for:
- while displaying the second respective portion of the video content, detecting a third event corresponding to a determination that the second subject is not performing the first motion; and
- in response to detecting the third event, updating the display device to display a fourth respective portion of the video content, wherein the fourth respective portion of the video content includes the first subject and not the second subject.

26. The first electronic device of claim 25, wherein the determination that the second subject is not performing the first motion includes determining that the second subject is oriented away from the first subject.

27. The first electronic device of claim 26, wherein the determination that the second subject is not performing the first motion is based on movement of the second subject.

28. The first electronic device of claim 27, wherein the movement of the second subject is movement away from the first subject.

29. A non-transitory computer-readable storage medium storing one or more programs, the one or more programs comprising instructions, which, when executed by a first electronic device in communication with a display device, cause the first electronic device to:
- display, via the display device, a first respective portion of video content corresponding to a video call including the first electronic device and a second electronic device, wherein a second portion of the video content is not displayed, the video content captured by a camera in communication with the second electronic device includes a first subject, and the first respective portion of the video content includes the first subject but not a second subject; and
- while displaying the first respective portion of the video content, detect a first event corresponding to a determination that the second subject is performing a first motion indicating an active status;
- in response to detecting the first event, update the display device to display a second respective portion of the video content, different from the first respective portion of the video content, wherein the second respective portion of the video content includes the first subject and the second subject;
- while displaying the second respective portion of the video content including the first subject and the second subject, detect a second event corresponding to a determination that the second subject is performing a second motion indicating an inactive status, different from the first motion; and
- in response to detecting the second event, update the display device to display a third respective portion of the video content, different from the second respective portion of the video content, wherein the third respective portion of the video content includes the first subject and not the second subject.

30. The non-transitory computer-readable storage medium of claim 29, wherein the first motion is directed to the first subject.

31. The non-transitory computer-readable storage medium of claim 30, wherein the first motion includes a first posture of the second subject.

32. The non-transitory computer-readable storage medium of claim 31, wherein the first posture of the second subject includes the second subject being oriented towards the first subject.

33. The non-transitory computer-readable storage medium of claim 30, wherein the first motion includes movement of the second subject.

34. The non-transitory computer-readable storage medium of claim 33, wherein the movement of the second subject is movement of the second subject towards the first subject.

35. The non-transitory computer-readable storage medium of claim 30, wherein the first motion includes a first gesture of the second subject.

36. The non-transitory computer-readable storage medium of claim 35, wherein the first gesture is a hand gesture of the second subject.

37. The non-transitory computer-readable storage medium of claim 29, wherein the second motion is directed away from the first subject.

38. The non-transitory computer-readable storage medium of claim 29, wherein:
- before the first electronic device displays the first respective portion of the video content:
  - the second electronic device receives, via one or more sensors associated with the camera and different from the camera, first information about an environment that is in a field of view of the camera; and
  - the first respective portion of the video content is determined based on the first information; and
- before the first electronic device displays the second respective portion of the video content:
  - the second electronic device receives, via the one or more sensors associated with the camera, second information about a change in the environment that is in the field of view of the camera; and
  - the second respective portion of the video content is determined based on the second information.

39. The non-transitory computer-readable storage medium of claim 29, the instructions further causing the first electronic device to:
- while displaying the second respective portion of the video content, detect a third event corresponding to a determination that the second subject is not performing the first motion; and
- in response to detecting the third event, update the display device to display a fourth respective portion of the video content, wherein the fourth respective portion of the video content includes the first subject and not the second subject.

40. The non-transitory computer-readable storage medium of claim 39, wherein the determination that the second subject is not performing the first motion includes determining that the second subject is oriented away from the first subject.

41. The non-transitory computer-readable storage medium of claim 40, wherein the determination that the second subject is not performing the first motion is based on movement of the second subject.

42. The non-transitory computer-readable storage medium of claim 41, wherein the movement of the second subject is movement away from the first subject.

* * * * *